(12) United States Patent
Sakurai

(10) Patent No.: US 8,111,949 B2
(45) Date of Patent: Feb. 7, 2012

(54) IMAGE PROCESSING DEVICE, IMAGE PROJECTION APPARATUS, IMAGE PROCESSING METHOD, RECORDING MEDIUM, AND COMPUTER DATA SIGNAL

(75) Inventor: Keiichi Sakurai, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 996 days.

(21) Appl. No.: 11/067,087

(22) Filed: Feb. 25, 2005

(65) Prior Publication Data

US 2005/0190986 A1 Sep. 1, 2005

(30) Foreign Application Priority Data

Feb. 27, 2004 (JP) .................................. 2004-054930
Feb. 23, 2005 (JP) .................................. 2005-047738

(51) Int. Cl.
*G06K 9/32* (2006.01)
(52) U.S. Cl. ........ 382/299; 382/307; 382/318; 382/319; 382/168; 348/672
(58) Field of Classification Search .................. 382/255, 382/254, 299, 307, 318, 319, 168; 348/218.1, 348/672
See application file for complete search history.

(56) References Cited

U.S. PATENT DOCUMENTS

| | | | | |
|---|---|---|---|---|
| 5,469,274 A | * | 11/1995 | Iwasaki et al. | 358/450 |
| 5,528,194 A | * | 6/1996 | Ohtani et al. | 382/293 |
| 5,696,848 A | * | 12/1997 | Patti et al. | 382/254 |
| 5,870,505 A | | 2/1999 | Wober et al. | |
| 5,974,199 A | * | 10/1999 | Lee et al. | 382/289 |
| 5,982,926 A | | 11/1999 | Kuo et al. | |
| 6,009,197 A | * | 12/1999 | Riley | 382/199 |
| 6,185,342 B1 | * | 2/2001 | Hamburg et al. | 382/284 |
| 6,285,804 B1 | * | 9/2001 | Crinon et al. | 382/299 |
| 6,323,934 B1 | * | 11/2001 | Enomoto | 355/40 |

(Continued)

FOREIGN PATENT DOCUMENTS

EP 0 723 364 A2 7/1996

(Continued)

OTHER PUBLICATIONS

Copnstructing high resolution images—Low resolution images, Majumdar et al, ICGST GVIP Journal, vol. 6 issue 4, Dec. 2006, pp. 47-58.*

(Continued)

*Primary Examiner* — Jayesh A Patel
(74) *Attorney, Agent, or Firm* — Holtz, Holtz, Goodman & Chick, PC

(57) ABSTRACT

A captured image projection apparatus obtains projection parameters and image effect correction parameters from a moving image captured at a low resolution in a task different from a task in which capturing of a high-resolution still image is to be performed, when a change ceases to occur in the moving image and before the capturing of the high-resolution still image is started. The apparatus changes the scale of the obtained projection parameters from one for low-resolution image to one for high-resolution image. The apparatus applies an image conversion process and an image effect process to the captured high-resolution still image by using the projection parameters and image effect correction parameters obtained before the still image is captured. Thereby, the captured image projection apparatus shortens the time required from the capturing of the image to projection thereof.

9 Claims, 32 Drawing Sheets

U.S. PATENT DOCUMENTS

| | | | |
|---|---|---|---|
| 6,470,101 B1 * | 10/2002 | Nakamura | 382/319 |
| 6,515,766 B1 * | 2/2003 | Matama | 358/1.9 |
| 6,674,485 B2 * | 1/2004 | Akiyama et al. | 348/586 |
| 6,856,706 B2 * | 2/2005 | Yamada | 382/276 |
| 6,868,179 B2 * | 3/2005 | Gruzdev et al. | 382/167 |
| 6,944,224 B2 * | 9/2005 | Zhao et al. | 375/240.16 |
| 7,268,803 B1 * | 9/2007 | Murata et al. | 348/218.1 |
| 7,319,496 B2 * | 1/2008 | Uchida et al. | 348/625 |
| 7,486,310 B2 * | 2/2009 | Sakurai et al. | 348/207.99 |
| 7,489,832 B2 * | 2/2009 | Makino et al. | 382/287 |
| 7,768,681 B2 * | 8/2010 | Kuwata | 358/518 |
| 7,893,963 B2 * | 2/2011 | Gallagher et al. | 348/208.6 |
| 7,916,158 B2 * | 3/2011 | Aoki et al. | 345/690 |
| 2002/0048413 A1 * | 4/2002 | Kusunoki | 382/282 |
| 2002/0149795 A1 | 10/2002 | Yamamoto | |
| 2003/0063814 A1 * | 4/2003 | Herley | 382/255 |
| 2004/0012679 A1 | 1/2004 | Fan | |
| 2005/0046811 A1 * | 3/2005 | Mori et al. | 353/122 |
| 2006/0039604 A1 * | 2/2006 | Fukawa et al. | 382/168 |

FOREIGN PATENT DOCUMENTS

| | | | |
|---|---|---|---|
| JP | 2001-109422 A | | 4/2001 |
| JP | 2001109422 | * | 4/2001 |
| JP | 2002-354331 A | | 12/2002 |
| WO | WO 97/34257 A1 | | 9/1997 |
| WO | WO09734257 | * | 9/1997 |

OTHER PUBLICATIONS

Deans, Stanley R., "Hough Transform from the Radon Transform." IEEE Transactions on Pattern Analysis and Machine Intelligence, vol. 3, No. 2, Mar. 1981, pp. 185-188, XP009097360.

A European Search Report dated Mar. 28, 2008, issued in a counterpart European Application.

European Patent Office Communication dated Jul. 16, 2009 (4 pages), issued in counterpart European Application Serial No. 05 004 126.8.

* cited by examiner

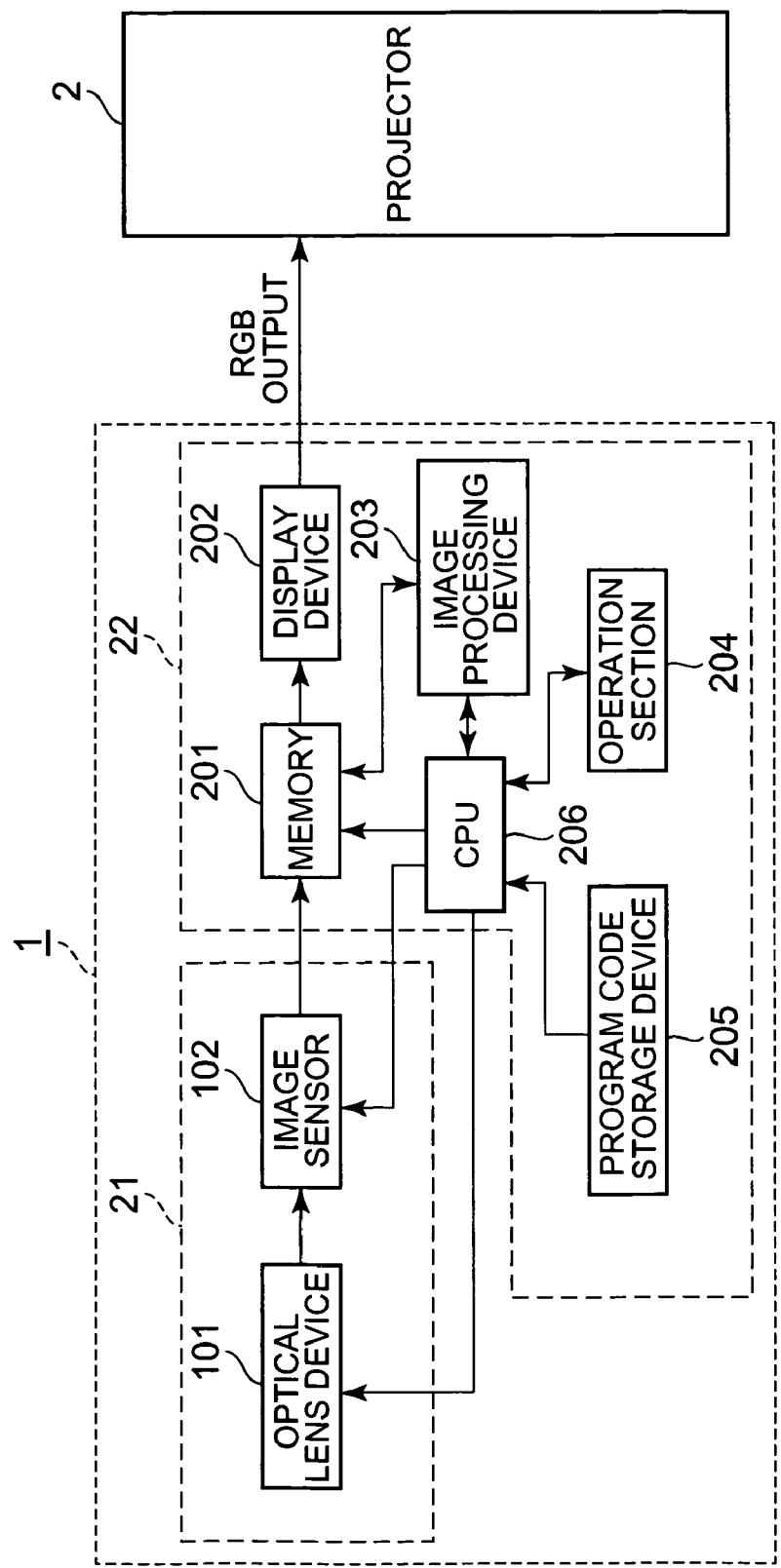

FIG.12A
REDUCED LUMINANCE IMAGE
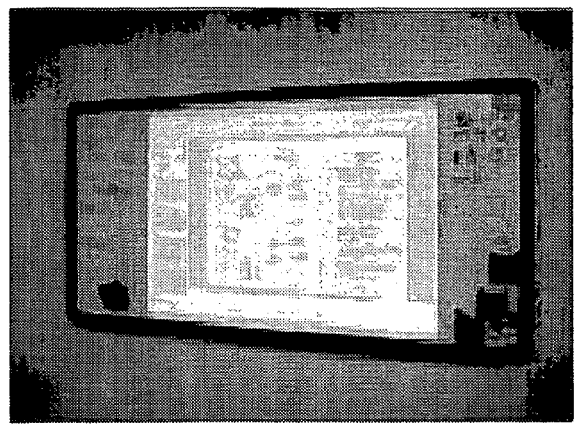
FIG.12B
EDGE IMAGE
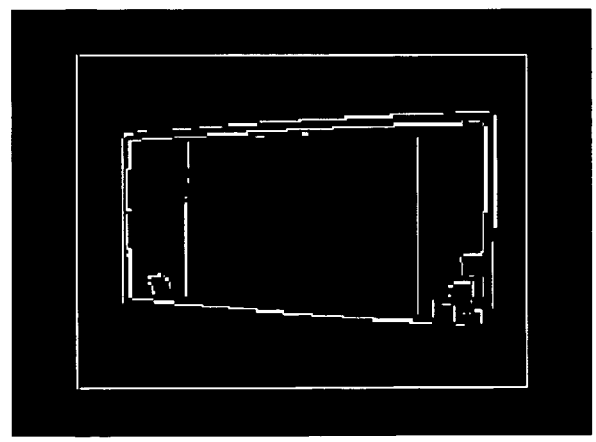
FIG.13A
Δ1
| 1 | 0 |
|---|---|
| 0 | -1 |
FIG.13B
Δ2
| 0 | 1 |
|---|---|
| -1 | 0 |

OUTER FRAME
INNER FRAME

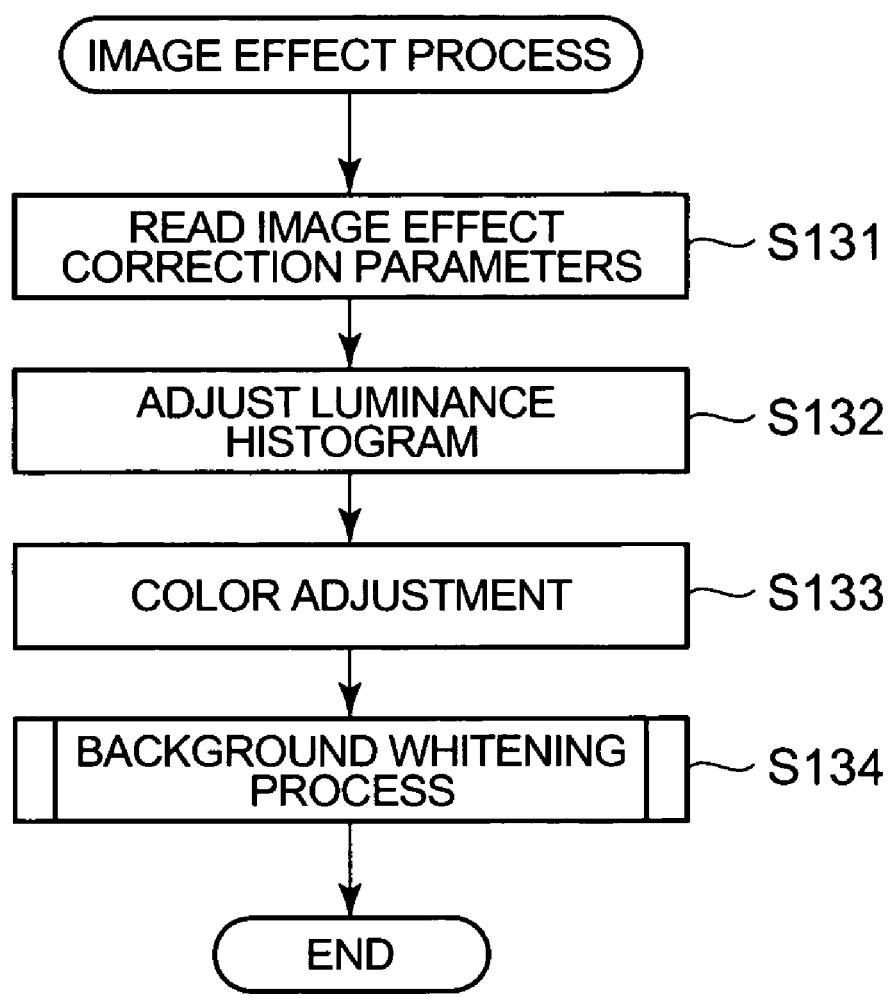

IMAGE PROCESSING DEVICE, IMAGE PROJECTION APPARATUS, IMAGE PROCESSING METHOD, RECORDING MEDIUM, AND COMPUTER DATA SIGNAL

BACKGROUND OF THE INVENTION

1. Field of the Invention

The present invention relates to an image processing device, an image projection apparatus, an image processing method, and a program, and particularly relates to an image processing device, an image projection apparatus, an image processing method, and a program capable of reducing time required from capturing of an image to projection thereof.

2. Description of the Related Art

There is known a captured image projection apparatus for shooting a script paper laced on a script paper mount, subjecting digital image data obtained from shooting to predetermined image processing, etc., and analog-converting and outputting the processed image data, whereby projecting an expanded image of the script paper on a screen (for example, see Unexamined Japanese Patent Application KOKAI Publication No. 2002-354331 (pp. 2-3, FIG. 1)).

A conventional captured image projection apparatus captures a still image and a moving image at the same resolution. Hence, a low-set resolution spoils the image quality of an image, especially, a still image projected on a screen whereas a high-set resolution increases the processing load of a CPU (Central Processing Unit) or the like required to capture an image, especially, a moving image.

To solve this problem, the inventor of the present invention devised a captured image projection apparatus which captures a moving image at a low resolution and captures a still image at a high resolution. This made it possible to reduce the processing load of the CPU or the like required for image capturing, without spoiling the image quality of a still image.

However, since the devised captured image projection apparatus extracts image correction parameters such as affine parameters, etc. after starting high-resolution image capturing and then subjects the capturing-object still image to a predetermined correction process, it suffers from a problem that the time required from capturing of the still image to projection thereof is long.

SUMMARY OF THE INVENTION

The present invention has been made for solving this problem, and provides an image processing device, an image projection apparatus, an image processing method, and a program capable of reducing time required from capturing of an image to projection thereof.

An image processing device according to a first aspect of the present invention comprises:

a change determination section configured to determine whether there is any change in an image which is captured by a camera at a predetermined resolution;

a resolution setting section configured to set a first resolution in the camera as the predetermined resolution in a case where the change determination section determines that there is a change and to set a second resolution higher than the first resolution in the camera in a case where the change determination section determines that there is no change;

a correction parameter extraction section configured to extract parameters for correcting an image from the image captured by the camera at the first resolution; and an image correction section configured to correct an image captured by the camera at the second resolution by using the parameters extracted by the correction parameter extraction section.

An image projection apparatus according to another aspect of the present invention comprises:

an image capture section configured to capture an image at a predetermined resolution;

a change determination section configured to determine whether there is any change in the image captured by the image capture section;

a resolution setting section configured to set a first resolution in the image capture section as the predetermined resolution in a case where the change determination section determines that there is a change, and to set a second resolution higher than the first resolution in the image capture section in a case where the change determination section determines that there is no change;

a correction parameter extraction section configured to extract from an image captured by the image capture section at the first resolution, parameters for correcting the image;

an image correction section configured to correct an image captured by the image capture section at the second resolution by using the parameters extracted by the correction parameter extraction section; and a projection section configured to project the image corrected by the image correction section on a screen.

An image processing method according to another aspect of the present invention comprises:

a change determining step of determining whether there is a change in an image which is captured by a camera at a predetermined resolution;

a resolution setting step of setting a first resolution in the camera as the predetermined resolution in a case where it is determined in the change determining step that there is a change, and setting a second resolution higher than the first resolution in the camera in a case where it is determined that there is no change;

a correction parameter extracting step of extracting from an image captured by the camera at the first resolution, parameters for correcting the image; and an image correcting step of correcting an image captured by the camera at the second resolution by using the parameters extracted in the correction parameter extracting step.

A recording medium according to another aspect of the present invention stores a program for controlling a computer to execute:

a change determining procedure of determining whether there is any change in an image captured by a camera at a predetermined resolution;

a resolution setting procedure of setting a first resolution in the camera as the predetermined resolution in a case where it is determined in the change determining procedure that there is a change, and setting a second resolution higher than the first resolution in the camera in a case where it is determined that there is no change;

a correction parameter extracting procedure of extracting from an image captured by the camera at the first resolution, parameters for correcting the image; and an image correcting procedure of correcting an image captured by the camera at the second resolution by using the parameters extracted in the correction parameter extracting procedure.

A computer data signal according to another aspect of the present invention is embedded in a carrier wave and represents a program for controlling a computer to execute:

a change determining procedure of determining whether there is any change in an image captured by a camera at a predetermined resolution;

a resolution setting procedure of setting a first resolution in the camera as the predetermined resolution in a case where it is determined in the change determining procedure that there is a change, and setting a second resolution higher than the first resolution in the camera in a case where it is determined that there is no change;

a correction parameter extracting procedure of extracting from an image captured by the camera at the first resolution, parameters for correcting the image; and an image correcting procedure of correcting an image captured by the camera at the second resolution by using the parameters extracted in the correction parameter extracting procedure.

By utilizing the present invention, an image projection apparatus can shorten the time required from capturing of an image to projection thereof.

BRIEF DESCRIPTION OF THE DRAWINGS

These objects and other objects and advantages of the present invention will become more apparent upon reading of the following detailed description and the accompanying drawings in which:

FIG. 2 is a block diagram showing the configuration of a document camera shown in FIG. 1;

FIGS. 12A and 12B are diagrams for explaining a reduced luminance image and an edge image;

FIGS. 13A and 13B are diagrams for explaining the function of a Roberts filter;

FIG. 29 is a flowchart specifically showing an image effect process shown in FIG. 6;

DETAILED DESCRIPTION OF THE PREFERRED EMBODIMENTS

Figure 1:
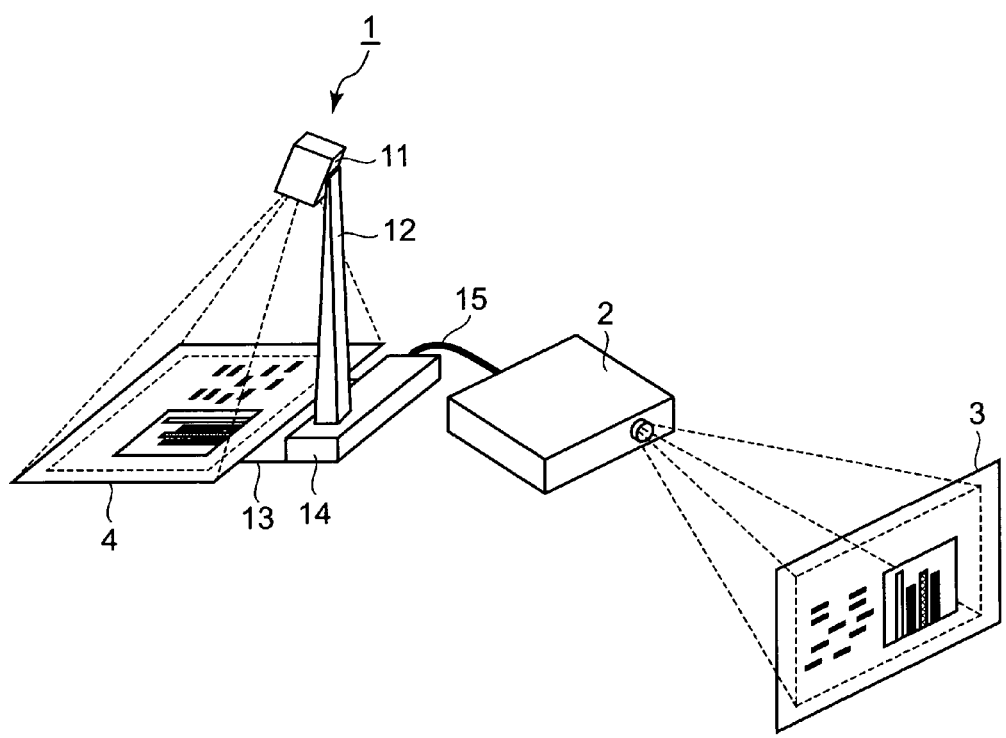
FIG. 1 is a diagram showing the configuration of a captured image projection apparatus according to a first embodiment of the present invention.

FIG. 1 is a diagram showing the configuration of a captured image projection apparatus according to a first embodiment of the present invention. As shown in FIG. 1, the captured image projection apparatus comprises a document camera 1 and a projector 2. The document camera 1 is a camera system for shooting a script paper 4, which is the projection object. The document camera 1 includes a camera section 11, a strut 12, a mount 13, and an operation table 14. The camera section 11 shoots the script paper 4 and is formed of a digital camera. The camera section 11 is attached to the strut 12. The mount 13 supports the strut 12.

FIG. 2 is a block diagram showing the configuration of the document camera 1 shown in FIG. 1. As shown in FIG. 2, the document camera 1 comprises an image data generation unit 21 and a data processing unit 22. The image data generation unit 21 and the data processing unit 22 may be provided in the camera section 11 shown in FIG. 1. Alternately, the image data generation unit 21 and the data processing unit 22 may be provided in the camera section 11 and in the operation table 14 respectively.

The image data generation unit 21 shoots the script paper 4 and acquires image data of the script paper 4. The image data generation unit 21 includes an optical lens device 101 and an image sensor 102. The optical lens device 101 is formed of a lens and the like for condensing light in order to shoot the script paper 4. The image sensor 102 acquires an image which is formed by light condensed by the optical lens device 101 in the form of digitized image data. The image sensor 102 is formed of a CCD (Charge Coupled Device) or the like.

The data processing unit 22 obtains the image data of the script paper 4 acquired by the image data generation unit 21 to subject the image data to image processing, and outputs the processed image data to the projector 2. The data processing unit 22 comprises a memory 201, a display device 202, an image processing device 203, an operation section 204, a program code storage device 205, and a CPU (Central Processing Unit) 206.

The memory 201 temporarily stores an image from the image sensor 102, image data to be transmitted to the display device 202, etc. The display device 202 displays an image to be transmitted to the projector 2.

Figure 3A:
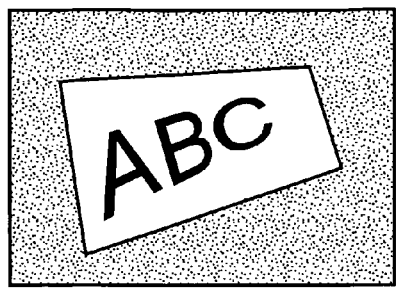
FIGS. 3A and 3B are diagrams for explaining the function of an image processing device shown in FIG. 2.
Figure 3B:
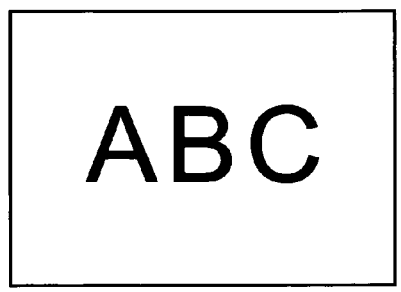

The image processing device 203 subjects image data temporarily stored in the memory 201 to image processing including image distortion correction and image effect. The image processing device 203 executes distortion correction (keystone correction) whereby generating an image as shown in FIG. 3B which is obtained when the script paper 4 is shot from a position in front of it, from an image as shown in FIG. 3A which is obtained when the script paper 4 is shot while it is inclined or rotated with respect to the shooting plane of the camera section 11. To execute distortion correction, the image processing device 203 extracts a quadrangle from a distorted image of the script paper 4, performs projective transformation of the data of the script paper 4 into the extracted quadrangle, and inversely transforms the extracted quadrangle.

More specifically, the image processing device 203, under the control of the CPU 206, performs (1) a process for extracting an affine parameter from an image of the script paper 4, (2) an image transformation process with the use of the extracted affine parameter, (3) a process for extracting an image effect correction parameter related to luminance, color difference, etc. and an image effect process, and (4) an image transformation adjusting process. These processes will be described later.

The operation section 204 comprises switches and keys for controlling functions for document projection. The operation section 204 outputs operation information to the CPU 206 when a user operates these switches or keys.

Figure 4:
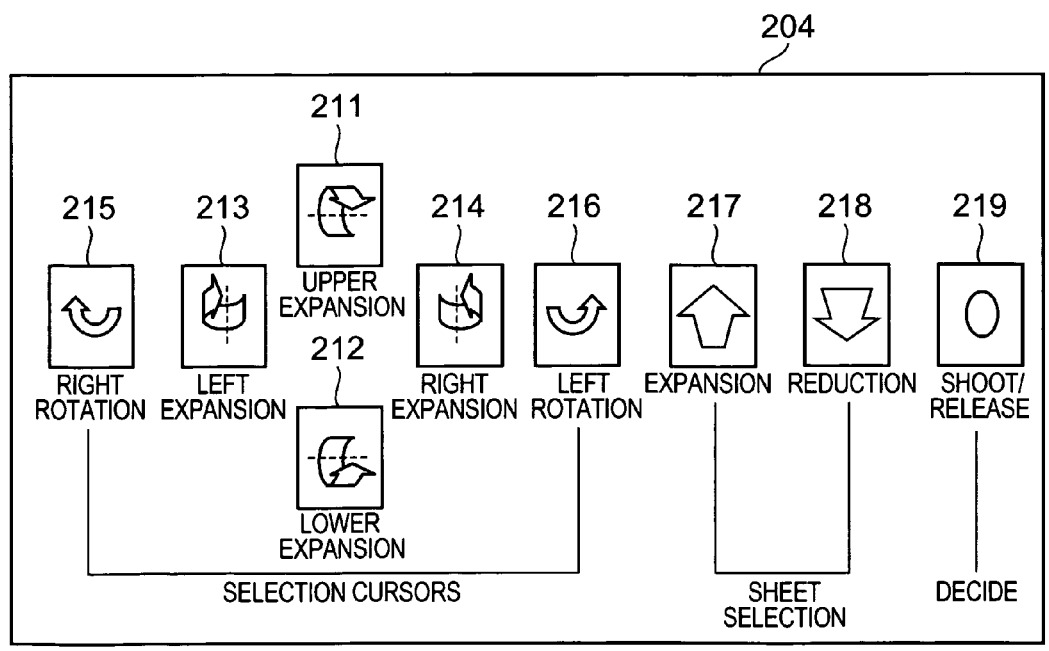
FIG. 4 is a diagram for explaining the function of each key comprised in an operation section shown in FIG. 2.

FIG. 4 is a diagram showing the key configuration of the operation section 204 shown in FIG. 2. As shown in FIG. 4, the operation section 204 comprises, as image adjusting keys, a upper expanding key 211, a lower expanding key 212, a left expanding 213, a right expanding key 214, a right rotation key 215, a left rotation key 216, an expanding key 217, a reducing key 218, and a shooting/releasing key 219.

The upper expanding key 211, the lower expanding key 212, the left expanding key 213, and the right expanding key 214 are projective transformation keys used for executing projective transformation.

The upper expanding key 211 is operated to rotate the upper half of an image toward the viewer, based on a comparison between the upper half and lower half of the image which are separate by a center line horizontally running on the image. The lower expanding key 212 is operated to rotate the lower half of an image toward the viewer.

The left expanding key 213 and the right expanding key 214 are used for adjusting symmetry between the left and right halves of an image by rotating the image about an axial vertical line that runs through the center of the image. The left expanding key 213 is operated when the left half of the image is smaller. The right expanding key 214 is operated when the right half of the image is smaller.

The right rotation key 215 and the left rotation key 216 are rotation correction keys for adjusting rotation of an image. The right rotation key 215 is operated for rotating an image clockwise. The left rotation key 216 is operated for rotating an image counterclockwise.

The expanding key 217 and the reducing key 218 are operated for performing image transformation such as image expansion and image reduction.

If a ratio indicative of a rate of expansion at one depression of the key is set to 2, the image processing device 203 doubles an image when a user pushes the expanding key 217 once. When the user pushes the expanding key 217 once more, the image processing device 203 further doubles the image, thereby obtaining an image four times as large as the original image. To get the image back to ½ the size of the image, the reducing key 218 is pushed. The operation section 204 and the CPU 206 respond to this instruction, and the image processing device 203 reduces the expanded image.

The upper expanding key 211, the lower expanding key 212, the left expanding key 213, and the right expanding key 214 also function as cursor keys when the expanding key 217 is operated. To be more specific, the upper expanding key 211 functions as an upward moving key for upwardly moving the image of the script paper 4 displayed on the display device 202 when the expanding key 217 is operated. The lower expanding key 212 functions as a downward moving key for downwardly moving the image of the script paper 4 when the expanding key 217 is operated. The left expanding key 213 functions as a leftward moving key for leftwardly moving the image of the script paper 4 when the expanding key 217 is operated. The right expanding key 214 functions as a rightward moving key for rightwardly moving the image of the script paper 4 when the expanding key 217 is operated.

The expanding key 217 and the reducing key 218 function as keys for entering a sheet setting mode when depressed synchronously. In the sheet setting mode, the right rotation key 215 and the left rotation key 216 function as cursor keys for selecting a desired size for sheet. The sheet setting mode will be described later.

The shooting/releasing key 219 is operated for shooting the script paper 4. Further, in the later-described sheet setting mode, the shooting/releasing key 219 functions as a decision key for deciding on a selected sheet size.

The program code storage device 205 shown in FIG. 2 stores programs to be executed by the CPU 206, and is formed of a ROM (Read Only Memory) or the like. The CPU 206 controls each component according to the programs stored in the program code storage device 205. The memory 201 is also used as a work memory of the CPU 206.

The CPU 206 determines whether there is any change in an image of the shooting object script paper 4 according to a later-described flowchart, and switches between image capture modes in accordance with the determination result.

The image capture modes include a moving image mode and a still image mode. The moving image mode is set while a user is placing the script paper 4 or the like to be projected on the mount 13. In this mode, the image captured by the camera section 11 is directly projected by the projector 2.

In the moving image mode, the CPU 206 controls each component such that images approximately corresponding to a resolution of VGA (Video Graphics Array: 600×480 dots) are projected at a rate of 30 fps (frames/second). The moving image mode is low in resolution, but gives a higher significance on real-time performance.

The still image mode is set after the user finishes placing the script paper 4. In the still image mode, a high-resolution image is captured by the camera section 11 and a high-resolution still image is projected. In a case where the camera section 11 is a camera having a shooting resolution of 3 mega pixels, an extracted projection image will be a still image of XGA (Extended Graphics Array: 1024×768 dots).

For switching between the image capture modes, the CPU 206 determines whether there is a change in the image of the script paper 4. For this determination, the CPU 206 calculates an image change amount MD as compared with a previously captured image. The image change amount MD indicates how much the image being captured is changed from the previous image. There are several manners of calculating this amount. For one example, the CPU 206 obtains the total of absolute values of differences in the respective pixels as the image change amount MD, base on the previously captured image data.

That is, when it is assumed that the previous pixel data is $P_{n-1}(x, y)$, and the current pixel data is $P_n(x, y)$ ($1 \leq x \leq 640$, $1 \leq y \leq 480$), the image change amount MD is expressed by the following equation 1.

$$MD = \sum_{x=1}^{640} \sum_{y=1}^{480} |P_n(x, y) - P_{n-1}(x, y)| \quad \text{[Equation 1]}$$

Since obtaining the total of differences in all the pixels requires much calculating, the image change amount MD may be obtained by sampling some pixels.

As thresholds to be compared with the image change amount MD for determining presence/absence of a change, a threshold Thresh 1 and a threshold Thresh 2 are set in advance. The threshold Thresh 1 is a value for determining whether change is absent or not. The CPU 206 determines that change is absent when the image change amount MD is smaller than the threshold Thresh 1.

The threshold Thresh 2 is a value for determining in the still image mode whether a change, if any, is such a slight one as not requiring switch to the moving image mode, such as a change caused when a shadow moves or a pen or the like is put on the image, etc.

If the image change amount MD is smaller than the threshold Thresh 2, the CPU 206 determines that the change is a slight one that does not require switch to the moving image mode. The threshold Thresh 2 is set higher than the threshold Thresh 1 (Thresh 1<Thresh 2). The memory 201 pre-stores the threshold Thresh 1 and the threshold Thresh 2.

Further, in a case where the moving image mode is to be switched to the still image mode, the CPU 206 switches the image capture mode to the still image mode when a predetermined time passes after it determines that there is no change in the image. For this purpose, the CPU 206 counts a still time Ptime after it determines that there is no change in the image. The memory 201 stores a predetermined time HoldTime preset to be compared with the still time Ptime.

The projector 2 shown in FIG. 1 irradiates a projection light to a screen 3 so that an image of the script paper 4 is focused thereon. The document camera 1 and the projector 2 are connected via a cable 15 such as an RGB cable or the like. The document camera 1 outputs image data of the script paper 4 shot by the camera section 11 to the projector 2 via the cable 15.

The operation of the captured image projection apparatus according to the first embodiment will now be explained. When the user turns on the power of the captured image projection apparatus, the CPU 206 of the document camera 1 reads a program code from the program code storage device 205 and executes a basic projection process.

Figure 5:
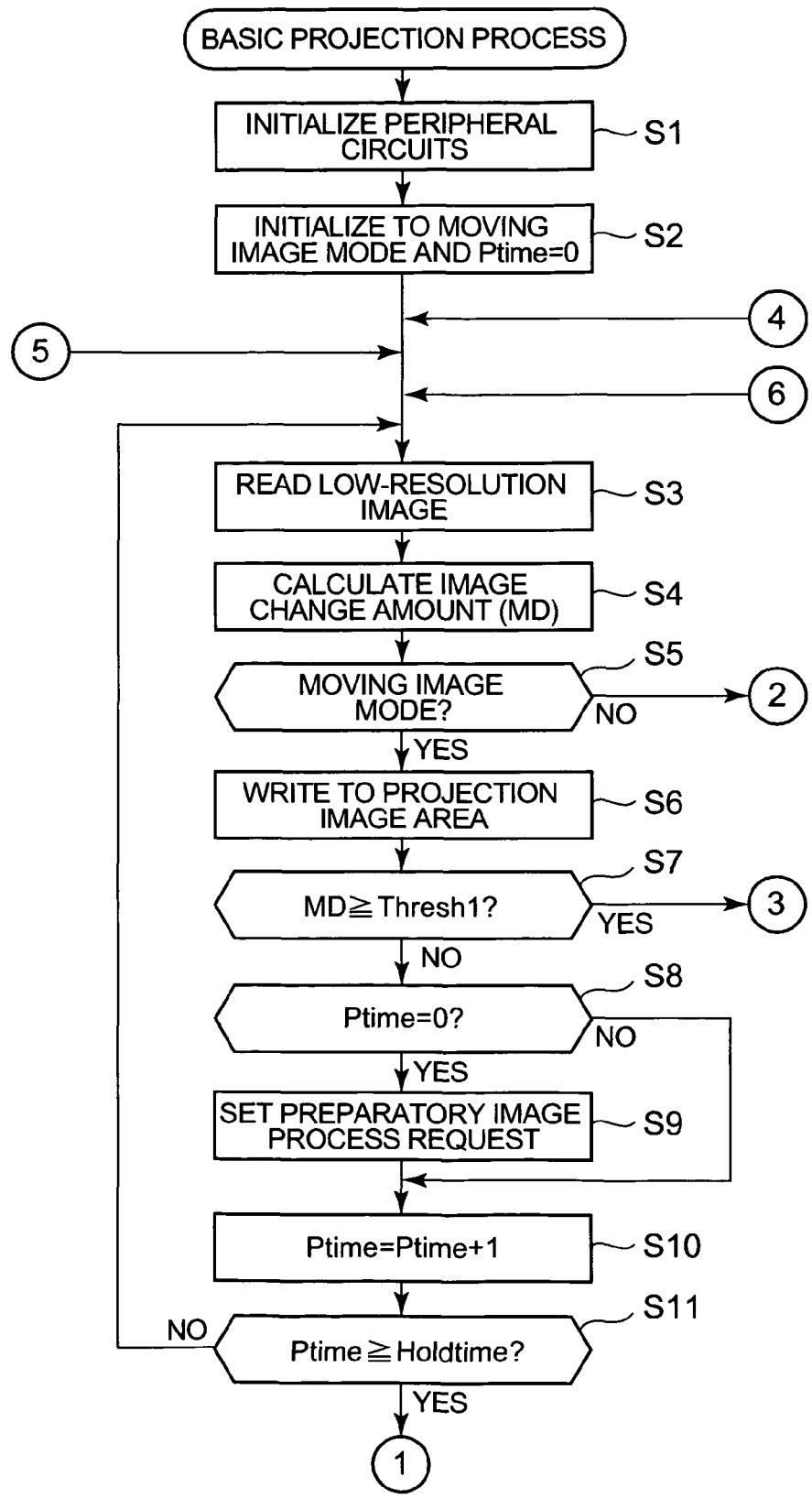
FIG. 5 to FIG. 7 are a flowchart showing a basic projection process.

The content of the basic projection process will be explained according to the flowchart shown in FIG. 5, FIG. 6 and FIG. 7. First, the CPU 206 initializes camera setting parameters such as focus, exposure, white balance, etc. of the camera section 11 of the document camera 1 (step S1).

The CPU 206 initializes the image capture mode to the moving image mode, and initializes the still time Ptime (step S2). In order to initialize the image capture mode to the moving image mode, the CPU 206 sets the moving image mode (Motion) in a designated area of the memory 201. To initialize the still time Ptime, the CPU 206 resets the still time Ptime. Further, the CPU 206 makes settings such that image data read from the image sensor 102 of the camera section 11 corresponds to VGA.

As a result, the scene captured by the camera section 11 is condensed on the image sensor 102 via the optical lens device 101. The image sensor 102 generates a low-resolution digital image for moving image capturing, from the condensed image. The image sensor 102 transmits the generated digital image to the memory 201 on a regular basis, for example, 30 frames per second.

Next, the CPU 206 controls the image sensor 102 and the memory 201 such that the low-resolution image data is transferred from the image sensor 102 to the memory 201 (step S3). At this step, the image data generated by the image sensor 102 is merely transferred to the memory 201, and the display device 202 does not display the image. The display device 202 does not display the image because image data used for displaying by the display device 202 is stored in an area of the memory 201 designated by a different address.

Next, the CPU 206 calculates the image change amount MD as compared with a previously captured image according to the equation 1 (step S4). The CPU 206 determines whether the image capture mode is a moving image mode or a still image mode (step S5). In the initialized state, the image capture mode is set to the moving image mode. The CPU 206 therefore determines that the image capture mode is the moving image mode in the initialized state, and copies the image data of the moving image stored in the memory 201 to a predetermined area of the memory 201 (step S6) so that the captured moving image will be projected. In response to this, the display device 202 reads the captured image data from the memory 201 and outputs an RGB signal to the projector 2. The projector 2 projects an image based on the RGB signal.

The CPU 206 compares the preset threshold Thresh 1 with the image change amount MD calculated at step S4 and determines whether there is any change in the image based on the comparison result (step S7).

At this step, if the user is still doing some operation such as placing the sheet or the like, the image change amount MD is not smaller than the threshold Thresh 1. In this case, the CPU 206 determines that there is a change in the image (step S7; Yes), resets the still time Ptime (step S21), and returns to step S3. Because of this, while the user is doing the operation, the captured image projection apparatus maintains the moving image mode and a low-resolution moving image is projected on the screen 3.

After this, when the user finishes setting the sheet and there is no longer any change in the image, the image change amount MD is smaller than the threshold Thresh 1. In this case, the CPU 206 determines that there is no change in the image (step S7; No). The CPU 206 determines whether the still time Ptime is 0 or not (step S8). In a case where determining that the still time Ptime is 0 (step S8; Yes), the CPU 206 sets a preparatory image process request (step S9). When the preparatory image process request signal is set, a preparatory image process is started in a different task from the task in which the basic projection process is executed. On the other hand, in a case where it is determined that the still time Ptime is not 0 (step S8; No), the process of step S9 is skipped and the preparatory image process is not started.

Next, the CPU 206 adds 1 to the still time Ptime (step S10), and determines whether the still time Ptime reaches the predetermined time HoldTime (step S11). In a case where determining that the still time Ptime does not reach the predetermined time HoldTime (step S11; No), the CPU 206 returns to step S3. That is, the CPU 206 sets the preparatory image process request signal only once when there is no longer any change in the image.

On the other hand, in a case where determining that the still time Ptime reaches the predetermined time HoldTime (step S11; Yes), the CPU 206 determines that the user has fixed the sheet, and sets the image capture mode to the still image mode (step S12 in FIG. 6).

The CPU 206 controls the image sensor 102 to capture a high-resolution still image (step S13). The CPU 206 writes the image data captured by the image sensor 102 in the memory 201. After this, the CPU 206 returns the camera section 11 to the low-resolution image reading mode (step S14). During these procedures, the CPU 206 is executing the preparatory image process in a different task, so the CPU 206 waits for the preparatory image process to be completed while looping around the basic projection process (step S15; No).

The content of the preparatory image process executed in a different task will now be explained with reference to the flowchart shown in FIG. 8. The CPU 206 waits until the preparatory image process request signal is set in the basic projection process while looping around the preparatory image process (step S31; No). When the preparatory image process request signal is set (step S31; Yes), the CPU 206 determines that there is no change in the image, and clears the set preparatory image process request signal and clears a preparatory image process completion signal representing that the preparatory image process is completed (step S32).

Next, the CPU 206 executes a projection parameter extraction process (step S33). In the projection parameter extraction process, the CPU 206 controls the image processing device 203 to extract a projection parameter for performing oblique correction on the low-resolution image. The projection parameter indicates the relationship between the shape of the image of the script paper 4 and the actual shape of the script paper 4.

Next, the CPU 206 again determines whether a preparatory image process request signal is set in the basic projection process (step S34). In a case where a preparatory image process request signal is set (step S34; Yes), the CPU 206 returns to step S31. Because of this, the CPU 206 can quickly move to the next preparatory image process by skipping the succeeding processes, in a case where there again occurs a change in the image.

On the other hand, in a case where no preparatory image process request signal is set (step S34; No), the CPU 206 executes an image transformation process (step S35). In the image transformation process, the CPU 206 performs extraction of the shooting object and projective transformation thereof into an image of the object as seen from a position in front of it (referred to as front seen image) based on the projection parameter extracted at step S33.

The CPU 206 again determines whether a preparatory image process request signal is set (step S36). In a case where no preparatory image process request signal is set (step S36; No), the CPU 206 executes an image effect correction parameter extraction process. In the image effect correction parameter extraction process, the CPU 206 extracts an image effect correction parameter such as for contrast correction for transforming the object image into a vivid and visible image, from the corrected image generated at step S35 (step S37).

The CPU 206 again determines whether a preparatory image process request signal is set (step S38). In a case where no preparatory image process request signal is set (step S38; No), the CPU 206 changes a scale for the image effect correction parameter which scale is extracted at step S33 from a scale for low-resolution image to one for high-resolution image (step S39). After this, the CPU 206 sets the preparatory image process completion signal (step S40), and terminates the preparatory image process.

In this way, the CPU 206 can extract a projection parameter and an image effect correction parameter from a low-resolution image before capturing of a high-resolution image is started.

Figure 6:
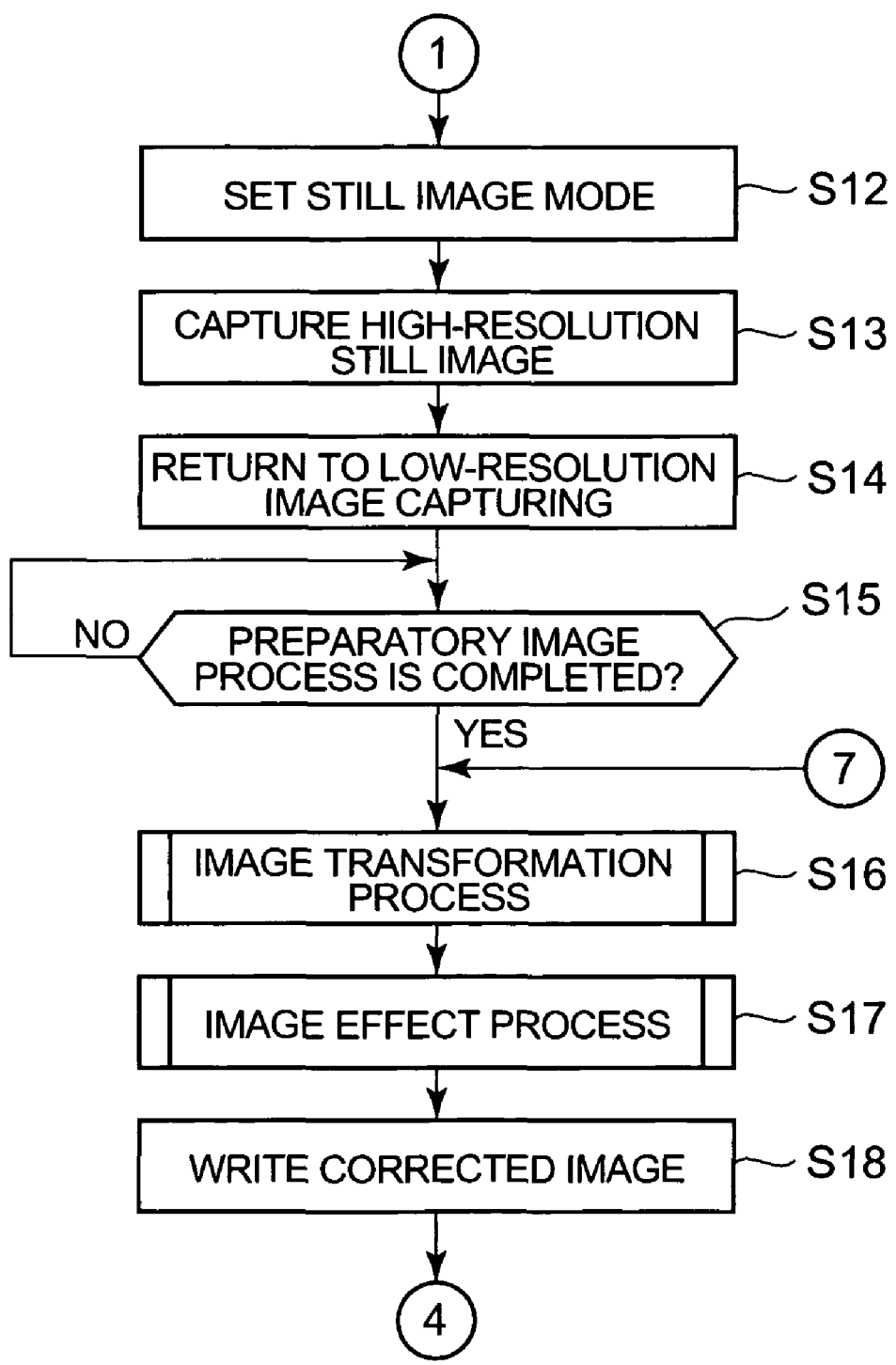

When the preparatory image process completion signal is set in the preparatory image process, the CPU 206 determines that the preparatory image process is completed in the basic projection process shown in the flowchart of FIG. 6 (step S15; Yes), and executes an image transformation process (step S16). In this image transformation process, the CPU 206 performs extraction of the quadrangular captured image and projective transformation thereof into a front seen image based on the projection parameter extracted at step S33.

Further, the CPU 206 executes an image effect process by using the image effect correction parameter extracted at step S37 (step S17).

In this way, the CPU 206 can execute the image transformation process and image effect process for the high-resolution image by using the projection parameter and image effect correction parameter which have been extracted for subjecting the low-resolution image to the image transformation process and image effect process.

Then, in order that the image data which has been subjected to the image effect process may be projected, the CPU 206 writes the corrected image data in a predetermined area of the memory 201 likewise having written the moving image. The CPU 206 controls the display device 202 to output the image data to the projector 2 in the form of an RGB signal (step S18). After this, the CPU 206 returns to step S3 of FIG. 5.

Once the still image mode is entered, the CPU 206 again reads a low-resolution image (step S3), and calculates the image change amount MD (step S4).

In a case where determining that the image capture mode is the still image mode (step S5; No), the CPU 206 compares the calculated image change amount MD with the other threshold Thresh 2 (Thresh 1<Thresh 2), and determines whether there is any change in the image (step S19 of FIG. 7).

In a case where the image change amount MD is not smaller than the threshold Thresh 2, the CPU 206 determines that there is a change in the image (step S19; Yes) and sets the image capture mode to the moving image mode (step S20). Then, the CPU 206 resets the still time Ptime (step S21) and returns to step S3 of FIG. 5.

Figure 7:
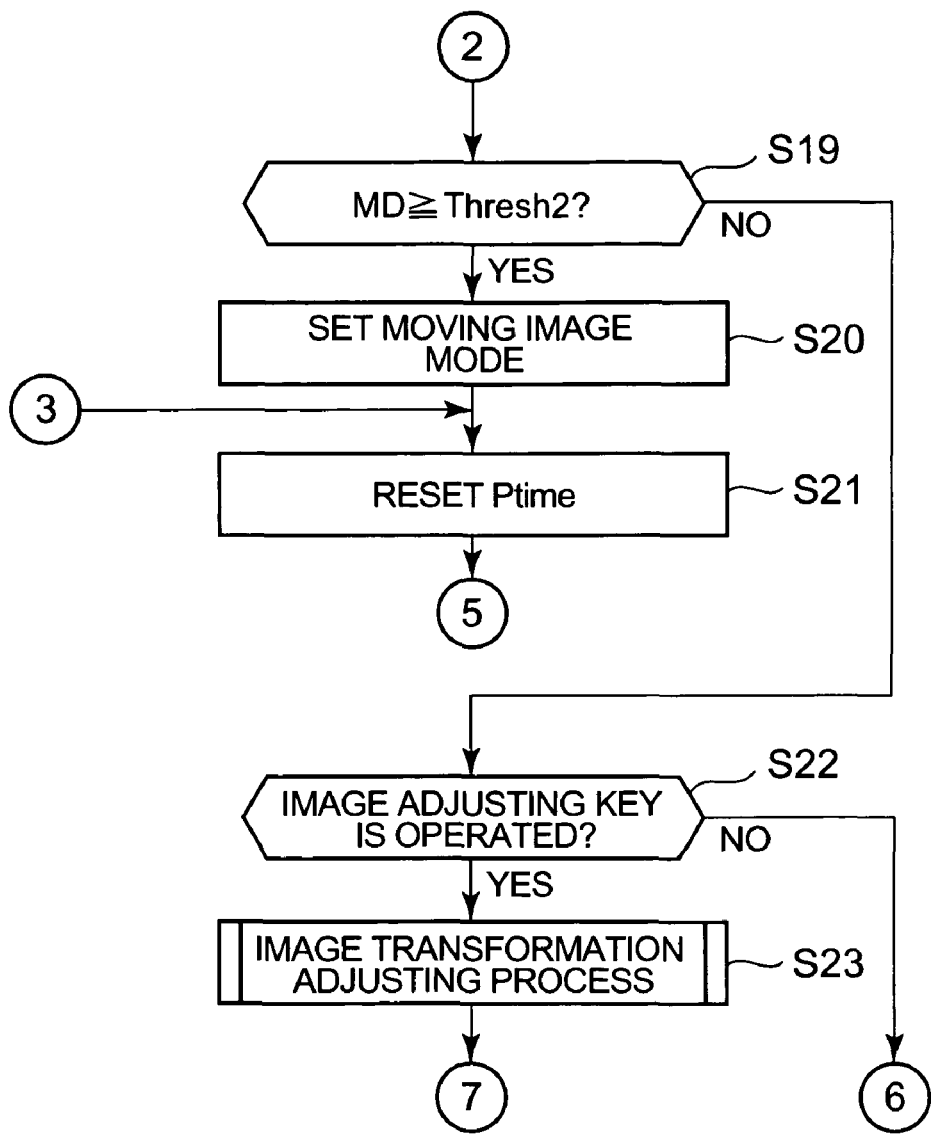

On the other hand, in a case where the image change amount MD is smaller than the threshold Thresh 2, the CPU 206 determines that there is no change in the image (step S19 of FIG. 7; No). In this case, the CPU 206 determines whether an image adjusting key is operated or not based on operation information output from the operation section 204 as instruction information for performing adjustment of image effect (step S22).

In a case where determining that an image adjusting key is not operated (step S22; No), the CPU 206 returns to step S3 of FIG. 5.

On the other hand, in a case where determining that an image adjusting key is operated (step S22 of FIG. 7; Yes), the CPU 206 executes an image transformation adjusting process (step S23). In the image transformation adjusting process, the CPU 206 performs adjustment for image transformation such as expansion, rotation, etc. of the image.

The CPU 206 determines whether the image transformation is projective transformation, rotation, etc. or expansion/reduction and move of the image. In a case where determining that the image transformation is projective transformation, rotation, etc., the CPU 206 controls the image processing device 203 to again extract a image effect correction parameter and executes the image effect process (step S17 of FIG. 6). On the other hand, in a case where determining that the image transformation is expansion/reduction and move of the image, the CPU 206 executes the image effect process (step S17) by using the image effect correction parameter previously extracted from the image at step S37. Then, the CPU 206 controls the display device 202 to output the image data to the projector 2 in the form of an RGB signal (step S18).

In this way, the CPU 206 performs projection control by switching between the moving image mode and the still image mode. Because of this, image projection at a higher frame frequency is performed while the user is doing some operation, whereas extraction of the shooting-object script paper 4 and image effect process thereof and then projection of a high-resolution image are performed when the image becomes still.

Next, the image process executed by the image processing device 203 will be explained. First, the basic idea of (how to perform) affine transformation used in the image process by the image processing device 203 will be explained.

Affine transformation is widely used for spatial transformation of an image. In the present embodiment, projective transformation is performed not by using a three-dimensional camera parameter but by using two-dimensional affine transformation. According to affine transformation, a point at coordinates (u, v) before transformation and a point at coordinates (x, y) after transformation are related by the following equation 2 expressing transformation such as move, expansion/reduction, rotation, etc. Projective transformation can also be performed by affine transformation.

$$(x', y', z') = (u, v, 1)\begin{pmatrix} a_{11} & a_{12} & a_{13} \\ a_{21} & a_{22} & a_{23} \\ a_{31} & a_{32} & a_{33} \end{pmatrix}$$ [Equation 2]

The ultimate coordinates (x, y) can be derived based on the following equations 3.

$$x = \frac{x'}{z'} = \frac{a_{11}u + a_{21}v + a_{31}}{a_{13}u + a_{23}v + a_{33}}$$ [Equations 3]

$$y = \frac{y'}{z'} = \frac{a_{12}u + a_{22}v + a_{32}}{a_{13}u + a_{23}v + a_{33}}$$

The equations 3 are formulae for projective transformation. The coordinates (x, y) degenerate toward 0 depending on the value of z'. In other words, the parameters included in z' affects the projection. The parameters included in z' are $a_{13}$, $a_{23}$, and $a_{33}$. Or, assuming $a_{33}$ as 1, the other parameters may be normalized by the parameter $a_{33}$.

Figure 9A:
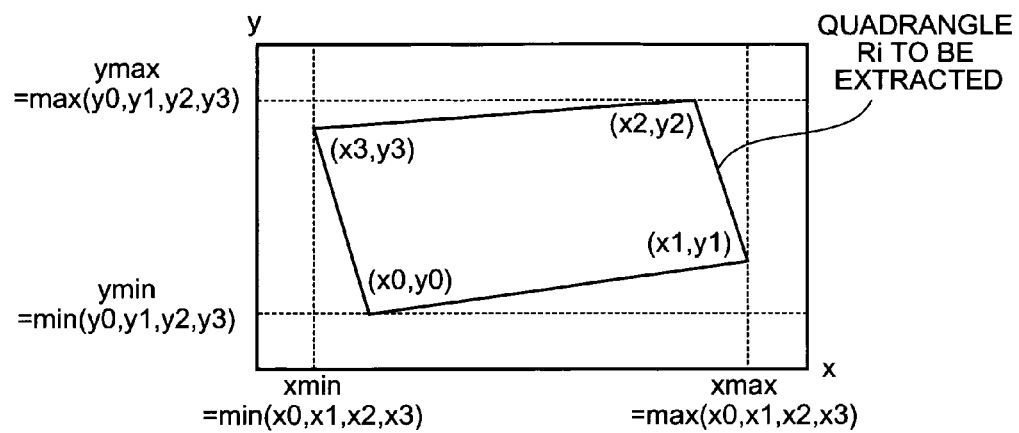
FIGS. 9A and 9B are diagrams for explaining an extraction process performed by the image processing device shown in FIG. 2.
Figure 9B:
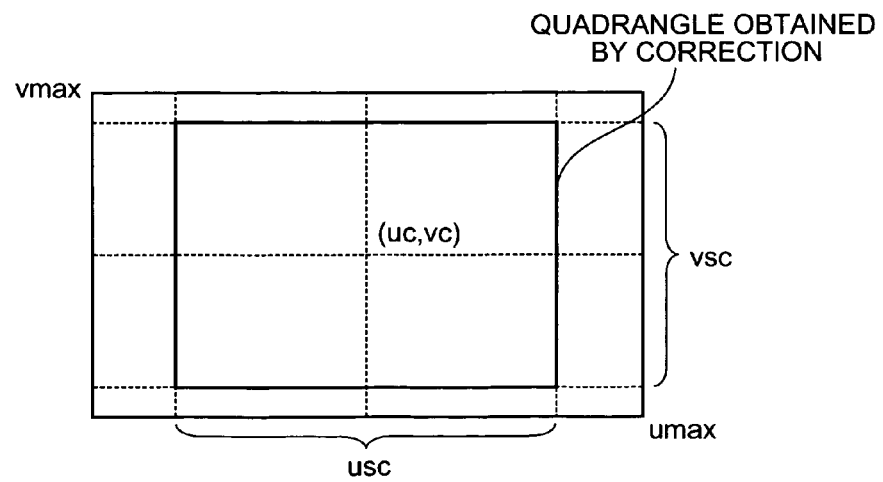
Figure 10:
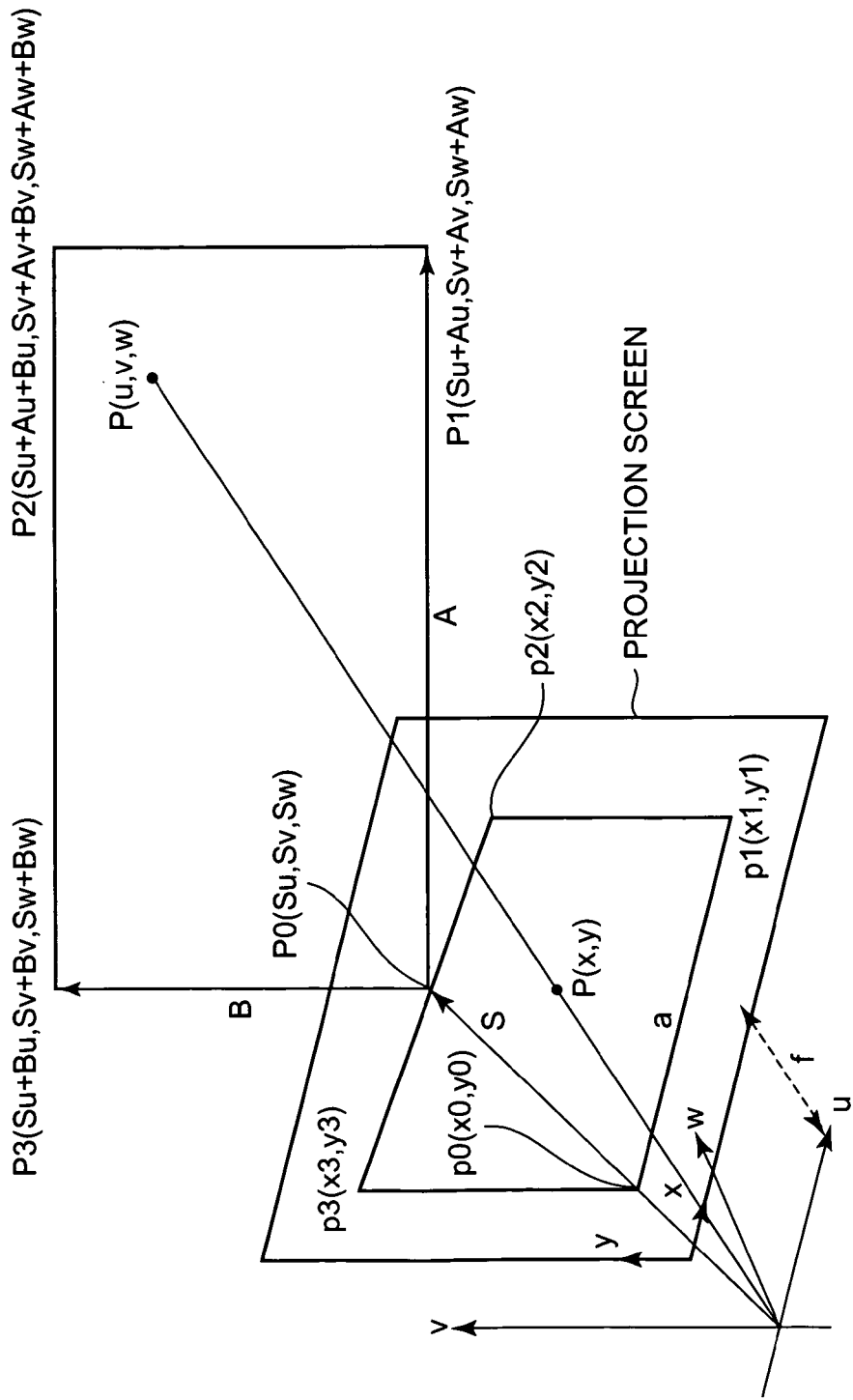
FIG. 10 is a diagram for explaining the basic idea of affine parameter extraction and affine transformation.

FIG. 9A is a diagram showing the coordinates of each vertex of the quadrangular script paper 4 shown in FIG. 3A and FIG. 9B is a diagram showing the coordinates of each vertex of the quadrangular script paper 4 shown in FIG. 3B. FIG. 10 is a diagram for explaining the relationship between the quadrangle captured by the camera section 11 and the actual script paper 4.

In FIG. 10, the U-V-W coordinate system is a three-dimensional coordinate system of the image captured by shooting of the camera section 11. A vector A (Au, Av, Aw) and a vector B (Bu, Bv, Bw) are vector representation of the sheet of the script paper 4 in the three-dimensional coordinate system U-V-W. A vector S (Su, Sv, Sw) indicates the distance between the origin of the three-dimensional coordinate system U-V-W and the script paper 4.

The projection screen shown in FIG. 10 is used for projecting the image of the script paper 4 (i.e., corresponding to the screen 3). Assuming that the coordinate system on the projection screen is represented by (x, y), it is safe to consider that the image to be projected on the projection screen is the image captured by the camera section 11. The projection screen stands perpendicularly to the W axis at a distance f which is apart from the origin in the positive direction on the W axis. Assume that an arbitrary point P (u, v, w) on the sheet of the script paper 4 is connected to the origin by a straight line, and the X-Y coordinates of the intersection of the straight line and projection screen is p(x, y). In this case, the coordinates p are expressed by the following equations 4 by projective transformation.

$$\begin{cases} x = u\dfrac{f}{w} \\ y = v\dfrac{f}{w} \end{cases}$$ [Equations 4]

Based on the equations 4, the relationships represented by the following equations 5 are derived from the relationship between the points P0, P1, P2, and P3, and the projection points p0, p1, p2, and p3 on the projection screen as shown in FIG. 10.

$$\begin{cases} S_u = k_1 \cdot x_0 \\ S_v = k_1 \cdot y_0 \\ S_w = k_1 \cdot f \end{cases}$$ [Equations 5]

$$\begin{cases} A_u = k_1 \cdot \{x_1 - x_0 + \alpha \cdot x_1\} \\ A_v = k_1 \cdot \{y_1 - y_0 + \alpha \cdot y_1\} \\ A_w = k_1 \cdot \alpha \cdot f \end{cases}$$

$$\begin{cases} B_u = k_1 \cdot \{x_3 - x_0 + \beta \cdot x_3\} \\ B_v = k_1 \cdot \{y_3 - y_0 + \beta \cdot y_3\} \\ B_w = k_1 \cdot \beta \cdot f \end{cases}$$

where $k_1 = Sw/f$

In this case, the projection coefficients α and β are expressed by the following equations 6.

$$\alpha = \frac{(x_0 - x_1 + x_2 - x_3) \cdot (y_3 - y_2) - (x_3 - x_2) \cdot (y_0 - y_1 + y_2 - y_3)}{(x_1 - x_2) \cdot (y_3 - y_2) - (x_3 - x_2) \cdot (y_1 - y_2)}$$

$$\beta = \frac{(x_1 - x_2) \cdot (y_0 - y_1 + y_2 - y_3) - (x_0 - x_1 + x_2 - x_3) \cdot (y_1 - y_2)}{(x_1 - x_2) \cdot (y_3 - y_2) - (x_3 - x_2) \cdot (y_1 - y_2)}$$

[Equations 6]

Next, projective transformation will be explained.

An arbitrary point P on the script paper 4 is expressed by the following equation 7 by using the S, A, and B vectors.

$$P = S + m \cdot A + n \cdot B \quad \text{[Equation 7]}$$

where m: coefficient of A vector ($0 \leq m \leq 1$)
n: coefficient of B vector ($0 \leq n \leq 1$)

When the equations 5 are assigned to the equation 7, the coordinates x and y are expressed by the following equations 8.

$$x = \frac{m \cdot (x_1 - x_0 + \alpha \cdot x_1) + n \cdot (x_3 - x_0 + \beta \cdot x_3) + x_0}{1 + m \cdot \beta + n \cdot \alpha}$$

$$y = \frac{m \cdot (y_1 - y_0 + \alpha \cdot y_1) + n \cdot (y_3 - y_0 + \beta \cdot y_3) + y_0}{1 + m \cdot \beta + n \cdot \alpha}$$

[Equations 8]

If these relationships are assigned to the equation of affine transformation, the coordinates (x', y', z') are expressed by the following equation 9.

$$(x', y', z') = (m, n, 1) \begin{pmatrix} x_1 - x_0 + \alpha \cdot x_1 & y_1 - y_0 + \alpha \cdot y_1 & \alpha \\ x_3 - x_0 + \beta \cdot x_3 & y_3 - y_0 + \beta \cdot y_3 & \beta \\ x_0 & y_0 & 1 \end{pmatrix}$$

[Equations 9]

The point (x, y) corresponding to the captured image can be obtained by assigning m and n to the equation 9. Since the corresponding point (x, y) does not necessarily take integers, the values of the pixel may be obtained by using image interpolation or the like.

Figure 8:
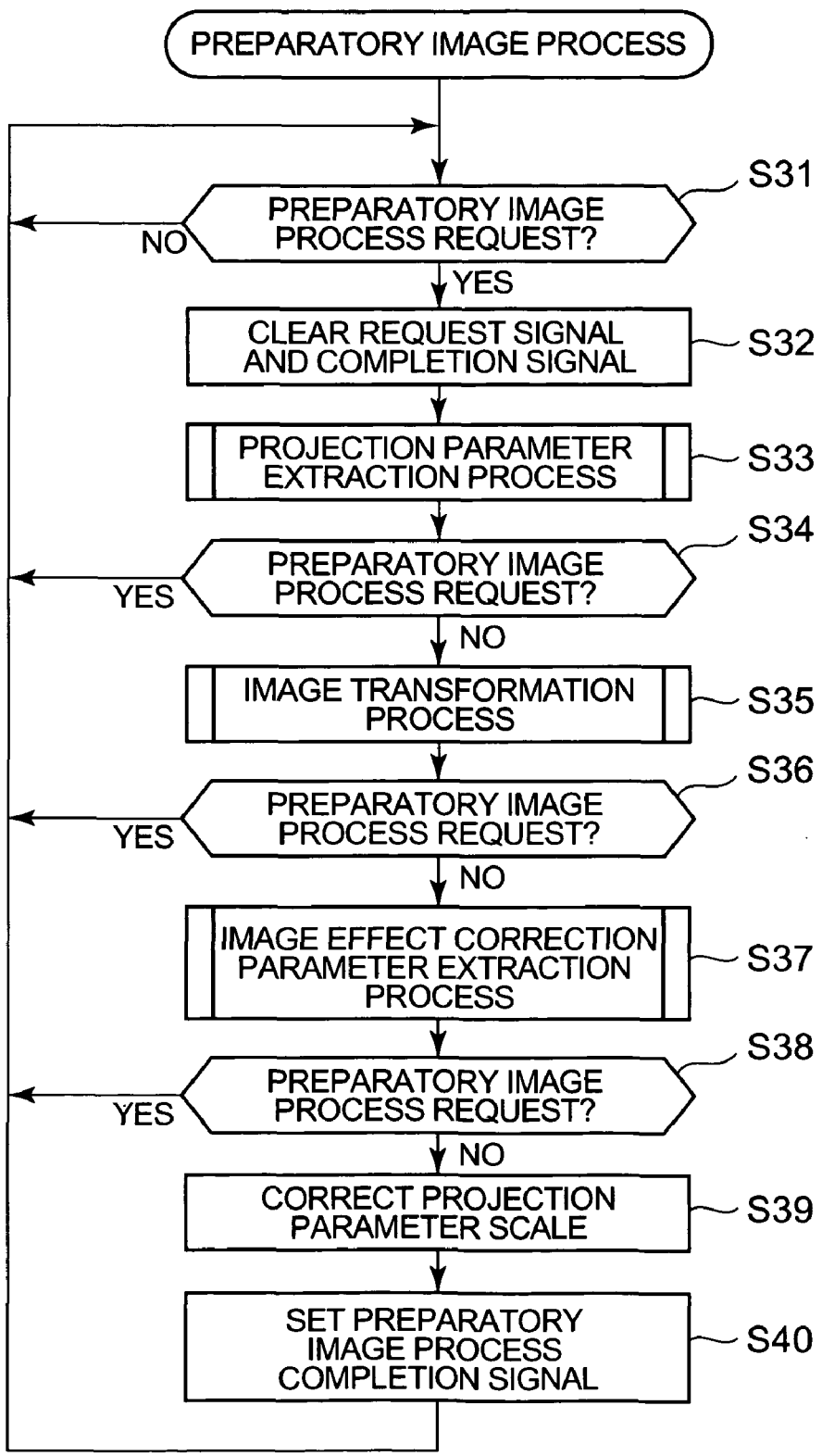
FIG. 8 is a flowchart showing a preparatory image process.
Figure 11:
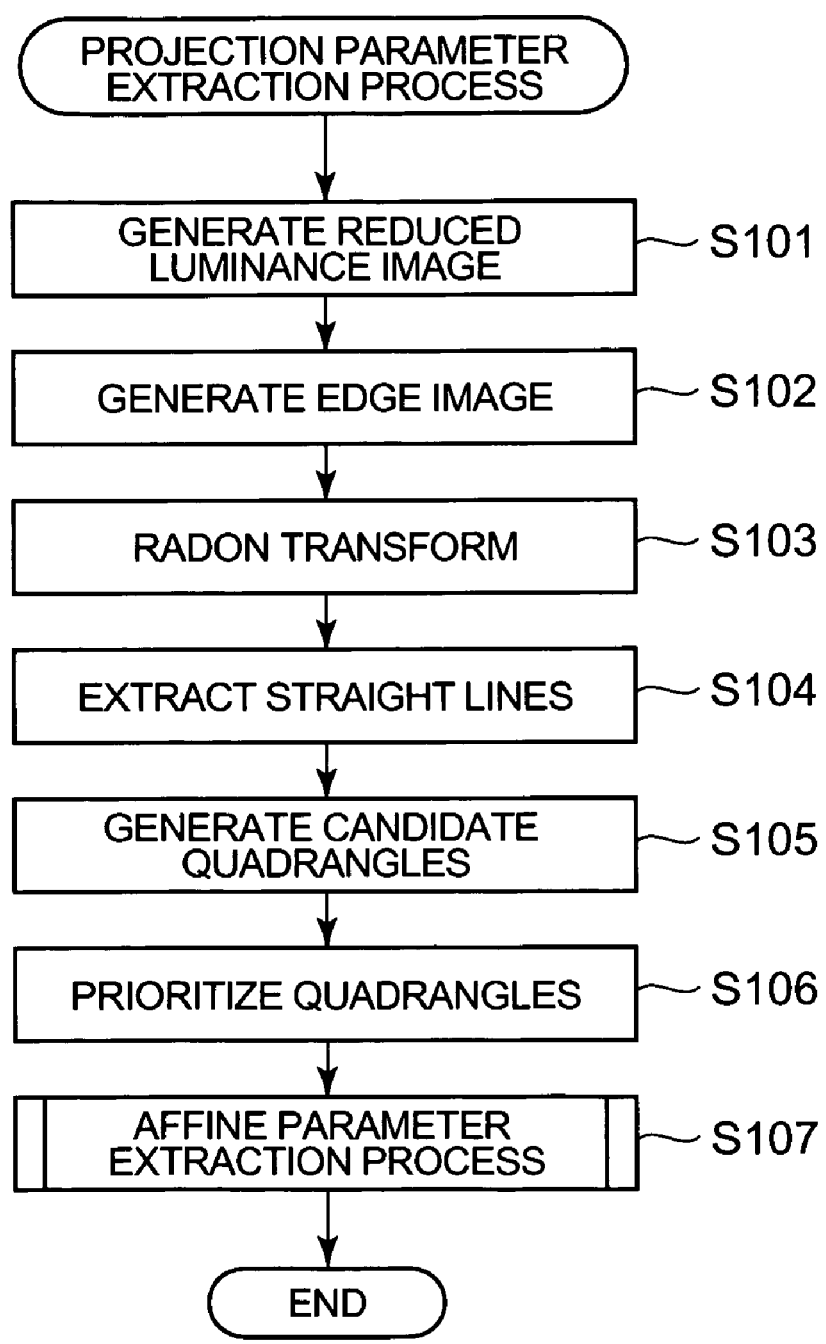
FIG. 11 is a flowchart specifically showing a projection parameter extraction process shown in FIG. 8.

To perform such affine transformation, the CPU 206 extracts a projection parameter from the captured image of the script paper 4 (step S33 of FIG. 8). FIG. 11 is a flowchart specifically showing the projection parameter extraction process executed at step S33.

In the projection parameter extraction process, the CPU 206 controls the image processing device 203 to generate a reduced luminance image from the input image in order to reduce the number of calculations required in the image process (step S101). The CPU 206 generates an edge image showing the edges of the scrip paper 4 from the generated reduced luminance image (step S102), and performs Radon transform of the generated edge image (step S103).

The CPU 206 detects a peak value from the data obtained by Radon transform, thereby extracting straight line parameters included in the edge image from the edge image of the script paper 4 (step S104). The CPU 206 generates a candidate quadrangle that may possibly form the contour of the script paper 4 from the extracted straight line parameters (step S105).

In this way, the CPU 206 generates a candidate quadrangle, and gives a priority order to each generated quadrangle (step S106). The CPU 206 selects a quadrangle in the order of the priority. In a case where the selected quadrangle can be extracted, the CPU 206 obtains the extracted quadrangle as the shape of the image of the script paper 4. In a case where no quadrangle can be extracted, the CPU 206 obtains an image showing a quadrangle having the largest area, as the shape of the image of the script paper 4.

The CPU 206 then executes an affine parameter extraction process (step S107). In the affine parameter extraction process, the CPU 206 calculates affine parameters from the vertexes of the quadrangle obtained at step S106.

Next, the affine parameter extraction process will be more specifically explained. An example of the reduced luminance image generated by the CPU 206 by controlling the image processing device 203 is shown in FIG. 12A. The image processing device 203 generates an edge image as shown in FIG. 12B from such a reduced luminance image by using an edge detection filter called Roberts filter (step S102). According to the Roberts filter, two sets of four neighboring pixels are weighted to obtain two filters Δ1 and Δ2, and an edge of an image is detected by taking average of the two filters.

FIG. 13A shows the coefficients of the filter Δ1 and FIG. 13B shows the coefficients of the filter Δ2. When the coefficients of the two filters Δ1 and Δ2 are applied to the pixel values f(x, y) of given coordinates (x, y), the pixel values g(x, y) after transformation are expressed by the following equations 10.

$$g(x, y) = \sqrt{(\Delta 1)^2 + (\Delta 2)^2}$$

$$\Delta 1 = 1 \cdot f(x, y) + 0 \cdot f(x+1, y) + 0 \cdot f(x, y-1) - 1 \cdot f(x+1, y-1)$$
$$= f(x, y) - f(x+1, y-1)$$

$$\Delta 2 = 0 \cdot f(x, y) + 1 \cdot f(x+1, y) - 1 \cdot f(x, y-1) + 0 \cdot f(x+1, y-1)$$
$$= f(x+1, y) - f(x, y-1)$$

[Equations 10]

where g(x, y): pixel values of coordinates (x, y) (after transformation)
f(x, y): pixel values of coordinates (x, y) (before transformation)

The edge image shown in FIG. 12B includes straight line parameters. The image processing device 203 detects straight line parameters from this edge image by performing Radon transform (step S103 and step S104).

Figure 14:
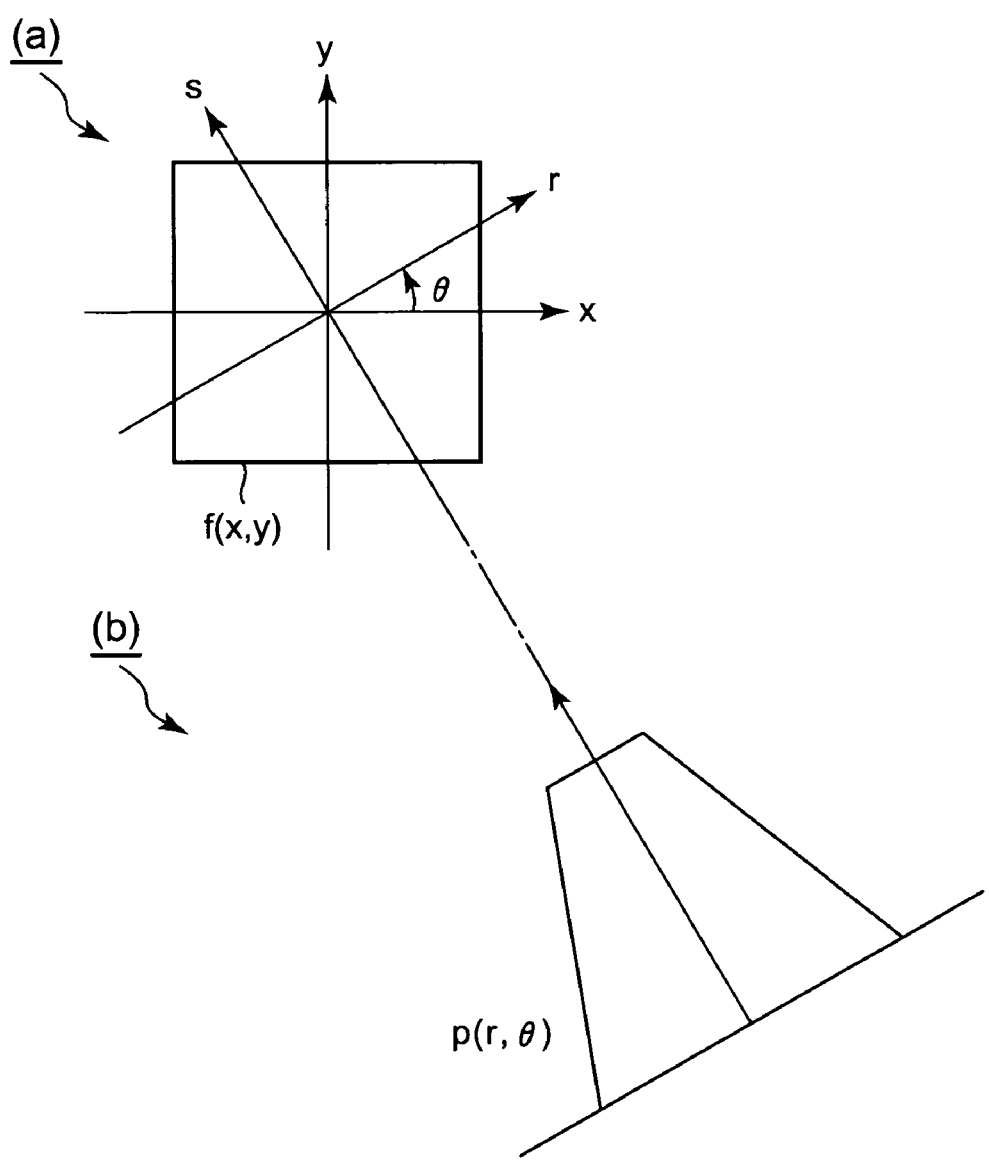
FIG. 14 is a diagram for explaining the principle of Radon transform.

Radon transform is an integral transform for transforming data of n order into projection data of (n−1) order. To explain more specifically, consider an r-θ coordinate system obtained by rotating an x-y coordinate system where image data f(x, y) exists by an angle θ, as shown in FIG. 14. Image projection data p(r, θ) in the θ direction is defined by the following equation 11.

$$p(r, \theta) = \int_{-\infty}^{\infty} f(r\cos\theta - s\sin\theta, r\sin\theta + s\cos\theta) ds$$

$$= \int_{-\infty}^{\infty} \int_{-\infty}^{\infty} f(x, y) \delta(x\cos\theta + y\sin\theta - r) ds$$

[Equation 11]

where δ( ): delta function of Dirac

Transformation according to the equation 11 is called Radon transform. Image data f(x, y) as shown in FIG. 14 is transformed into image projection data p(r, θ) as shown in FIG. 14 by Radon transform.

Figure 15:
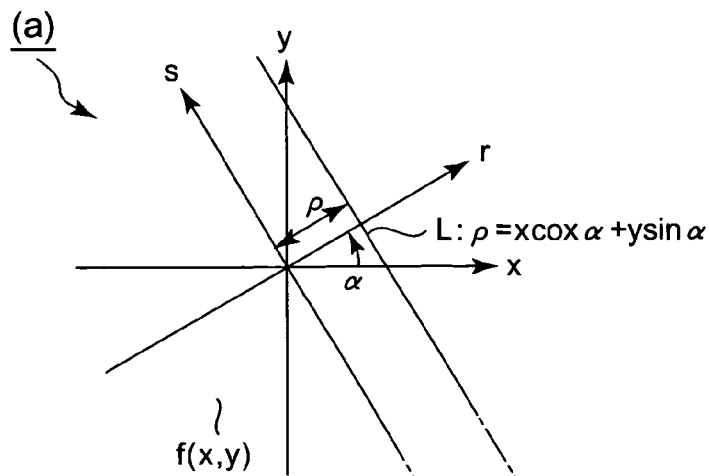
FIG. 15 is a diagram for explaining a process for performing Radon transform of a straight line in an X-Y coordinate system to obtain data in a polar coordinate system.

According to this Radon transform, a straight line L in an x-y coordinate system as shown in FIG. 15 is expressed as $\rho = x \cos \alpha + y \sin \alpha$ in a polar coordinate system. Since the straight line L is entirely projected on a point $p(\rho, \alpha)$, it is possible to detect a straight line by detecting the peak of $p(r, \theta)$. Utilizing this principle, the CPU 206 generates data $p(r, \theta)$ from the edge image by Radon transform.

Figure 16:
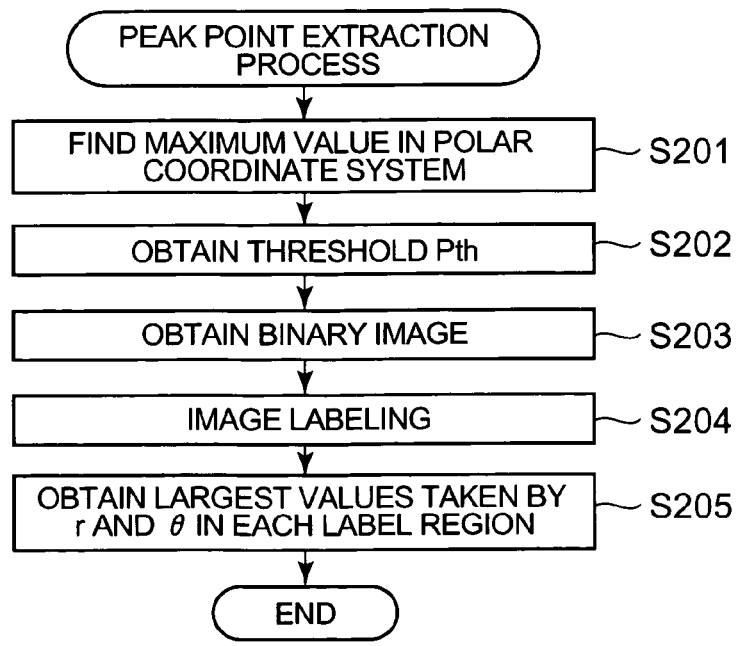
FIG. 16 is a flowchart showing a peak point extraction process.

Next, the CPU 206 extracts the peak point from the generated data $p(r, \theta)$. FIG. 16 is a flowchart specifically showing this peak point extraction process.

As shown in FIG. 16, in the peak point extraction process, the CPU 206 finds the maximum value pmax of the data $p(r, \theta)$ (step S201). The CPU 206 obtains a threshold Pth=pmax×k (k being a fixed number not smaller than 0 and not greater than 1), using the found maximum value pmax (step S202).

The CPU 206 generates a binary image $B(r, \theta)$ from $p(r, \theta)$ using Pth as a threshold (step S203). The CPU 206 performs labeling of the image $B(r, \theta)$. Labeling is a process for extracting masses of pixels each mass including pixels, among the pixels included in $p(r, \theta)$, that are not smaller than the threshold Pth as label regions, and assigning a label to each label region. The number of labels obtained in this process is represented by N1 (step S204).

The CPU 206 checks the largest values that are taken by r and $\theta$ of $p(r, \theta)$ in each label region. The CPU 206 obtains these largest values as ri and $\theta$i respectively (i=1 to N1) (step S205). These values are the parameters of straight lines.

Next, in order to generate candidate quadrangles using the detected straight line parameters (step S105), the CPU 206 excludes any quadrangle that is greatly distorted from candidates. This exclusion is based on the inference that since it is unlikely that the document camera 1 shoots the script paper 4 which is placed largely apart from the mount 13, the contour of the script paper 4 is not represented by a greatly distorted quadrangle.

Figure 17A:
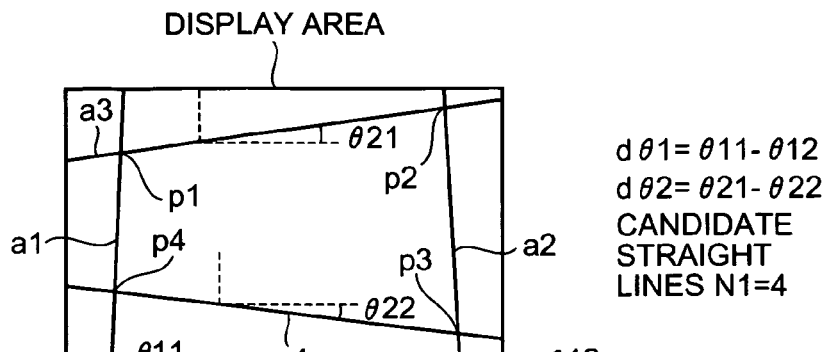
FIGS. 17A to 17D are diagrams for explaining a process for extracting a quadrangle from straight lines which have been extracted by detecting peak points.

In a case where an image captured by the camera section 11 is displayed by the display device 202 on a display area of an LCD (Liquid Crystal Display) as shown in FIG. 17A where four straight lines a1 to a4 and intersecting points p1 to p4 of the four straight lines a1 to a4 are displayed, the straight lines a1 to a4 are the candidates of straight lines that form a quadrangle.

Figure 17B:
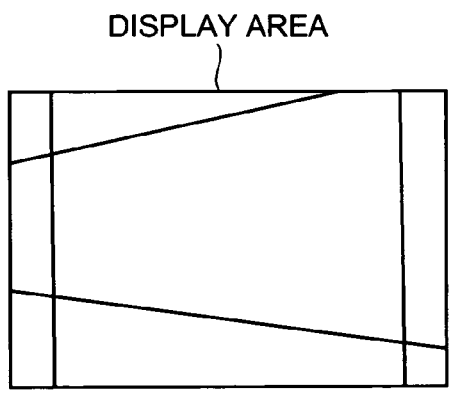
Figure 17C:
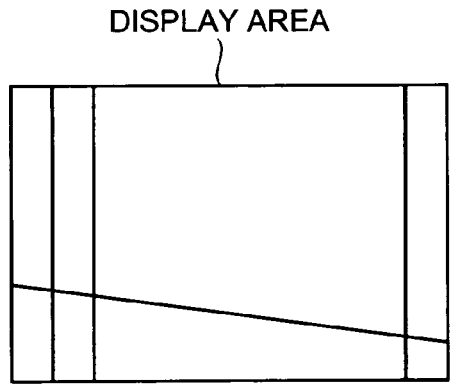

On the other hand, in a case where the number of straight lines displayed on the display area is less than 4 or in a case where the number of straight lines displayed on the display area is 4 but the number of intersecting points is less than 4 as shown in FIG. 17B and FIG. 17C, these groups of straight lines do not make candidate groups of straight lines that form a quadrangle.

Assume that the angles formed between the respective straight lines a1 to a4 and the lower hem of the display area are $\theta11, \theta12, \theta21$, and $\theta22$ respectively, as shown in FIG. 17A. In this case, the angle that is most similar to the angle $\theta11$ of the straight line a1 is the angle $\theta12$ of the straight line a2. It is therefore determined that the straight line a1 and the straight line a2 are ones that oppose to each other.

Figure 17D:
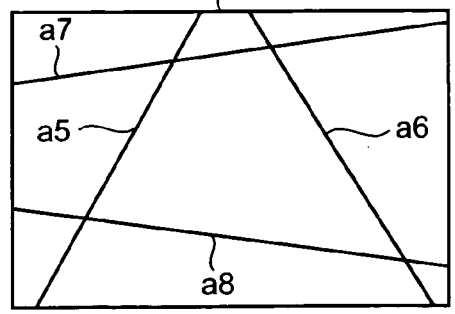

In a case where, as shown in FIG. 17D, the difference between the angles of a straight line a5 and straight line a6 that oppose to each other is large, the group of straight lines a5 to a8 is not a candidate group of straight lines that form a quadrangle, because it is unlikely that the document camera 1 shoots the script paper 4 which is placed apart from the mount 13. By measuring the angles of straight lines while the script paper 4 is placed on the mount 13, it is possible to determine whether the straight lines are ones that are based on the edges of the script paper 4. Assume that the differences between the angles of straight lines opposing to each other are $d\theta1$ and $d\theta2$ and thresholds $d\theta1th$ and $d\theta2th$ are previously set for the differences of angle $d\theta1$ and $d\theta2$ as referential differences of angle for determining whether straight lines form a candidate quadrangle. The thresholds $d\theta1th$ and $d\theta2th$ are stored in the memory 201.

Figure 18:
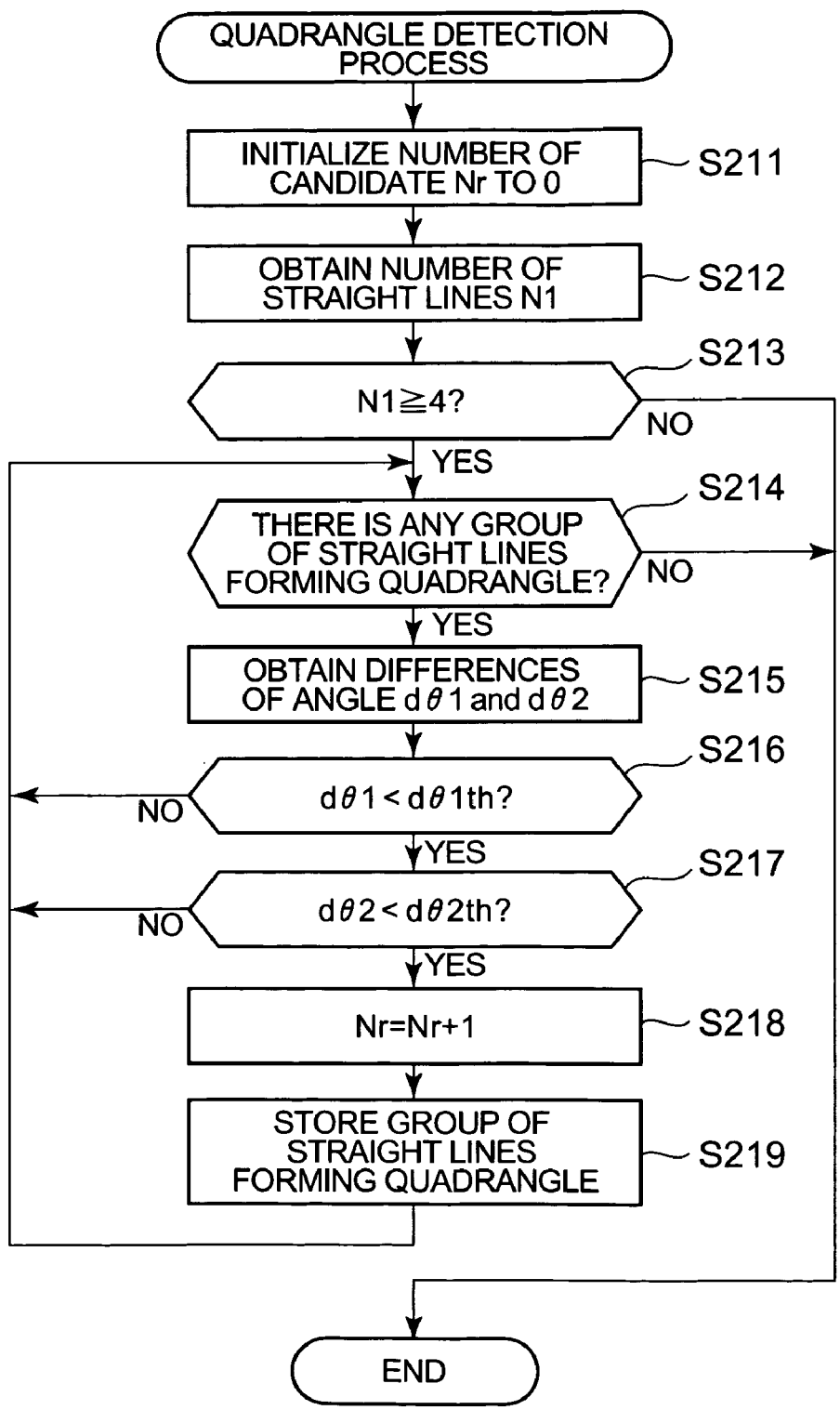
FIG. 18 is a flowchart showing a quadrangle detection process.

Based on such an idea, the CPU 206 obtains candidate quadrangles from a plurality of straight lines. FIG. 18 is a flowchart specifically showing this quadrangle detection process.

As shown in FIG. 18, in the quadrangle detection process, the CPU 206 first initializes a number of candidate quadrangles Nr to 0 (step S211). The CPU 206 obtains the number N1 representing the number of straight lines displayed on the display area (step S212), and determines whether the obtained number of straight lines N1 is 4 or greater (step S213).

In a case where determining that the obtained number of straight lines N1 is smaller than 4 (step S213; No), the CPU 206 terminates this process. In this case, the number of candidate quadrangles Nr is 0.

In a case where determining that the obtained number of straight lines N1 is 4 or greater (step S213; Yes), the CPU 206 determines whether there is any group of straight lines that form a quadrangle (step S214).

Even if there is such a group of straight lines but if the straight lines in the group do not have 4 intersecting points, the image processing device 203 determines that there is no group of straight lines that form a quadrangle (step S214; No) and terminates the process.

On the other hand, in a case where determining that there is a group of straight lines that form a quadrangle (step S214; Yes), the CPU 206 obtains the differences of angle $d\theta1$ and $d\theta2$ of the pairs of straight lines (step S215) and determines whether the obtained difference of angle $d\theta1$ is smaller than the preset threshold $d\theta1th$ (step S216).

In a case where determining that the difference of angle $d\theta1$ is not smaller than the threshold $d\theta1th$ (step S216; No), the CPU 206 returns to step S214 to repeat the process for the next candidate group of straight lines that form a quadrangle.

On the other hand, in a case where the difference of angle $d\theta1$ is smaller than the threshold $d\theta1th$ (step S216; Yes), the CPU 206 determines whether the difference of angle $d\theta2$ is smaller than the threshold $d\theta2th$ or not (step S217).

In a case where determining that the difference of angle $d\theta2$ is not smaller than the threshold $d\theta2th$ (step S217; No), the CPU 206 returns to step S14 to repeat the process for the next candidate group of straight lines that form a quadrangle.

On the other hand, in a case where determining that the difference of angle $d\theta2$ is smaller than the threshold $d\theta2th$ (step S217; Yes), the CPU 206 determines the obtained quadrangle having four intersecting points as a candidate, increments the number of candidate quadrangles Nr by 1 (step S218), and stores the number of candidate quadrangles in the memory 201.

The CPU 206 stores the group of straight lines that form the quadrangle in the memory 201 (step S219).

The CPU 206 sequentially performs the procedures of steps 214 to 219, and terminates the quadrangle detection process when determining that there is no next candidate group of straight lines that form a quadrangle (step S214; No).

Next, the CPU 206 selects a quadrangle that is most appropriate as a quadrangle which shows the edges of the script paper 4 from the candidate quadrangles. There are several manners of selection. In the present embodiment, a quadrangle that is outermost among the captured quadrangles is selected. An outermost quadrangle is one that has the largest area within a rectangle when the candidate quadrangles are enclosed by lines parallel with x and y axes to form the rectangle as shown in FIG. 9A.

When assumed that the coordinates of four vertexes of the rectangle Ri are (x0, y0), (x1, y1), (x2, y2), and (x3, y3), the area of the quadrangle Ri is expressed by the following equation 12.

$$Si = \{\max(x0, x1, x2, x3) - \min(x0, x1, x2, x3)\} * \quad \text{[Equation 12]}$$
$$\{(\max(y0, y1, y2, y3) - \min(y0, y1, y2, y3)\}$$

Figure 19:
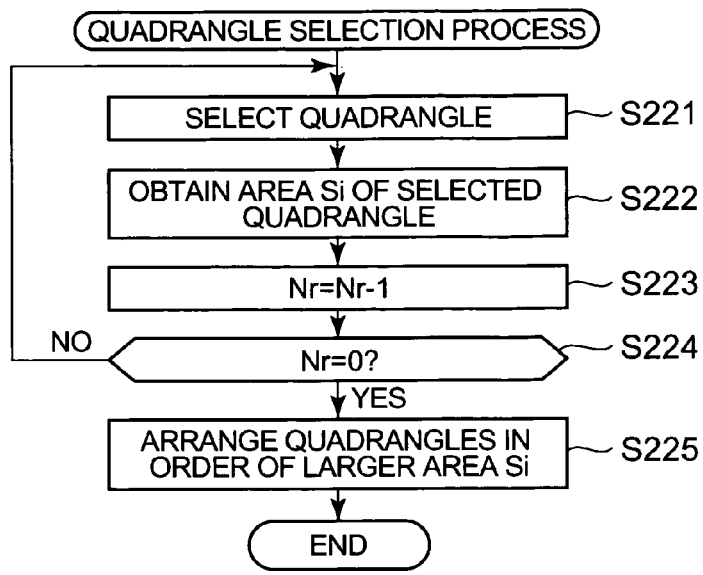
FIG. 19 is a flowchart showing a quadrangle selection process.

FIG. 19 is a flowchart specifically showing a quadrangle selection process. As shown in FIG. 19, in the quadrangle selection process, the CPU 206 selects any quadrangle from the candidate quadrangles existing in the number Nr (step S221), and calculates the area Si of the selected quadrangle according to the equation 12 (step S222).

The CPU 206 decrements the number of candidate quadrangles Nr (step S223), and determines whether the number of candidate quadrangles Nr is 0 or not (step S224).

In a case where determining that the number of candidate quadrangles Nr is not 0 (step S224; No), the CPU 206 returns to step 221.

In a case where determining that the number of quadrangles Nr is 0 (step S224; yes) as a result of repeating these procedures, the CPU 206 rearranges the data of the candidate quadrangles in the order of larger areas Si calculated (step S225).

The CPU 206 regards the first quadrangle as the most prioritized quadrangular contour. In this manner, when there are a plurality of candidate quadrangles, an outermost quadrangle having the largest area is selected in advance of any other. This is because the script paper 4 may include a quadrangular figure inside but no quadrangular figure should be found outside the script paper 4, and because it is expected that the contour of the user's shooting object be extracted since the user can easily adjust the zoom or shooting position even if a quadrangular table or the like comes into the sight of the camera.

Next, a manner of obtaining projection parameters (affine parameters) from the selected quadrangle will be explained. Affine parameters, which are the elements of the matrix expressed by the equation 9, are obtained according to the equations 6 and 8 by using the coordinates (x0, y0), (x1, y1), (x2, y2), and (x3, y3) of the four vertexes of the selected quadrangle.

In obtaining the affine parameters, the coordinate units are corrected because the scales of m and n are within the ranges of $0 \leq m \leq 1$ and $0 \leq n \leq 1$. The dimensions of the image as measured on the u axis and v axis are scaled by usc and usc respectively, without changing the center of the image. When assumed that the center of the image is represented by uc and vc, scale transformation of the image is expressed by the following equations 13.

$$u = m/usc + 0.5 - uc/usc$$
$$v = n/vsc + 0.5 - vc/vsc \quad \text{[Equations 13]}$$

When the equations 13 are rewritten into the u and v scales, the coordinates (x', y', z') of the quadrangle after transformation are expressed by the following equation 14.

$$(x', y', z') = (u, v, 1) \cdot Af \quad \text{[Equation 14]}$$

Af represents an affine transformation matrix. The affine transformation matrix Af is expressed by the following equation 15.

$$Af = \begin{pmatrix} 1/usc & 0 & 0 \\ 0 & 1/vsc & 0 \\ 0.5 - \frac{uc}{usc} & 0.5 - \frac{vc}{vsc} & 1 \end{pmatrix} \cdot \quad \text{[Equation 15]}$$

$$\begin{pmatrix} x_1 - x_0 - \alpha \cdot x_1 & y_1 - y_0 - \alpha \cdot y_1 & \alpha \\ x_3 - x_0 - \beta \cdot x_3 & y_3 - y_0 - \beta \cdot y_3 & \beta \\ x_0 & y_0 & 1 \end{pmatrix}$$

Each element of the affine transformation matrix Af is the affine parameter. An aspect ratio k of the quadrangle representing the relationship between the u axis and the v axis is expressed by the following equation 16, based on the equation 14 and the equation 15.

$$k = \quad \text{[Equation 16]}$$
$$\frac{|B|}{|A|} = \frac{\sqrt{(x_3 - x_0 + \beta \cdot x_3)^2 + (y_3 - y_0 + \beta \cdot y_3)^2 + (\beta \cdot f)^2}}{\sqrt{(x_1 - x_0 + \alpha \cdot x_1)^2 + (y_1 - y_0 + \alpha \cdot y_1)^2 + (\alpha \cdot f)^2}}$$

where f: camera parameter

In the case of the document camera 1, the focal length of the camera section 11 is normally designed to be the distance between the lens and the top of the mount 13 on which the script paper 4 is placed. Therefore, the focal length of the camera section 11 may be set to the distance between the camera section 11 and the script paper 4. In any case, as concerns the document camera 1, the focal length or the distance between the camera section 11 and the script paper 4 is a known value.

However, if the lens of the optical lens device 101 is a zoom lens, the focal length varies depending on the zoom position. In this case, focal length f corresponding to each zoom position may be pre-stored in the form of table or the like, so that the aspect ratio k=B/A (absolute value) can be calculated.

In a case where the maximum size of the image (screen) that can be output onto the screen 3 is given as (umax, vmax), uc and vc are represented by the following equations 17.

$$uc = umax/2$$
$$vc = vmax/2 \quad \text{[Equations 17]}$$

In a case where vmax/umax>k, and in a case where vmax/umax$\leq$k, an image having a desired aspect ratio k can be obtained by scaling the image according to the following equations 18 and equations 19 depending on the cases.

$$usc = umax$$
$$vsc = k*umax \quad \text{[Equations 18]}$$

$$usc = vmax/k$$
$$vsc = vmax \quad \text{[Equations 19]}$$

Figure 20:
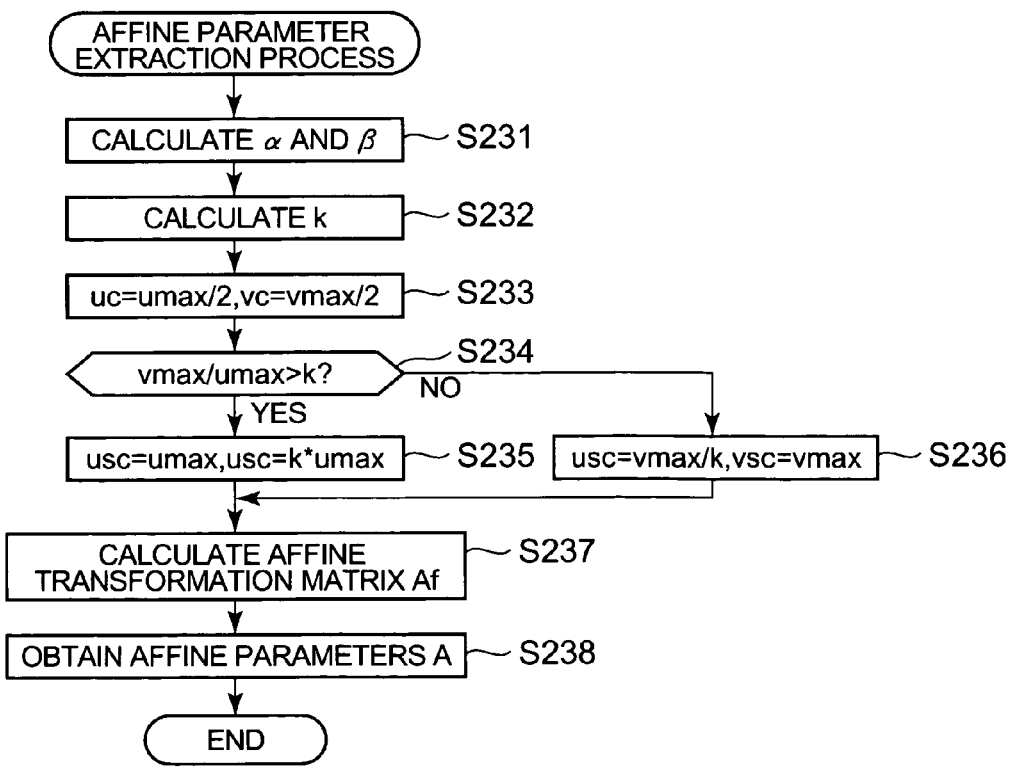
FIG. 20 is a flowchart specifically showing an affine parameter extraction process shown in FIG. 11.

Based on the idea described above, the CPU 206 derives affine parameters from the vertexes of the quadrangle. FIG. 20 is a flowchart specifically showing this affine parameter obtaining process.

The CPU 206 calculates the projection coefficients α and β from the coordinates (x0, y0), (x1, y1), (x2, y2), and (x3, y3)

of the four vertexes of the quadrangle according to the equation 6 (step S231). The CPU 206 calculates the aspect ratio k of the script paper 4 (step S232).

The CPU 206 designates the center point (uc, vc) of the image according to the equations 17 (step S233), and compares the maximum image size vmax/umax with the aspect ratio k expressed by the equation 16 (step S234).

In a case where vmax/umax>k (step S234; Yes), the CPU 206 determines that the maximum size vmax of the image on the v axis (vertical) is relatively larger than the size of the script paper 4, on the assumption that the aspect ratio k is unchangeable. The CPU 206 calculates usc and vsc according to the equations 18 and determines the v-axis scale of the image of the script paper 4 in a manner that the maximum size of the image on the u axis corresponds to the size of the script paper 4 (step S235).

In a case where vmax/umax≦k (step S234; No), the CPU 206 determines that the maximum size umax of the image on the u axis (horizontal) is relatively larger than the size of the script paper 4, on the assumption that the aspect ratio k is unchangeable. The CPU 206 calculates usc and vsc according to the equations 19 and determines the u-axis scale of the image of the script paper 4 in a manner that the maximum size of the image on the v axis corresponds to the size of the script paper 4 (step S236).

The CPU 206 obtains an affine transformation matrix Af from the calculated usc, vsc, uc and vc, and the coordinates (x0, y0), (x1, y1), (x2, y2), and (x3, y3) of the four vertexes of the quadrangle according to the equation 15 (step S237). The CPU 206 obtains the elements of the affine transformation matrix Af as affine parameters A (step S238).

Next, the manner of correction performed at step S39 for correcting the scale of the projection parameters will be explained. Assume that the ratio of image size between a low-resolution image and a high-resolution image is g. For example, in a case where a low-resolution image includes 640×480 dots and a high-resolution image includes 1280× 960 dots, the image size ratio g is "2".

In the projection parameter scale correction process at step S39, the coordinates (x0, y0), (x1, y1), (x2, y2), and (x3, y3) of the four vertexes of the quadrangle extracted from a low-resolution image are corrected to (x0*g, y0*g), (x1*g, y1*g), (x2*g, y2*g), and (x3*g, y3*g). In this manner, the CPU 206 corrects the scale of the projection parameters from the scale for a low-resolution image to the scale for a high-resolution image.

The CPU 206 executes the image transformation process of step S35 on a high-resolution image, by using projection parameters obtained from the corrected coordinates (x0*g, y0*g), (x1*g, y1*g), (x2*g, y2*g), and (x3*g, y3*g) of the four vertexes of the quadrangle.

Figure 21:
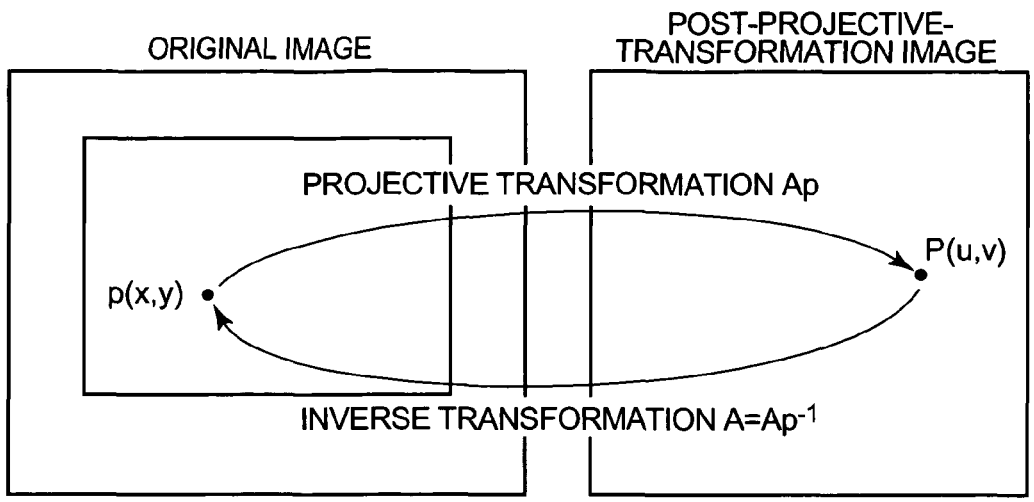
FIG. 21 is a diagram for explaining inverse transformation for obtaining an original image from an image after projective transformation.

Next, an image processing method for generating a corrected (transformed) image by using the obtained affine parameters will be explained. First, assume that a point p(x, y) on an original image corresponds to a point P(u, v) on a post-transformation image obtained by transformation using a transformation matrix Ap as shown in FIG. 21, in a case where projective transformation or other kind of affine transformation is performed by using affine parameters. In this case, it is preferred to obtain the point p(x, y) on the original image corresponding to the point P(u, v) on the post-transformation image rather than to obtain the point P on the post-transformation image corresponding to the point p on the original image.

To obtain the point P on the post-transformation image, an interpolation method according to bi-linear method is used. The interpolation method according to bi-linear method is a method for finding a coordinate point on one image (post-transformation image) corresponding to a coordinate point on the other image (original image) and obtaining the (pixel) value of the point P(u, v) on the post-transformation image from the (pixel) values of four points surrounding the coordinate point on the original image. According to this method, the pixel value P of the point P on the post-transformation image is calculated according to the following equation 20.

$$P(u, v) = \qquad\qquad\text{[Equation 20]}$$
$$(1-kx)*(1-ky)*p(X,Y) + kx*(1-ky)*p(X+1,Y) +$$
$$(1-kx)*ky*p(X,Y+1) + kx*ky*p(X+1,Y+1)$$

where on the assumption that the coordinates of the point p on the original image are given as p(x, y),
kx: the fractional portion of x
ky: the fraction portion of y
X: the integral portion (x)
Y: the integral portion (y)

Figure 22:
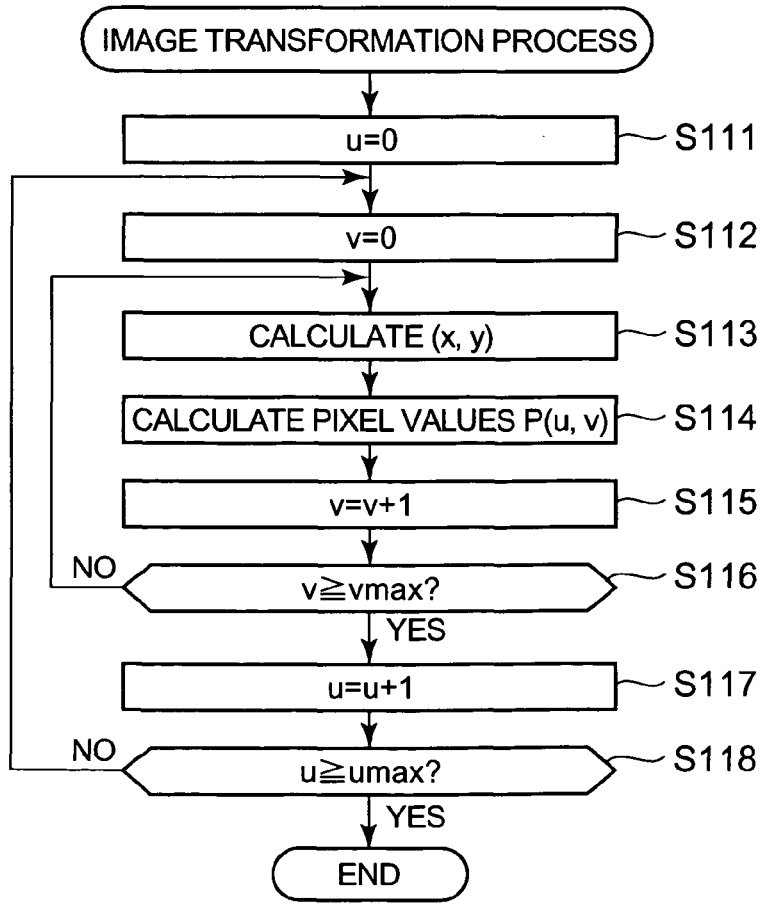
FIG. 22 is a flowchart specifically showing an image transformation process shown in FIG. 6.

In order to obtain the point p(x, y) on the original image corresponding to the point P(u, v) on the post-transformation image, the CPU 206 executes an image transformation process. FIG. 22 is a flowchart for specifically explaining the image transformation process.

The CPU 206 initializes the pixel position u on the post-transformation image to 0 (step S111), and initializes the pixel position v on the post-transformation image to 0 (step S112).

The CPU 206 assigns the pixel positions (u, v) on the post-transformation image to the equations 3 by using the affine parameters A in the equation 15, thereby obtaining the pixel positions (x, y) on the original image according to the equations 3 (step S113). Then, the CPU 206 obtains the pixel values P(u, v) from the obtained pixel positions (x, y) according to the equation 20 by using the bi-linear method (step S114).

The CPU 206 increments the coordinate v on the post-transformation image by 1 (step S115).

The CPU 206 compares the coordinate v on the post-transformation image with the maximum value vmax of the coordinate v to determine whether the coordinate v on the post-transformation image is not smaller than the maximum value vmax (step S116). In a case where determining that the coordinate v is smaller than the maximum value vmax (step S116; No), the CPU 206 returns to step S113.

After this, when determining that the coordinate v reaches the maximum value vmax as a result of repeating the procedures of steps S113 to S115 (step S116; Yes), the CPU 206 increments the coordinate u on the post-transformation image by 1 (step S117).

The CPU 206 compares the coordinate u with the maximum value umax of the coordinate u to determine whether the coordinate u is not smaller than the maximum value umax (step S118). In a case where the coordinate u is smaller than the maximum value umax (step S118; No), the CPU 206 returns to step S112.

When determining that the coordinate u reaches the maximum value umax as a result of repeating the procedures of steps S112 to S117 (step S118; Yes), the CPU 206 terminates this image transformation process.

A process of extracting image effect correction parameters from the image obtained in the above-described way, and an image effect process to be executed by using the extracted parameters will be explained. The image effect process is a process for achieving a clearer image.

Image effect correction parameters are variables necessary for the image effect process, including the maximum value, minimum value, and peak value of a luminance histogram, the peak value and average value of a color difference histogram, etc.

In order to extract image effect correction parameters, it is necessary to further extract a partial image showing a script content but not including the contour image from the entire image of the script paper 4 and then generate histograms of luminance and color difference. A process necessary for extracting image effect correction parameters will first be explained.

Figure 23:
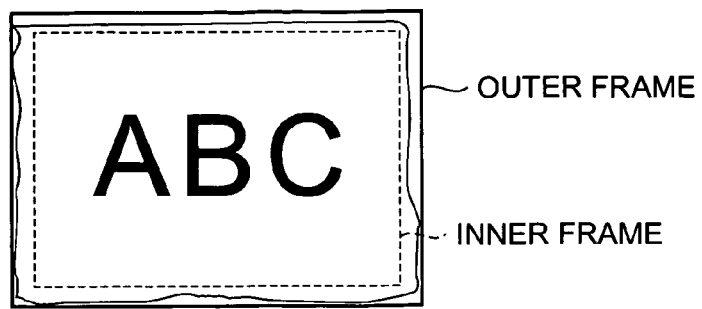
FIG. 23 is a diagram showing an example of image extracted by the image processing device shown in FIG. 2.

As shown in FIG. 23, there is a case where the image of the script paper 4 includes not only substantial images such as photographs, figures, characters, etc., but also images irrelevant to the contents of the script paper 4 such as the mount 13, a shadow of the sheet of the script paper 4, etc. An inner frame and an outer frame are set on the entire image. The portion within the inner frame including the substantial images of the script paper 4 is referred to as substantial script portion. The portion between the inner frame and the outer frame including the images of the mount 13 and shadow of the sheet of the script paper 4, etc. is referred to as peripheral portion. The contour image of the script paper 4 that is captured in the peripheral portion is generally black. In some case, it is preferable that data representing such a peripheral portion be included in the image data.

However, if a histogram is generated for the image of the script paper 4 including the peripheral portion, enlargement of the histogram may not work effectively.

Therefore, only for extracting image effect correction parameters, the image of the substantial script portion is extracted to generate a histogram of color difference, and the image effect process is performed on the entire image by using the image effect correction parameters extracted from the generated histogram. More effective parameters can be obtained in this manner.

Specifically, assume that the image data including the peripheral portion has M rows and N columns, and the number of dots between the inner frame and the outer frame is K as to both X and Y directions. In this case, pixel data for a row K to a row M-K corresponding to the substantial script portion is obtained on the X axis side and pixel data for a column K to a column N-K corresponding to the substantial script portion is obtained on the Y axis side. The pixel data of the substantial script portion includes (M−2*K) rows and (N−2*K) columns.

The CPU 206 controls the image processing device 203 to generate a luminance histogram and a color difference histogram for the extracted image showing the substantial script portion.

Figure 24A:
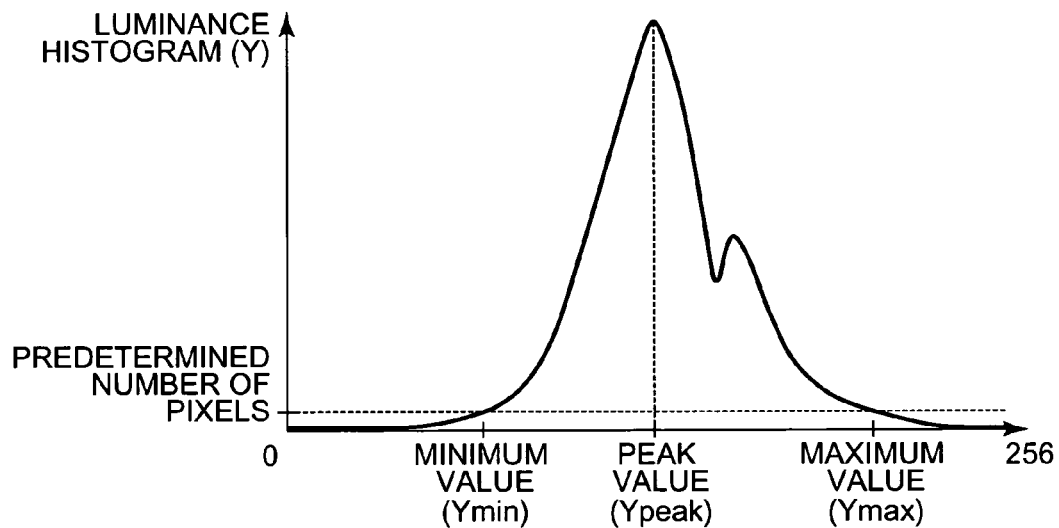
FIG. 24A is a diagram showing a luminance histogram.

A luminance histogram shows the distribution of luminance values (Y) existing in the substantial script portion, and is generated by counting the number of pixels in the substantial script portion for each luminance value. FIG. 24A shows one example of luminance histogram. In FIG. 24A, the horizontal axis represents the luminance value (Y) and the vertical axis represents the number of pixels. In order to correct the image effect, it is necessary to obtain the maximum value ($Y_{max}$), the minimum value ($Y_{min}$), and the peak value ($Y_{peak}$).

The maximum value is a value indicating the highest luminance among luminance values at which the number of pixels, which is counted for each luminance value, is not smaller than a predetermined number set in advance. The minimum value is a value indicating the lowest luminance among luminance values at which the counted number of pixels is not smaller than the predetermined number. The peak value is a luminance value at which the counted number of pixels is the largest. The peak value can be considered to show the luminance value of the background color of the shooting-object script paper 4.

Figure 24B:
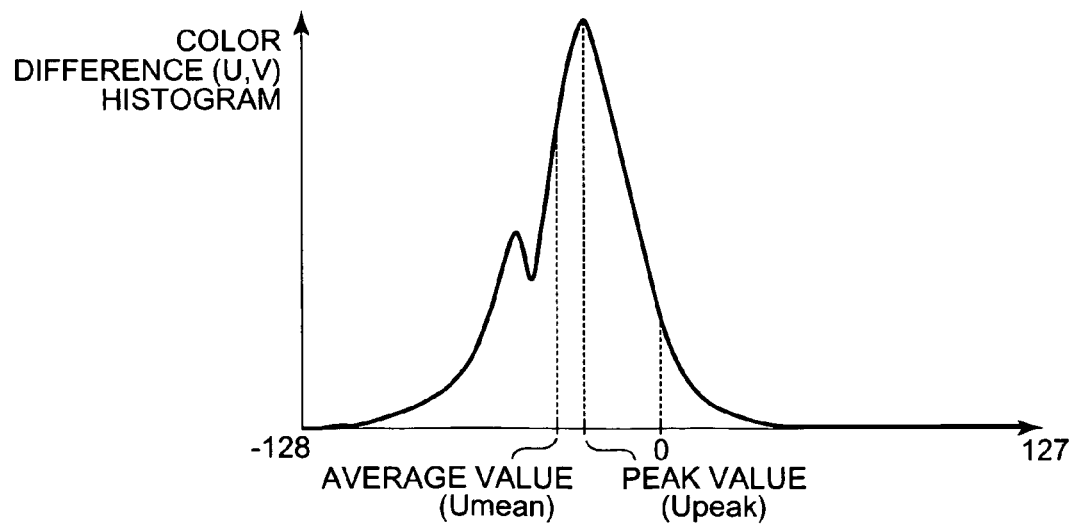
FIG. 24B is a diagram showing a color difference histogram.

A color difference histogram shows the distribution of color differences (U, V) existing in the substantial script portion, and is generated by counting the number of pixels in the substantial script portion for each color difference. FIG. 24B shows one example of color difference histogram. In FIG. 24B, the horizontal axis represents the color difference, and the vertical axis represents the number of pixels. Also in the case of color difference histogram, a peak value ($U_{peak}$, $V_{peak}$) at which the counted number of pixels is the largest appears. This peak value can also be considered to show the color difference of the background color of the script paper 4. In order to correct the image effect, it is necessary to obtain the peak value and average value ($U_{mean}$, $V_{mean}$) of the color difference histogram as the image effect correction parameters. The average value is a value of color difference having the average counted number.

Since the image effect works differently depending on the background color of the script paper 4, it is necessary to change the method of correcting the image effect depending on the background color of the script paper 4 to achieve an image excellent in visibility by correcting the image effect. Therefore, it is necessary to determine the background color of the script paper 4. The background color of the script paper 4 can be determined the peak values of both of the luminance histogram and the color difference histogram.

The background color of the script paper 4 is classified into 3 cases, namely a case of white background such as a whiteboard, a notebook, etc., a case of black background such as a blackboard, etc, and a case of other backgrounds such as a magazine, a pamphlet, etc. Specifically, the background color of the script paper 4 is determined according to the following determination equations.

The white determination condition is expressed by the following equation 21, and the background color of the script paper 4 is determined as white (W) when the condition expressed by the equation 21 is satisfied.

$$\text{White determination condition} = \quad [\text{Equation 21}]$$
$$(|U_{peak}| < \text{color threshold}) \,\&$$
$$(|V_{peak}| < \text{color threshold}) \,\&$$
$$(Y_{peak} > \text{white determination threshold})$$

The black determination condition is expressed by the following equation 22, and the background color of the script paper 4 is determined as black (B) when the condition expressed by the equation 22 is satisfied.

Black determination condition = [Equation 22]

(|Upeak| < color threshold) &

(|Vpeak| < color threshold) &

(Ypeak < black determination threshold)

Figure 25:
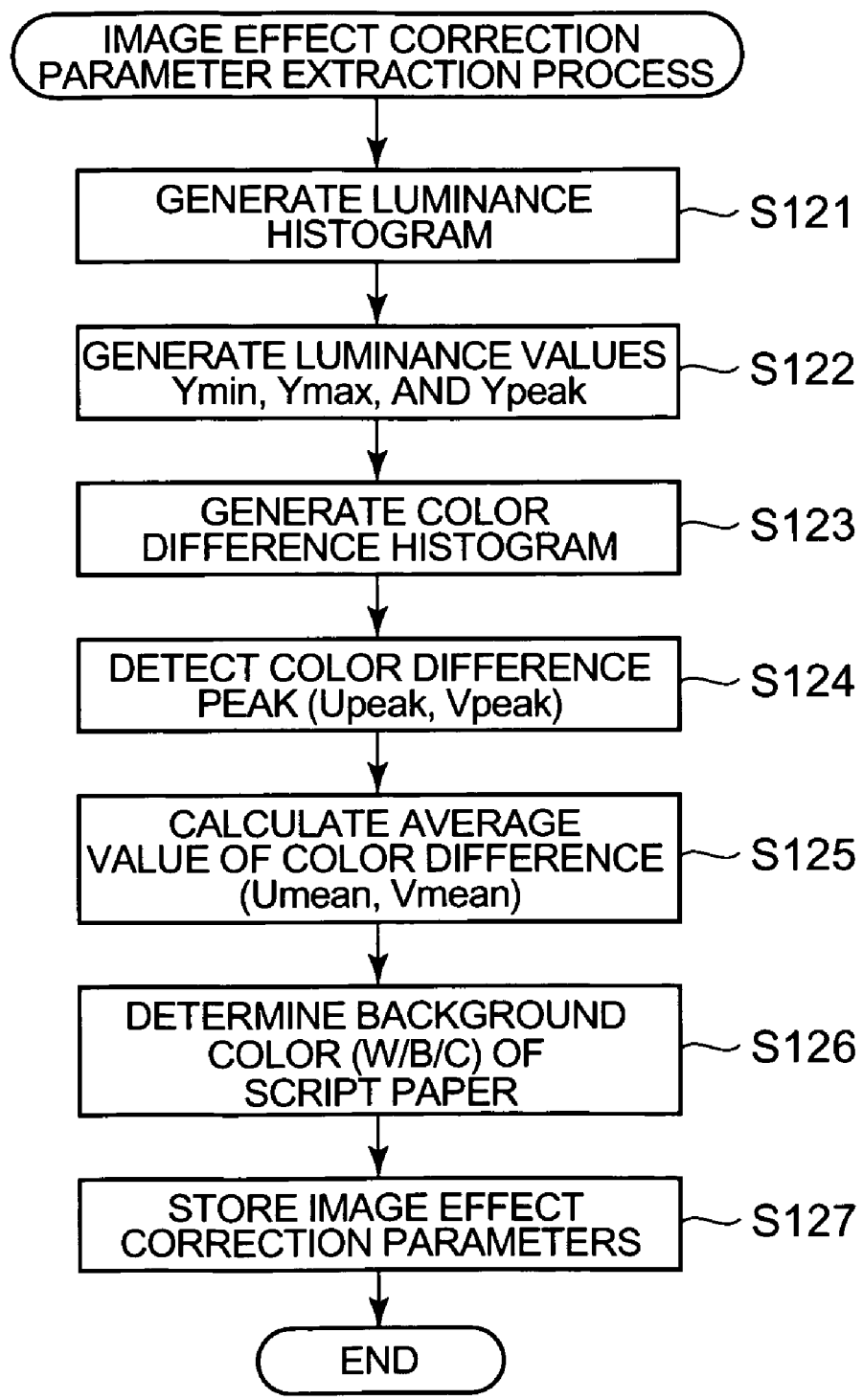
FIG. 25 is a flowchart specifically showing an image effect correction parameter extraction process shown in FIG. 8.

In a case where the conditions expressed by the equation 21 and equation 22 are not satisfied, the background color of the script paper is determined as color (C). The color threshold is set to, for example, 50. The white determination threshold is set to, for example, 128. The black determination threshold is set to, for example, 50. Based on the idea described above, the CPU 206 executes the image effect correction parameter extraction process. FIG. 25 is a flowchart specifically showing the image effect correction parameter extraction process.

The CPU 206 counts the number of pixels in the substantial script portion for each luminance value (Y) to generate a luminance histogram as shown in FIG. 24A (step S121). The CPU 206 obtains the maximum luminance value (Ymax), the minimum luminance value (Ymin), and the peak luminance value (Ypeak) from the generated luminance histogram (step S122).

The CPU 206 generates a histogram of color differences (U, V) as shown in FIG. 24B (step S123). The CPU 206 obtains the peak value (Upeak, Vpeak) of the color differences (U, V) as the image effect correction parameters (step S124), and calculates the average values (Umean, Vmean) of the color differences (step S125).

The CPU 206 determines the background color of the script paper 4 according to the determination condition formulae expressed by the equation 21 and equation 22 by using the peak values (Ypeak, Upeak, Vpeak) of the image histograms (step S126). The CPU 206 stores the image effect correction parameters and the data of the background color of the script paper 4 in the memory 201 (step S127).

Next, the CPU 206 executes the image effect process by using the image effect correction parameters extracted in this way. As described above, it is necessary to change the content of the image effect process depending on the background color to make the image effect process effective.

Figure 26A:
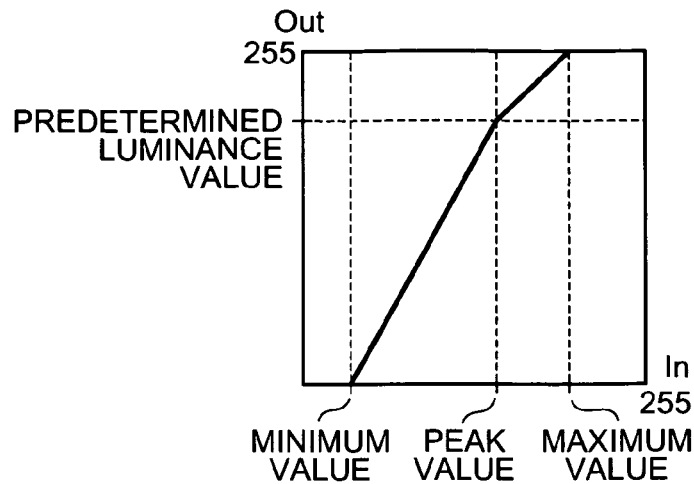
FIG. 26A is a diagram showing an image effect process in a case where the background color is white.
Figure 26B:
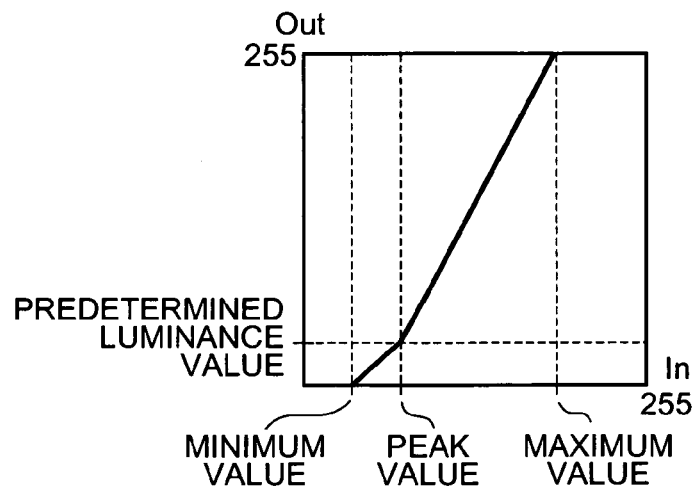
FIG. 26B is a diagram showing an image effect process in a case where the background color is black.
Figure 26C:
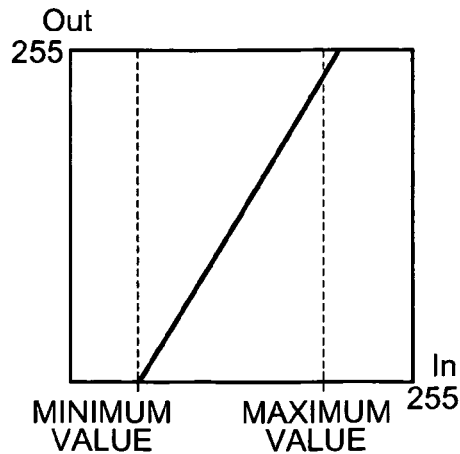
FIG. 26C is a diagram showing an image effect process in a case where the background color is other than white and black.

In a case where the background color is white such as the cases of a whiteboard, a notebook, etc., the CPU 206 performs luminance conversion as shown in FIG. 26A. In a case where the background color is black such as the case of a blackboard, etc., the CPU 206 performs luminance conversion as shown in FIG. 26B. In a case where the background color is other than white and black such as the cases of a magazine, a pamphlet, etc., the CPU 206 performs luminance conversion as shown in FIG. 26C. In FIG. 26A, FIG. 26B, and FIG. 26C, the horizontal axis represents the input value of the pixel value, and the vertical axis represents the output value of the pixel value.

In a case where the background color is white, the angle of inclination of the luminance conversion line changes at the peak value as shown in FIG. 26A. Setting a predetermined luminance value at, for example, 230, the CPU 206 enlarges the input peak luminance value to the luminance value 230. The CPU 206 enlarges the maximum luminance value to the highest luminance. As a result, the luminance conversion line is shown by two line segments as shown in FIG. 26A.

In a case where the background color is black, the CPU 206 performs luminance conversion such that the peak value becomes a certain luminance value (for example, 20). Also in this case, the luminance conversion line is shown by two line segments as shown in FIG. 26B.

In a case where the background color is other than white and black, the CPU 206 cuts the portion not larger than the minimum value and the portion not smaller than maximum value likewise a normal enlargement process to set the luminance conversion line to be shown by one line segment as shown in FIG. 26C.

The CPU 206 may previously generate a conversion table for the background luminance (Y) and the output (Y') and store it in the memory 201. The CPU 206 obtains the output value for each input pixel value from the generated conversion table, and performs the image effect process. In an image converted in this way, a bright pixel becomes more bright and a dark pixel becomes darker, varying the luminance distribution and making the image visible.

An image captured by a digital camera might change into yellow if the white balance of the image is not appropriately adjusted. Such color change cannot be corrected only by performing the image effect process using the luminance histogram.

Figure 27:
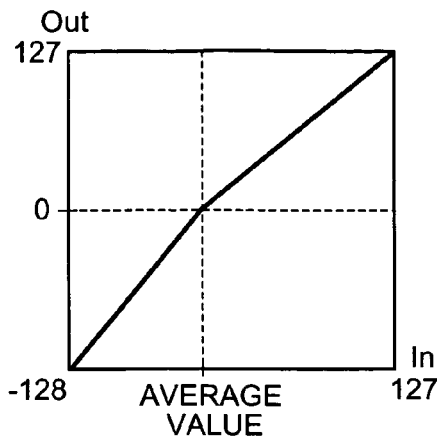
FIG. 27 is a diagram showing an example of a luminance conversion graph for performing color adjustment.

In this case, color adjustment is performed to obtain a favorable image. FIG. 27 is a diagram showing one example of a luminance conversion graph for performing color adjustment. In FIG. 27, the horizontal axis represents the input value of color difference, and the vertical axis represents the output value of color difference. In the color adjustment, luminance conversion is performed according to the luminance conversion graph shown in FIG. 27 in a manner that the average values (Umean, Vmean) of the color differences (U, V) shown in FIG. 24B become gray.

In a case where the values of the color differences U and V are both 0, which means that the color is an achromatic color, the color adjustment is performed in a manner that the peak values (Upeak, Vpeak) become 0. That is, the color conversion line is shown by two line segments. The output value U' for the input value U is given by the following equations 23.

$$U' = \frac{128}{(Umean + 128)} * (U - Umean)$$  [Equations 23]

$$(U < Umean)$$

$$U' = \frac{127}{(Umean + 127)} * (U - Umean)$$

$$(U \geq Umean)$$

The same applies to the color difference V.

Next, in a case where the background cannot sufficiently be whitened by the luminance enlargement described above, whitening of the background is performed as part of the image effect process to change the color of the portion in the image that is determined as the background into white (Y: 255, U: 0, V: 0) or near white.

Figure 28A:
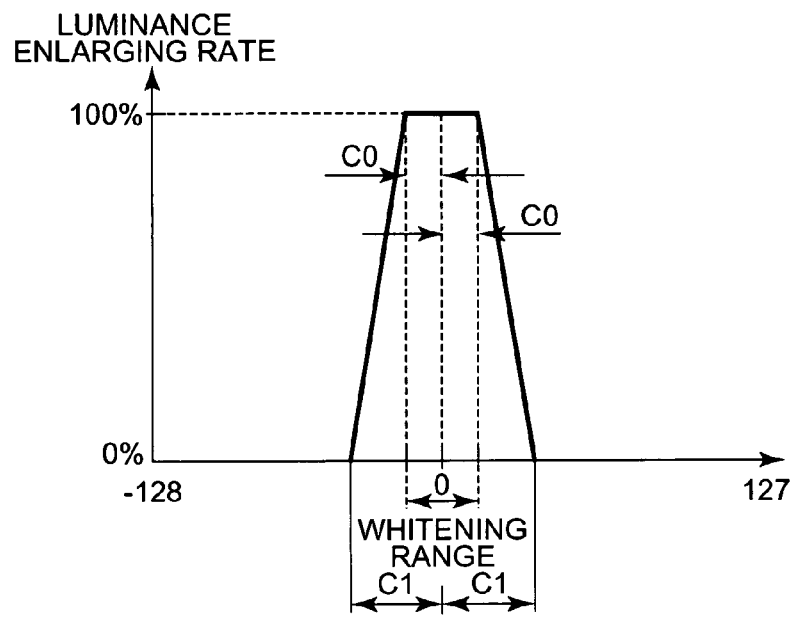
FIGS. 28A and 28B are diagrams for explaining background whitening.
Figure 28B:
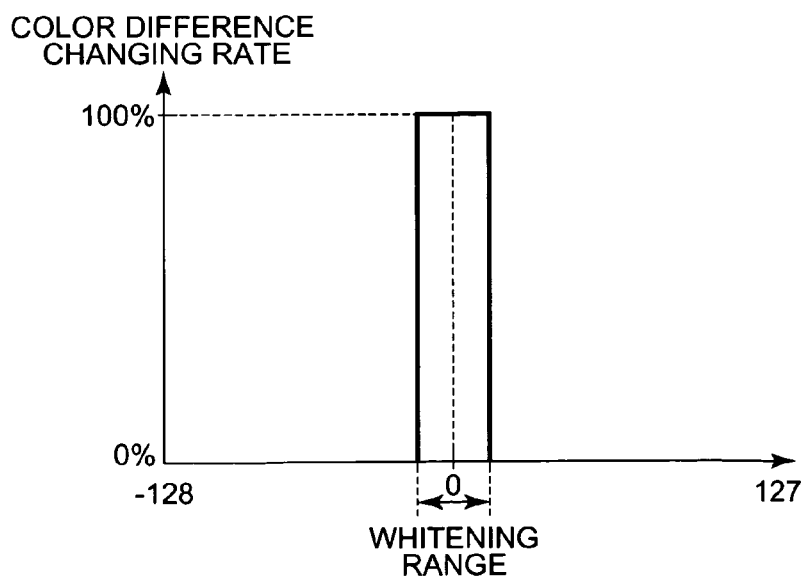

FIG. 28A is a diagram where the luminance value of a given pixel is set as reference (0) and thereby showing the rate of luminance value enlargement with respect to the luminance value of the reference pixel. The horizontal axis represents luminance value and the vertical axis represents the rate of luminance value enlargement. FIG. 28B is a diagram showing the color difference and the rate of changing the color difference. The horizontal axis represents color difference and the vertical axis represents the rate of changing the color difference.

In FIG. 28A and FIG. 28B, C0 represents a range starting from 0 in which the luminance and the color differences are enlarged by 100%, and C1 represents a range in which the rate of enlargement is changed depending on the luminance value. A pixel whose luminance value (Y) is not smaller than a predetermined value (Yw) and whose color differences (U, V) are within a predetermined range (C0) is regarded to be within a whitening range as shown in FIG. 28A and FIG. 28B, and the luminance value of such a pixel is enlarged and the color differences thereof are changed to 0. Such whitening of the background makes the image effect process very effective in a case where the background cannot be sufficiently whitened only by the luminance enlargement.

Based on this idea, the CPU 206 performs the image effect process. FIG. 29 is a flowchart specifically showing the image effect process.

The CPU 206 reads the stored image effect correction parameters from the memory 201 (step S131).

The CPU 206 adjusts the luminance histogram (step S132). Specifically, the CPU 206 determines whether the background is white or not. In a case where determining that the background is white, the CPU 206 adjusts the luminance histogram by performing luminance conversion as shown in FIG. 26A such that the background becomes whiter and more visible. On the other hand, in a case where determining that the background is not white, the CPU 206 determines whether the background is black or not. In a case where determining that the background is black, the CPU 206 adjusts the luminance histogram by performing luminance conversion as shown in FIG. 26B. In a case where determining that the background is not black, the CPU 206 adjusts the luminance histogram depending on the background color of the script paper 4 by performing luminance conversion as shown in FIG. 26C.

The CPU 206 performs color adjustment on the image having been adjusted in this way by performing conversion as shown in FIG. 27 (step S133), and performs whitening of the background (step S134).

Figure 30:
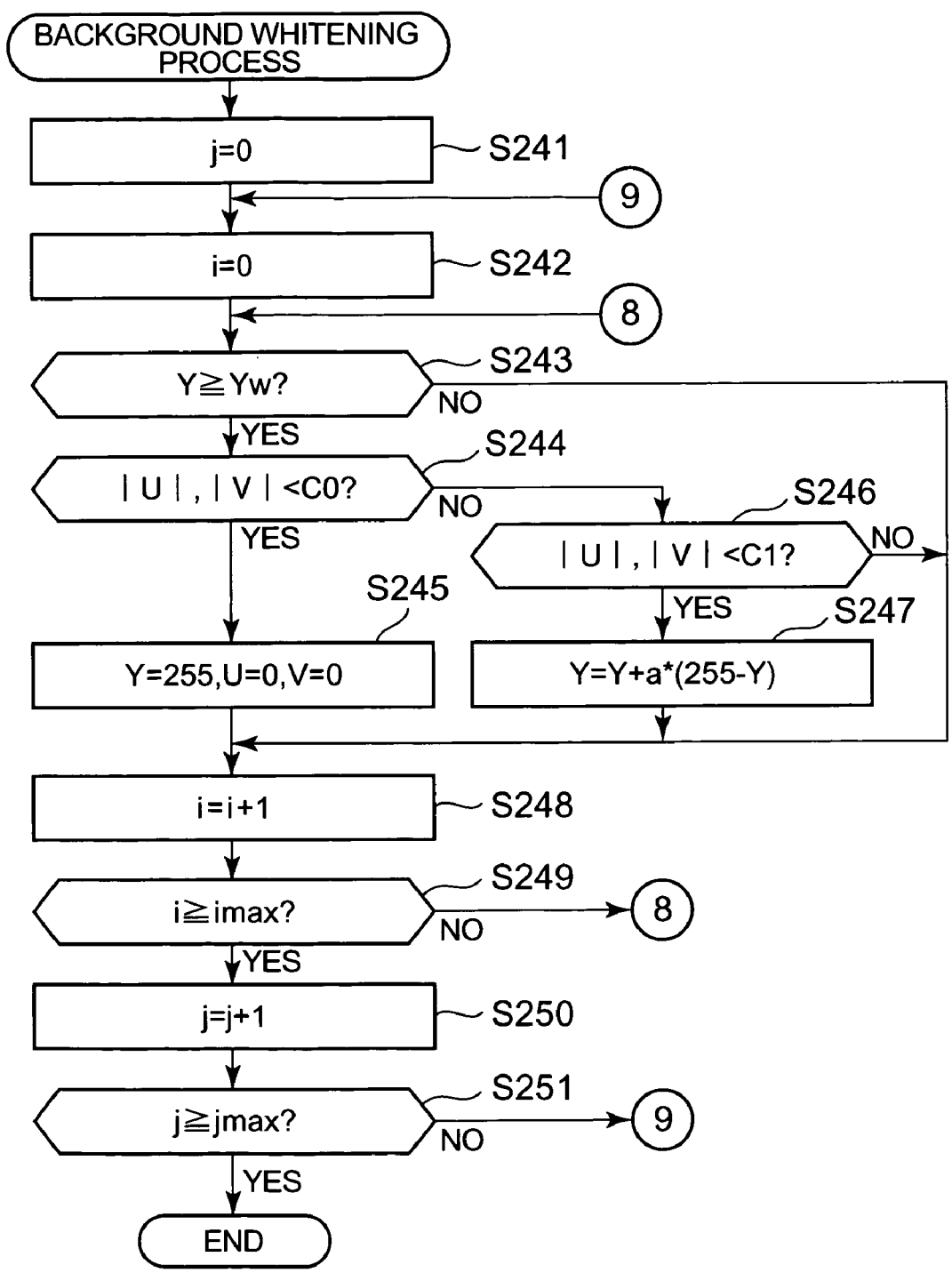
FIG. 30 is a flowchart specifically showing a background whitening process shown in FIG. 29.

FIG. 30 is a flowchart specifically showing the background whitening process performed by the CPU 206. In the flowchart, imax and jmax represent the size of the input image on x and y axes.

In the background whitening process, the CPU 206 first initializes a count value j to 0 (step S241), and initializes a count value i to 0 (step S242). The CPU 206 determines whether the luminance (Y) of a pixel (i, j) in the input image is not smaller than the predetermined value (Yw) (step S243).

In a case where determining that the luminance (Y) is not smaller than the predetermined value (Yw) (step S243; Yes), the CPU 206 determines whether the absolute values of the color differences U and V are smaller than the predetermined value C0 (step S244).

In a case where determining that the absolute values of the color differences U and V are smaller than the predetermined value C0 (step S244; Yes), the CPU 206 sets the luminance (Y) to 255 and changes the color differences U and V to 0 thereby rewriting the values of the pixel (i, j) (step S245), and advances to step S248.

On the other hand, in a case where determining that the absolute values of the color differences U and V are not smaller than the predetermined value C0 (step S244; No), the CPU 206 determines whether the absolute values of the color differences U and V of the pixel (i, j) in the input image are smaller than the predetermined value C1 (step S246).

In a case where determining that the absolute values of the color differences U and V are smaller than the predetermined value C1 (step S246; Yes), the CPU 206 rewrites the luminance value of the pixel (i, j) according to a formula "luminance Y=Y+a*(255−Y)" (step S247), and advances to step S248.

In a case where determining that the absolute values of the color differences U and V are not smaller than the predetermined value C1 (step S246; No), the CPU 06 advances to step S248 without changing the luminance value.

The CPU 206 increments the count value i (step S248). The CPU 206 compares the count value i with the maximum value imax to determine whether the count value i reaches the maximum value imax (step S249).

In a case where determining that the count value i does not reach the maximum value imax (step S249; No), the CPU 206 returns to step S243.

After this, when determining that the count value i reaches the maximum value imax (step S249; Yes) as a result of repeating the procedures of steps S243 to S248, the CPU 206 increments the count value j (step S250).

The CPU 206 compares the count value j with the maximum value jmax and determines whether the count value j reaches the maximum value jmax (step S251).

In a case where determining that the count value j does not reach the maximum value jmax (step S251; No), the CPU 206 returns to step S242.

When determining that the count value j reaches the maximum value jmax (step S251; Yes) as a result of repeating the procedures of steps S242 to S250, the CPU 206 terminates the background whitening process.

Figure 31A:
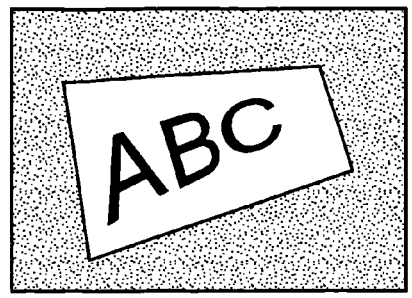
FIGS. 31A and 31B are diagrams showing an example where image distortion cannot be corrected by projective transformation.
Figure 31B:

Next, an image transformation adjusting process to be performed on an image which has once been subjected to image transformation will be explained. In a case where the coordinates of the vertexes of the extracted quadrangle contain a slight error or the like, projection of the image using the obtained affine parameters may not result well as shown in FIG. 31A and FIG. 31B. Hence, the captured image projection apparatus according to the present embodiment is configured to allow the user to adjust the projective transformation.

When the user operates any key of the operation section 204, the operation section 204 responsively transmits the information of this operation to the CPU 206 as instruction information. The CPU 206 determines the operation information and controls the image processing device 203 in accordance with the determination result.

Figure 32:
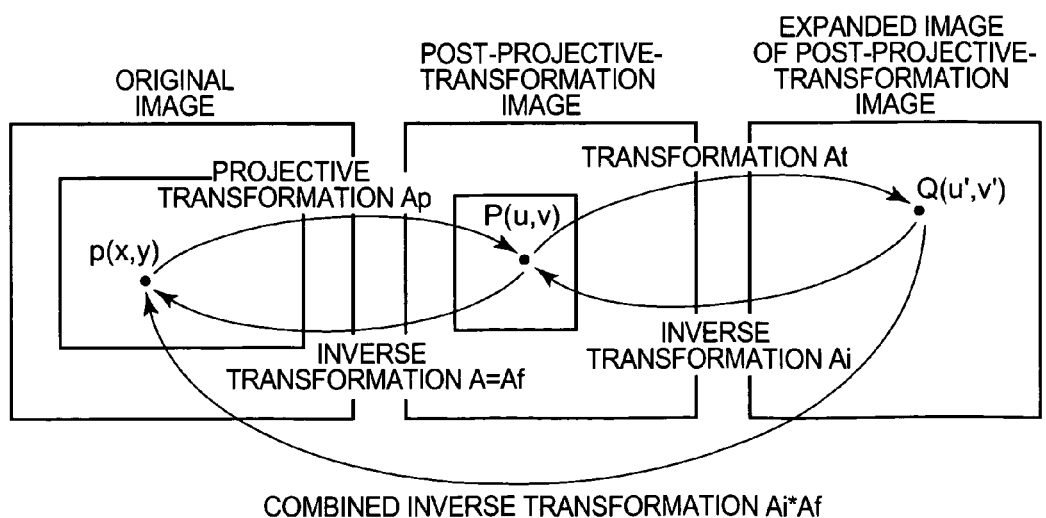
FIG. 32 is a diagram for explaining correspondence among an original image, a post-projective-transformation image, and an expanded image of post-projective-transformation image.

In order to obtain an interpolation pixel Q(u', v') on a corrected image as shown in FIG. 32, the following procedures are normally performed. First, inverse transformation Ai is performed on the interpolation pixel Q(u', v') to obtain a corrected image P(u, v) corresponding to the interpolation pixel Q(u', v'). Inverse transformation Af is then performed on the corrected image P(u, v) to obtain the original image p(x, y). In case of a two-step image transformation such as projective transformation plus expansion transformation, etc., the CPU 206 previously obtains a transformation matrix which is obtained by combining two transformations, and performs transformation on the original image once. This way can obtain a transformed image more quickly than performing transformation twice and result in less image deterioration than the above-described method of generating an image by performing inverse transformation twice.

A rotational inverse transformation matrix Ar for obtaining a pre-transformation image from a post-transformation image which has been obtained by rotating the pre-transformation image by an angle θ about predetermined coordinates (Xc, Yc) is expressed by the following equation 24. For example, the coordinates of the center of the image or the coordinates of a specific vertex of the image may be set as the predetermined coordinates (Xc, Yc).

$$Ar = \begin{bmatrix} \cos\theta & -\sin\theta & 0 \\ \sin\theta & \cos\theta & 0 \\ -Xc\cos\theta - Yc\sin\theta + Xc & Xc\sin\theta - Yc\cos\theta + Yc & 1 \end{bmatrix}$$ [Equation 24]

An expansion transformation Asc for obtaining a pre-transformation image from a post-transformation image which has been obtained by expanding the pre-transformation image to Sc times with predetermined coordinates (Xc, Yc) referred to as the center of expansion, is expressed by the following equation 25. For example, the coordinates of the center of the image or the coordinates of a specific vertex of the image may be set as the predetermined coordinates (Xc, Yc).

$$Asc = \begin{bmatrix} 1/Sc & 0 & 0 \\ 0 & 1/Sc & 0 \\ Xc\left(1 - \frac{1}{Sc}\right) & Yc\left(1 - \frac{1}{Sc}\right) & 1 \end{bmatrix}$$ [Equation 25]

Note that there is a case where once an image is expanded, a process for round off error or the like is performed in adjustment or calculation of affine parameters. Hence, in a case where an image is to be expanded, the affine parameters need to be restored to their original magnification before the image is expanded.

A moving matrix for obtaining a pre-transformation image from a post-transformation image which has been obtained by moving the pre-transformation image by Tx and Ty in the X and Y directions respectively, is expressed by the following equation 26.

$$As = \begin{bmatrix} 1 & 0 & 0 \\ 0 & 1 & 0 \\ -Tx & -Ty & 1 \end{bmatrix}$$ [Equation 26]

A projection effect matrix Ap for obtaining a pre-transformation image from a post-transformation image which has been obtained by inclining the pre-transformation image by $\alpha$ and $\beta$ in the X and Y directions respectively, is expressed by the following equation 27.

$$Ap = \begin{bmatrix} 1 & 0 & \alpha \\ 0 & 1 & \beta \\ 0 & 0 & 1 \end{bmatrix}$$ [Equation 27]

In a case where two-step inverse transformation is performed, the inverse transformation matrix A therefor is expressed by the following equation 28.

$$A = Ai(2)*Ai(1)$$ [Equation 28]

Figure 33:
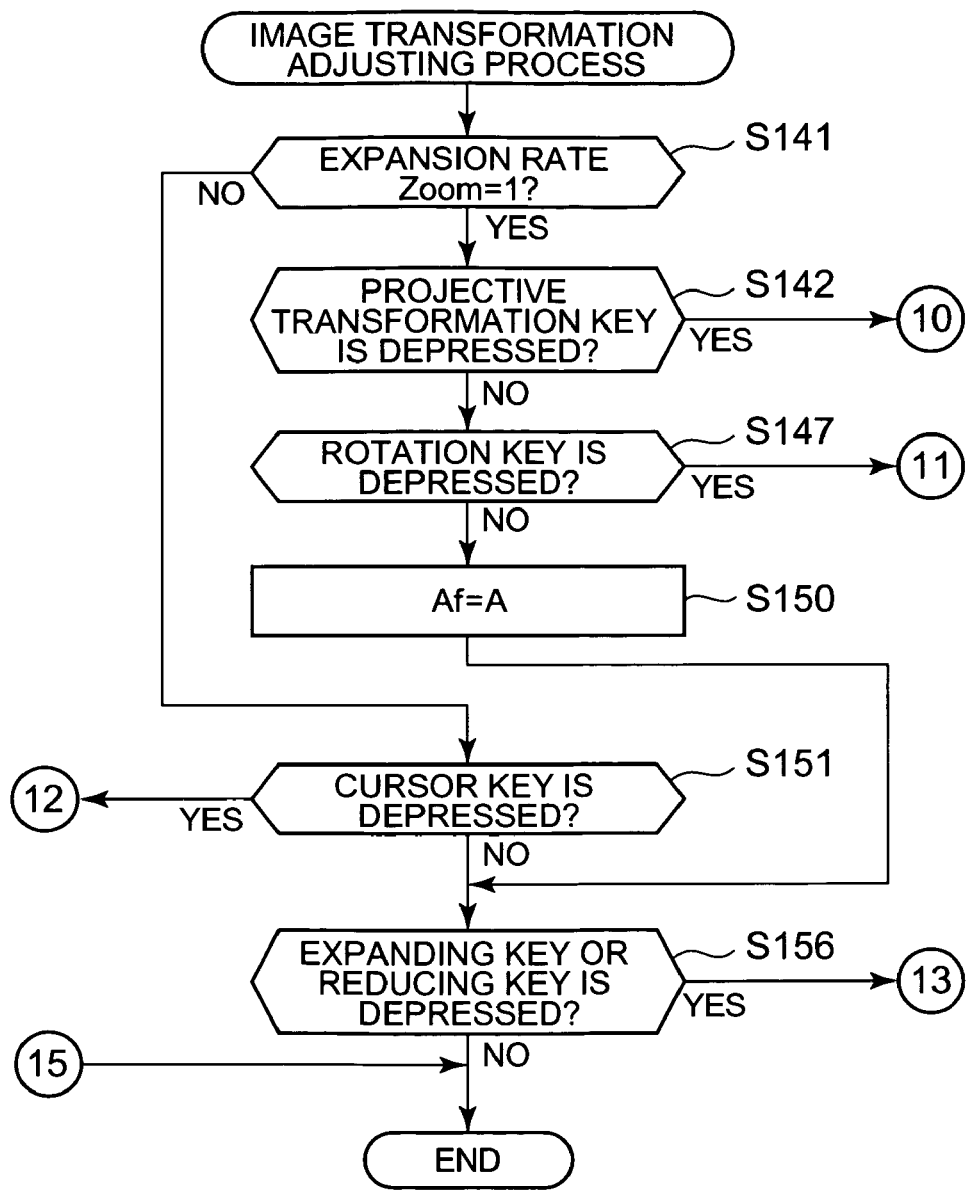
FIG. 33 to FIG. 35 are a flowchart specifically showing an image transformation adjusting process shown in FIG. 7.
Figure 34:
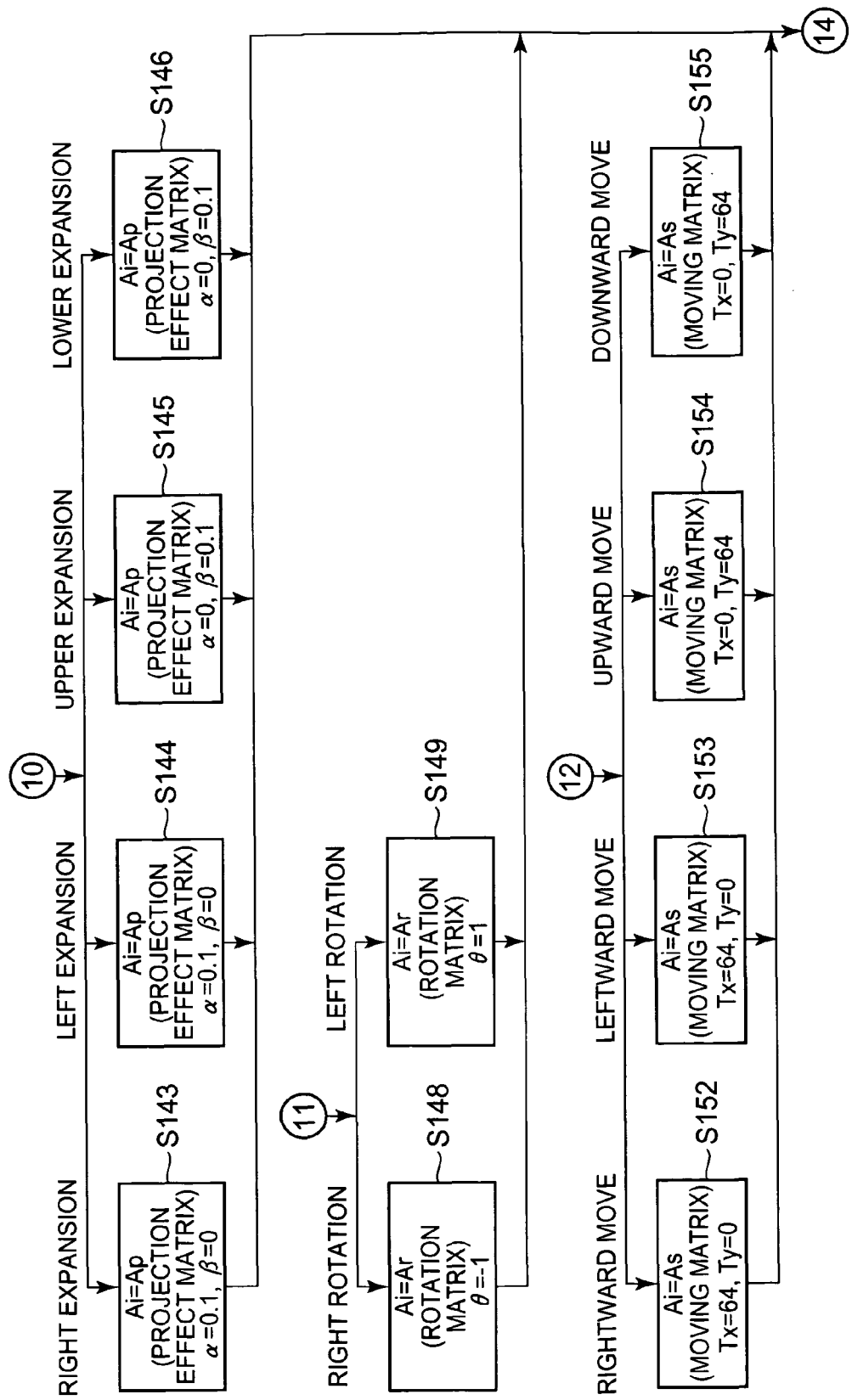
Figure 35:
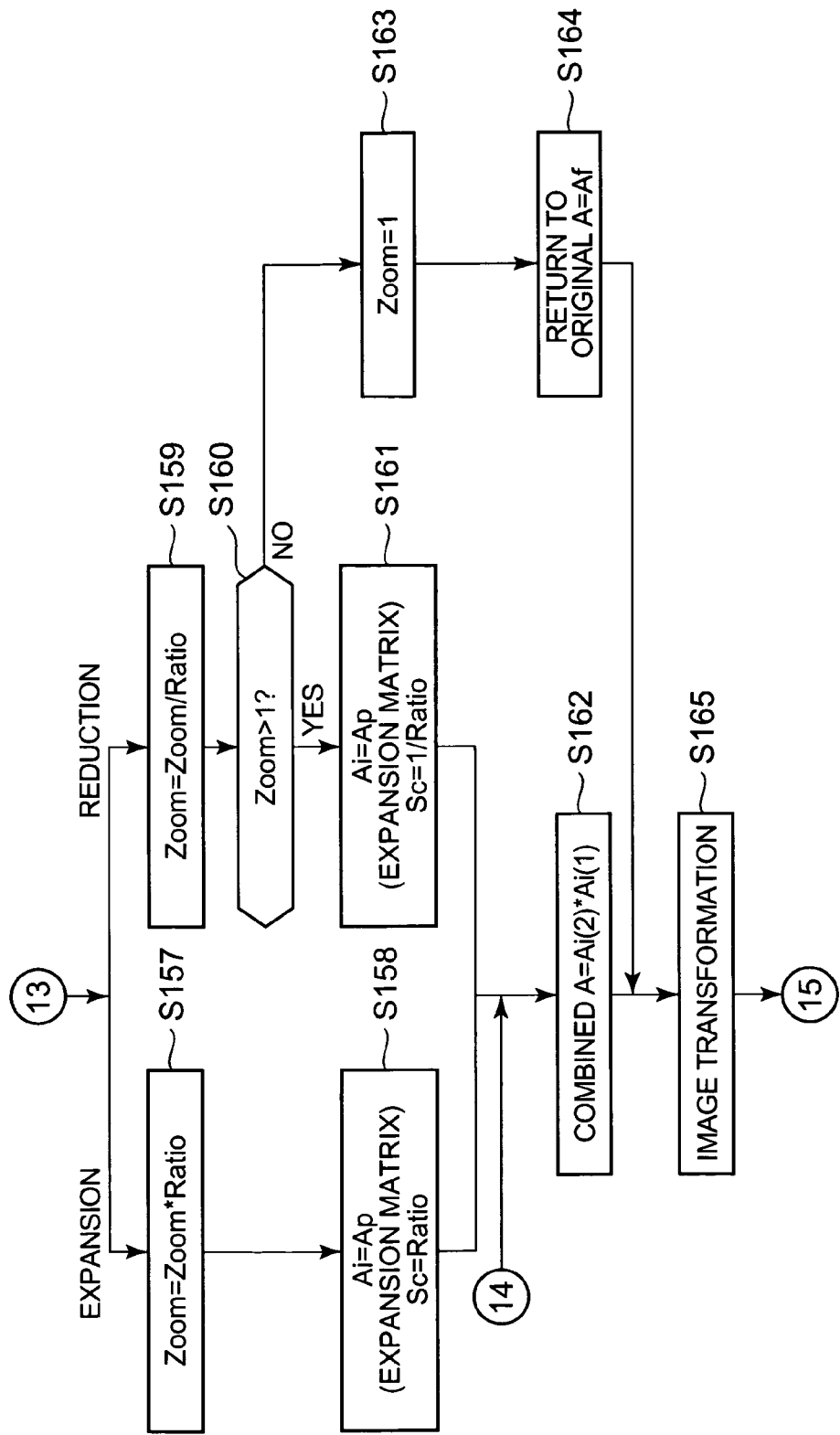

An image transformation adjusting process to be performed based on the idea described above will now be explained. FIG. 33, FIG. 34, and FIG. 35 show a flowchart for specifically explaining the image transformation adjusting process.

The CPU 206 determines whether an expansion rate Zoom is 1 (step S141). Since the expansion rate Zoom is previously initialized to 1, the CPU 206 determines that the expansion rate Zoom is 1. When determining that the expansion rate Zoom is 1 (step S141; Yes), the CPU 206 determines whether any of the upper expanding key 211, the lower expanding key 212, the left expanding key 213, and the right expanding key 214 is depressed as a projective transformation key (step S142).

In a case where determining that a projective transformation key is depressed (step S142; Yes), the CPU 206 determines the type of the depressed projective transformation key.

In a case where determining that the depressed projective transformation key is the right expanding key 214 the CPU 206 assigns $\alpha=0.1$ and $\beta=0$ to the projection effect matrix Ap expressed by the equation 27 to obtain an inverse transformation matrix Ai=Ap (step S143 of FIG. 34).

In a case where determining that the depressed projective transformation key is the left expanding key 213, the CPU 206 assigns $\alpha=-0.1$ and $\beta=0$ to the projection effect matrix Ap expressed by the equation 27 to obtain an inverse transformation matrix Ai=Ap (step S144).

In a case where determining that the depressed projective transformation key is the upper expanding key 211, the CPU 206 assigns $\alpha=0$ and $\beta=0.1$ to the projection effect matrix expressed by the equation 27 to obtain an inverse transformation matrix Ai=Ap (step S145).

In a case where determining that the depressed projective transformation key is the lower expanding key 212, the CPU 206 assigns $\alpha=0$ and $\beta=-0.1$ to the projection effect matrix Ap expressed by the equation 27 to obtain an inverse transformation matrix Ai=Ap (step S146).

In a case where determining that no projective transformation key is depressed (step S142; No), the CPU 206 determines whether any rotation key is depressed or not (step S147 of FIG. 33). In a case where determining that a rotation key is depressed (step S147; Yes), the CPU 206 determines the type of the depressed rotation key.

In a case where the depressed rotation key is the right rotation key 215, the CPU 206 assigns $\theta=-1$ to the rotational inverse transformation matrix Ar expressed by the equation 24 to obtain an inverse transformation matrix Ai=Ar (step S148).

In a case where determining that the depressed rotation key is the left rotation key 216, the CPU 206 assigns $\theta=1$ to the rotational inverse transformation matrix Ar expressed by the equation 24 to obtain an inverse transformation matrix Ai=Ar (step S149).

In a case where determining that no rotation key is depressed (step S147; No), the CPU 206 saves the current affine parameters in the matrix Af in order that the affine parameters can be restored to their original magnification, before expansion is performed (step 150).

On the other hand, in a case where determining that the expansion rate Zoom is not 1 (step S141; No), the CPU 206 determines whether any cursor key is depressed or not (step S151).

In a case where determining that a cursor key is depressed (step. S151; Yes), the CPU 206 determines the type of the depressed cursor key.

In a case where determining that the depressed cursor key is the rightward moving key (the expanding key 217 and the right expanding key 214), the CPU 206 assigns the amounts of movement Tx=64 and Ty=0 on the respective X and Y axes to the moving matrix As expressed by the equation 26 to obtain an inverse transformation matrix Ai=As (step S152 of FIG. 34).

In a case where determining that the depressed cursor key is the leftward moving key (the expanding key 217 and the left expanding key 213), the CPU 206 assigns the amounts of movement Tx=−64 and Ty=0 on the respective X and Y axes to the moving matrix As expressed by the equation 26 to obtain an inverse transformation matrix Ai=As (step S153).

In a case where determining that the depressed cursor key is the upward moving key (the expanding key 217 and the upper expanding key 211), the CPU 206 assigns the amounts of movement Tx=0 and Ty=64 on the respective X and Y axes to the moving matrix As expressed by the equation 26 to obtain an inverse transformation matrix Ai=As (step S154).

In a case where determining that the depressed cursor key is the downward moving key (the expanding key 217 and the lower expanding key 212), the CPU 206 assigns the amounts of movement Tx=0 and Ty=−64 on the respective X and Y axes to the moving matrix As expressed by the equation 26 to obtain an inverse transformation matrix Ai=As (step S155).

On the other hand, in a case where determining that no cursor key is depressed (step S151; No), or in a case where determining that no rotation key is depressed and therefore saving the current affine parameters in the matrix Af (step S150), the CPU 206 determines whether the expanding key 217 or the reducing key 218 is depressed or not (step S156).

In a case where determining that neither the expanding key 217 nor the reducing key 218 is depressed (step S156; No), the CPU 206 terminates the image transformation adjusting process. On the other hand, in a case where determining that the expanding key 217 or the reducing key 218 is depressed (step S156; Yes), the CPU 206 determines the type of the depressed key.

In a case where determining that the depressed key is the expanding key 217, the CPU 206 obtains a new expansion rate Zoom in accordance with a formula "expansion rate Zoom=Zoom*Ratio (for example, Ratio being twofold) (step S157 of FIG. 35), and assigns Sc=Ratio to Sc in the expansion matrix Asc expressed by the equation 25 to obtain an inverse transformation matrix Ai=Ap (step S158).

In a case where determining that the depressed key is the reducing key 218, the CPU 206 obtains a new expansion rate Zoom in accordance with a formula "expansion rate Zoom=Zoom/Ratio (step S159). In case of the reducing key 218, the CPU 206 determines whether the expanding rate Zoom exceeds 1 or not (step S160).

In a case where determining that the expansion rate Zoom exceeds 1 (Zoom>1) (step S160; Yes), the CPU 206 assigns Sc=1/Ratio to Sc in the expansion matrix Asc expressed by the equation 25 to obtain an inverse transformation matrix Ai=Ap (step S161).

In a case where any inverse transformation matrix Ai is set (steps S143 to S146, S148, S149, S152 to S155, S158, and S161), the CPU 206 obtains the inverse transformation matrix A according to the equation 28 (step S162) and advances to step S165.

On the other hand, in a case where determining that the expansion rate Zoom does not exceed 1 (Zoom≦1) (step S160; No), the CPU 206 sets the expansion rate to 1 (Zoom=1) (step S163). The CPU 206 restores the matrix to the original inverse transformation matrix A with an assumption of A=Af (A being the affine parameters before expansion which have been saved at step S150) (step S164).

The CPU 206 supplies the obtained inverse transformation matrix A to the image processing device 203 to control the image processing device 203 to perform image transformation such that image transformation using the affine parameters is performed according to the supplied inverse transformation matrix A (step S165), and terminates the image transformation adjusting process.

As explained above, according to the first embodiment, before starting capturing of a high-resolution still image because of no longer any change occurring in the image, the captured image projection apparatus obtains projection parameters and image effect correction parameters from a moving image which is captured at a low resolution in a different task from the task in which the capturing of the high-resolution still image is to be performed.

The captured image projection apparatus then changes the scale of the obtained projection parameters from one for a low-resolution image to one for a high-resolution image. By using the projection parameters and image effect correction parameters obtained before capturing of the high-resolution image, the captured image projection apparatus performs the image transformation process and the image effect process on the captured high-resolution still image.

In the way described above, the captured image projection apparatus can shorten the time required from capturing of an image to projection thereof by performing the image transformation process and the image effect process on the high-resolution still image by using the projection parameters and the image effect correction parameters obtained from a low-resolution moving image in a different task beforehand.

Further, by capturing a moving image at a low resolution and capturing a still image at a high resolution, the captured image projection apparatus can reduce the processing load of the CPU or the like required for image capturing without deteriorating the image quality of a still image to be projected on the screen 3.

Second Embodiment

Figure 36:
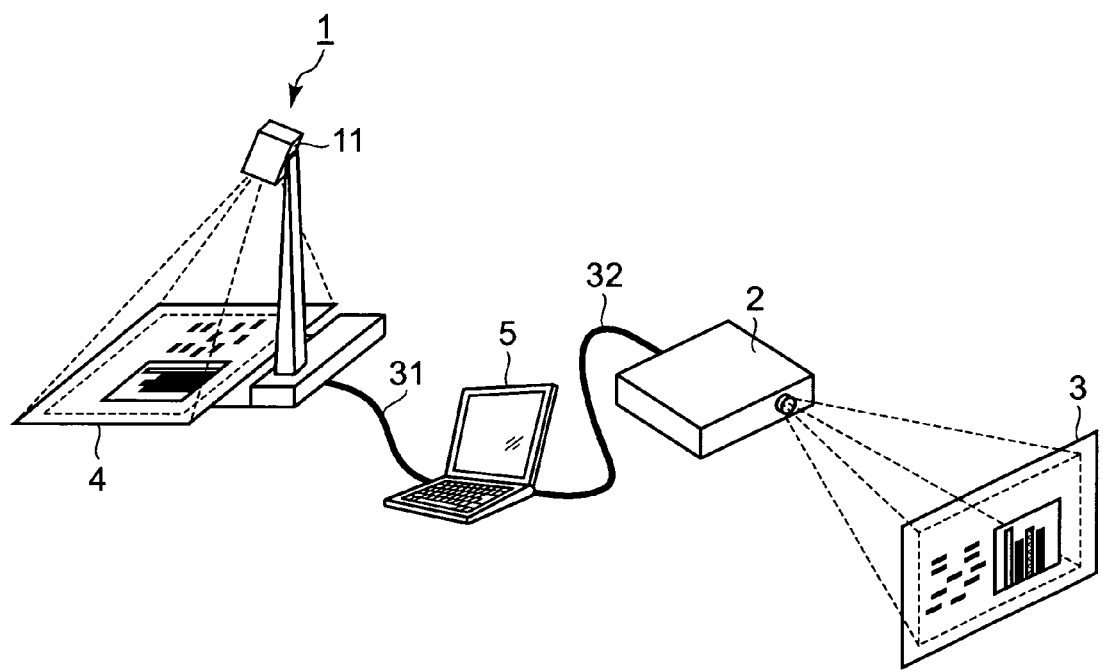
FIG. 36 is a diagram showing the configuration of a captured image projection apparatus according to a second embodiment of the present invention.

FIG. 36 is a diagram showing the configuration of a captured image projection apparatus according to the first embodiment of the present invention. In the present embodiment, the same components as those in the first embodiment will be denoted by the same reference numerals, and explanation for such components will be omitted in accordance with necessity.

As shown in FIG. 36, the captured image projection apparatus comprises a document camera 1, a projector 2, and a computer 5. The document camera 1 and the computer 5 are connected via a communication cable 31 such as a USB (Universal Serial Bus) or the like. The computer 5 and the projector 2 are connected via a video cable 32 such as a RGB cable or the like.

Figure 37:
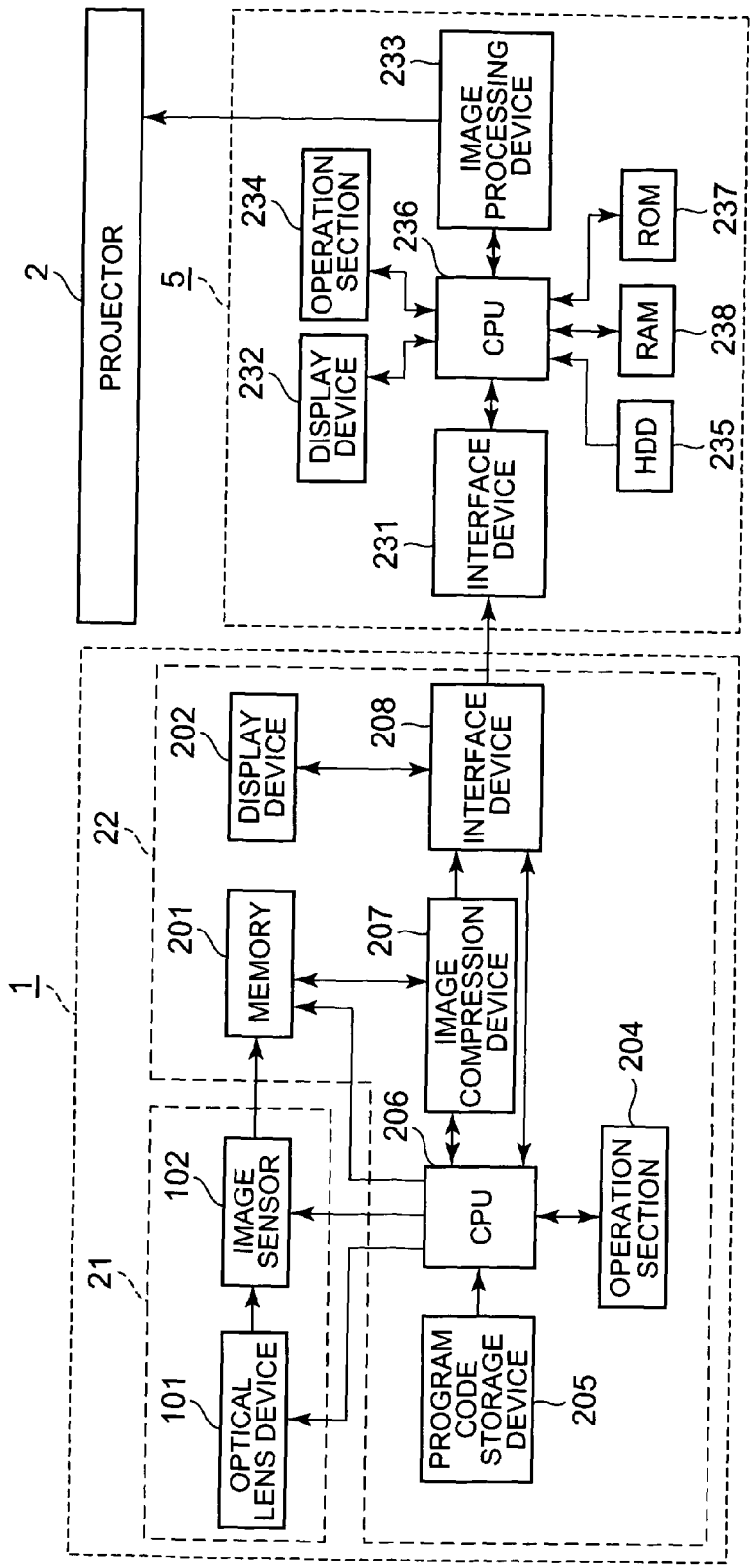
FIG. 37 is a block diagram showing the configuration of a document camera shown in FIG. 36.

FIG. 37 is a block diagram showing the configurations of the document camera 1 and the computer 5 shown in FIG. 36. As shown in FIG. 37, the document camera 1 comprises an image data generation unit 21 and a data processing unit 22. The data processing unit 22 comprises a memory 201, a display device 202, an operation section 204, a program code storage device 205, a CPU (Central Processing Unit) 206, an image compression device 207, and an interface device 208.

The image compression device 207 compresses image data by using a technique conforming to the JPEG (Joint Photographic Expert Group) standard or the like in order to reduce the amount of data to be transmitted to the computer 5. The interface device 208 transmits compressed image data to the computer 5, or receives an image capture command from the computer 5.

The CPU 206 has a function for initializing camera setting parameters such as the focus, exposure, white balance, etc. of the optical lens device 101 to a moving image mode. Because of this, the scene captured by the camera section 11 is condensed on the image sensor 102 via the optical lens device 101. The image sensor 102 generates low-resolution digital image data for moving image capturing from the condensed image, and transmits the generated data to the memory 201 at the rate of, for example, about 30 frames per second.

The computer 5 controls the document camera 1 by transmitting an image capture command to the document camera 1, receives image data and transmits the image data having been image-processed to the projector 2. The computer 5 comprises an interface device 231, a display device 232, an image processing device 233, an operation section 234, a HDD (Hard Disk Drive) 235, a CPU 236, a ROM (Read Only Memory) 237, and a RAM (Random Access Memory) 238.

The interface device 231 receives compressed image data or transmits an image capture command or the like. The display device 232 displays an image to be transmitted to the projector 2, likewise the display device 202.

The image processing device 233 performs image processes such as image distortion correction, image effect, etc. on received image data, likewise the image processing device 203. The image processing device 233 generates uncompressed data by performing compression-decoding on the compressed image.

The image processing device 233 may be formed by hardware or by software. It is preferred that the image processing device 233 be formed by software because the functions can be updated by upgrading the software.

Since there is no need of packaging hardware for image processing into the camera section 11 because of the computer 5 having the function of the image processing device 203 of the document camera 1, a commercially available standard digital camera may be used for the camera section 11.

The operation section 234 has switches and keys used by the user to input data, commands, etc. The HDD 235 stores preinstalled data such as software for document processing, etc.

The CPU 236 controls each component of the computer 5, and also controls the document camera 1 by transmitting an image capture command for instructing capturing of a high-resolution still image or the like to the document camera 1. The ROM 237 stores basic program codes or the like to be executed by the CPU 236. The RAM 238 stores data required for the CPU 236 to execute the program codes.

Figure 38:
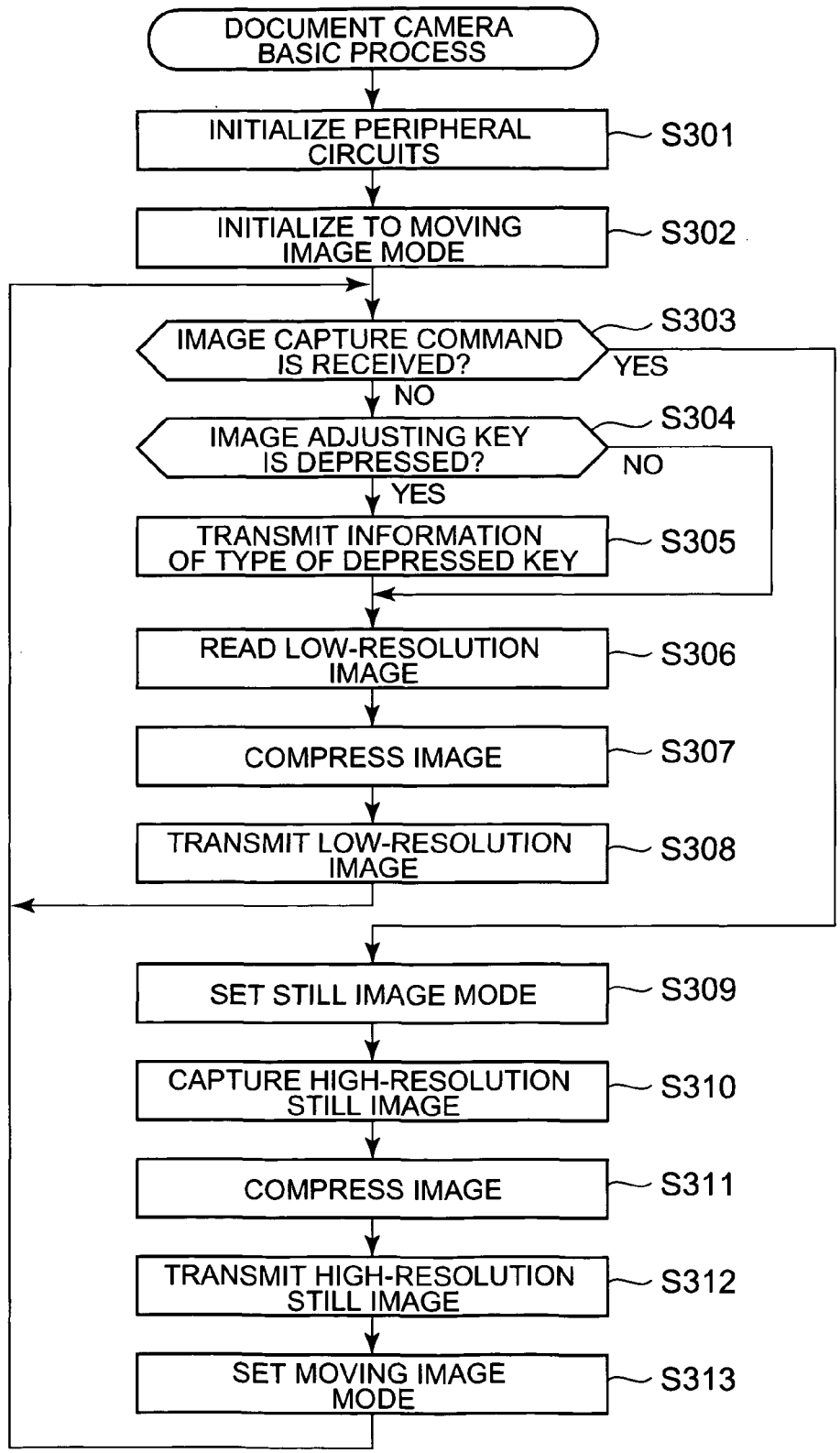
FIG. 38 is a flowchart showing a document camera basic process.

The basic process (document camera basic process) of the document camera 1 according to the second embodiment will now be explained with reference to the flowchart shown in FIG. 38. The CPU 206 of the document camera 1 initializes the interface device 208, the image compression device 207, and a work memory in the memory 201 (step S301). The CPU 206 initializes the camera setting parameters such as the focus, exposure, white balance, etc. of the optical lens device 101 to the moving image mode (step S302).

The CPU 206 checks the interface device 208 to determine whether an image capture command has been received from the computer 5 or not (step S303). In a case where determining that no image capture command has been received (step S303; No), the CPU 206 determines whether an image adjusting key is depressed or not based on operation information from the operation section 204 (step S304).

In a case where determining that an image adjusting key is depressed (step S304; Yes), the CPU 206 transmits the information of the type of the depressed image adjusting key to the computer 5 via the interface device 208 (step S305), and reads a low-resolution image from the image sensor 102 (step S306). On the other hand, in a case where determining that no image adjusting key is depressed (step S304; No), the CPU 206 skips step S305.

The CPU 206 controls the image compression device 207 to compress the read image data (step S307). The CPU 206 transmits the compressed low-resolution image data to the computer 5 via the interface device 208 at a rate of, for example, about 30 frames per second (step S308), and returns to step S302.

In this way, the document camera 1 continues transmitting a low-resolution image regularly to the computer 5 unless it receives an image capture command.

On the other hand, in a case where determining that an image capture command has been received (step S303; Yes), the CPU 206 sets the image capture mode of the image sensor 102 and the optical lens device 101 to the still image mode for high resolution (step S309), and controls the camera section 11 to perform capturing of a high-resolution still image (step S310).

The CPU 206 transmits image data captured by the camera section 11 to the image compression device 207, which then compresses the received image data (step S311).

The CPU 206 transmits the high-resolution still image data compressed by the image compression device 207 to the computer 5 via the interface device 208 (step S312). The CPU 206 again sets the image capture mode to the moving image mode for low resolution (step S313), and returns to step S302.

Figure 39:
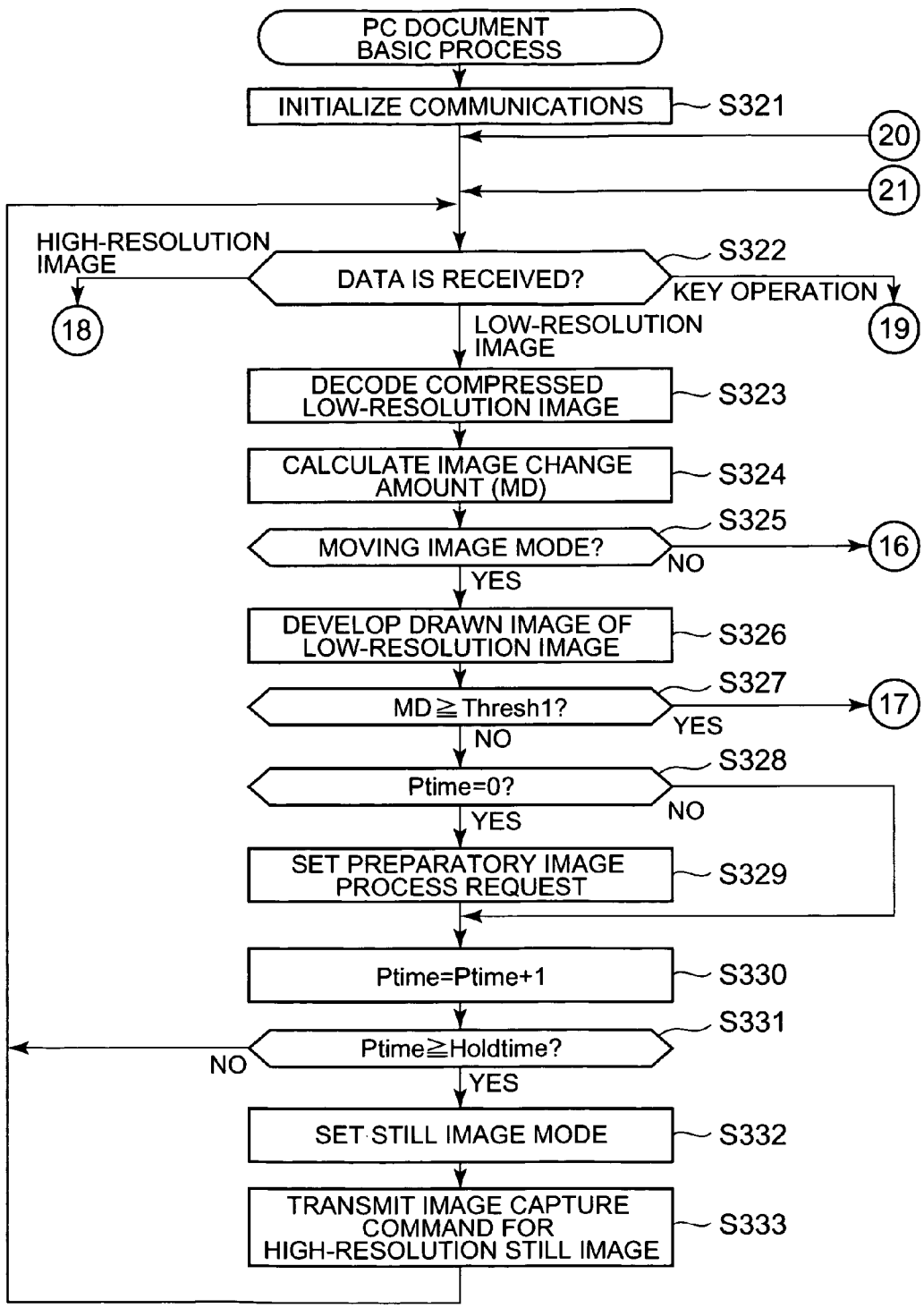
FIG. 39 to FIG. 41 are a flowchart showing a PC document basic process.
Figure 40:
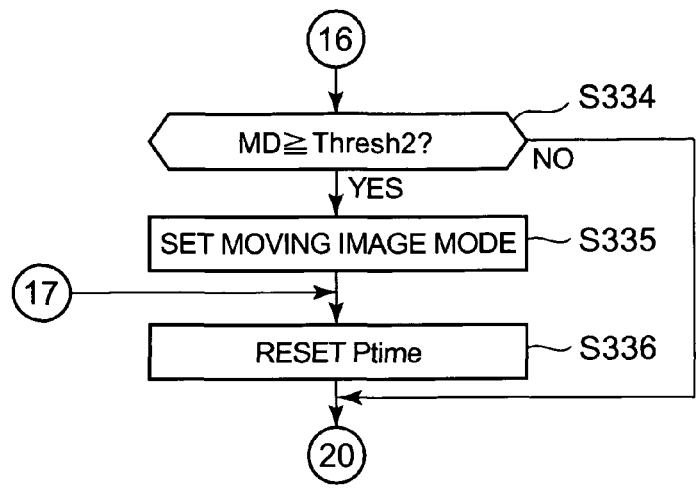
Figure 41:
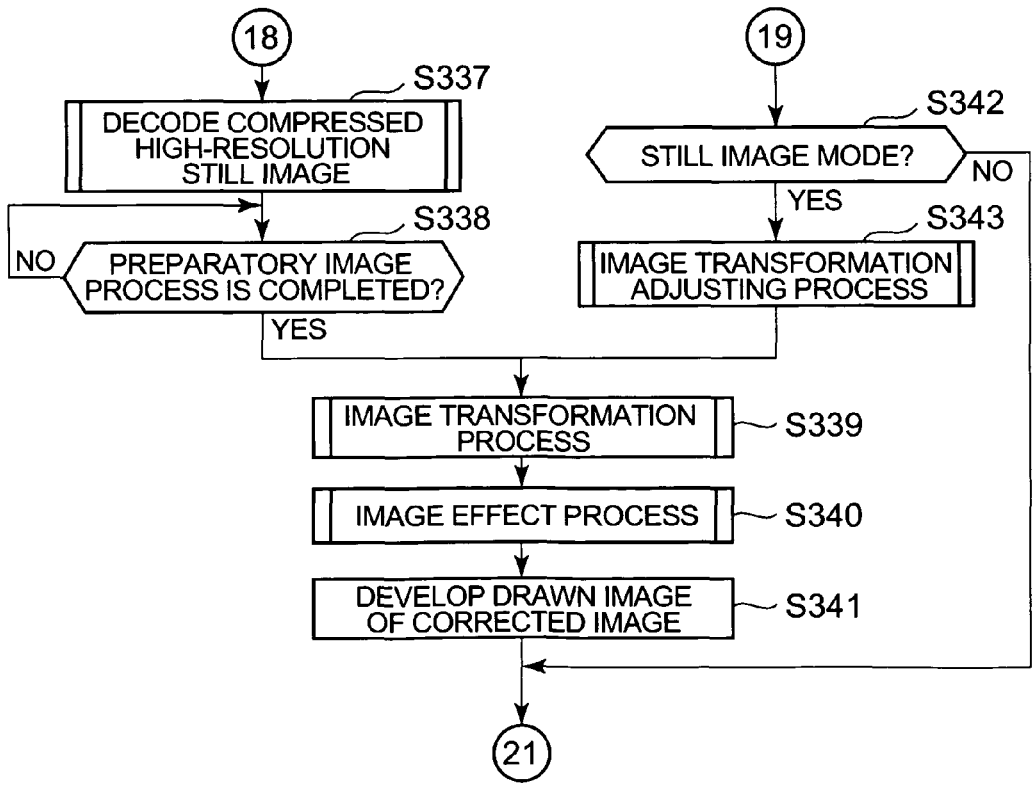

The computer 5 activates document processing software installed in the HDD 235 and performs a PC document basic process shown by the flowchart of FIG. 39, FIG. 40 and FIG. 41. As shown in FIG. 39, the CPU 236 first initializes communications (step S321). The CPU 236 determines whether data has been received or not, and also determines the content of the received data (step S322).

In a case where determining that the received data is a low-resolution image, the CPU 236 converts the compressed data into uncompressed data by performing compression-decoding on the compressed image (step S323). The CPU 236 calculates the image change amount MD according to the equation 1 (step S324).

The CPU 236 determines whether the image capture mode is the moving image mode or the still image mode (step S325). Since the image capture mode is set to the moving image mode in the initial state, the CPU 236 determines that the image capture mode is the moving image mode (step S325; Yes). In this case, the CPU 236 develops a drawn image of the received low-resolution image (step S326) and outputs the drawn low-resolution image data to the projector 2, so that the image will be projected on the screen 3.

The CPU 236 calculates the image change amount MD as compared with a previously captured image according to the equation 1. The CPU 236 compares the calculated image change amount MD with the preset threshold Thresh 1, and determines whether there is any change in the image based on the comparison result (step S327).

In a case where determining that there is a change in the image (MD≧Thresh 1) (step S327; Yes), the CPU 236 clears the still time Ptime (step S336 of FIG. 40), and returns to step S322.

On the other hand, in a case where determining that there is no change in the image (Thresh 1>MD) (step S327; No), the CPU 236 determines whether the still time Ptime is 0 or not (step S328). In a case where determining that the still time Ptime is 0 (step S328; Yes), the CPU 236 sets a preparatory image process request (step S329). When the preparatory image process request signal is set, the preparatory image process shown in the flowchart of FIG. 8 is started in a different task from the task in which the PC document basic process is performed. On the other hand, in a case where determining that the still time Ptime is not 0 (step S328; No), the CPU 236 skips the procedure of step S329, thereby not starting the preparatory image process.

The CPU 236 adds 1 to the still time Ptime (step S330). The CPU 236 determines whether the still time Ptime reaches a predetermined time HoldTime (step S331). In a case where determining that the still time Ptime does not reach the predetermined time HoldTime (Ptime<HoldTime) (step S331; No), the CPU 236 returns to step S322 to continue the moving image mode, and waits for the next data to be received.

On the other hand, in a case where the still time Ptime reaches the predetermined time HoldTime (Ptime≧HoldTime) (step S331; Yes), the CPU 236 sets the image capture mode to the still image mode (step S332), and transmits an image capture command for instructing capturing of a high-resolution still image (step S333). After this, the CPU 236 returns to step S322 and waits for still image data to be received from the document camera 1.

When the image capture mode becomes the still image mode (step S325; No), the CPU 236 compares the image change amount MD with the threshold Thresh 2 to determine whether there is a change in the image (step S334 of FIG. 40).

In a case where the image change amount MD is not smaller than the threshold Thresh 2 (step S334; Yes), the CPU 236 sets the image capture mode to the moving image mode (step S335), and resets the still time Ptime (step S336). After this, the CPU 236 returns to step S322 of FIG. 39, and waits for the next data to be received.

On the other hand, in a case where the image change amount MD is smaller than the threshold Thresh 2 (step S334; No), the CPU 236 returns to step S322 of FIG. 39 and waits for the next data to be received with the still image mode maintained.

In a case where determining that the received data is a high-resolution image, the CPU 236 decodes the high-resolution still image (step S337 of FIG. 41). Next, the CUP 236 determines whether or not the preparatory image process shown by the flowchart of FIG. 8 is completed (step S338). In a case where determining that the preparatory image process is not completed (step S338; No), the CPU 236 waits for the preparatory image process to be completed while looping around the PC document basic process.

In a case where determining that the preparatory image process is completed (step S338; Yes), the CPU 236 performs the image transformation process (step S339). In the image transformation process, the CPU 236 performs extraction of a quadrangular captured image and projective transformation thereof into a front seen image in accordance with the projection parameters extracted at step S33.

The CUP 236 performs the image effect process by using the image effect correction parameters extracted at step S37 (step S340).

The CPU 236 develops a drawn image of the corrected image and outputs it to the projector 2 (step S341). After this, the CPU 236 returns to step S322 of FIG. 39 and waits for the next data to be received.

In a case where determining that the received data relates to operation information, the CPU 236 determines whether the image capture mode is the still image mode or not (step S342 of FIG. 41). In a case where determining that the image capture mode is not the still image mode (step S342; No), the CPU 236 returns to step S322 of FIG. 39, and wits for the next data to be received.

On the other hand, in a case where determining that the image capture mode is the still image mode (step S342 of FIG. 41; Yes), the CPU 236 performs the image transformation adjusting process (step S343) and then performs the image transformation process of step S339. The CPU 236 then performs the image effect process of step S340 in accordance with the content of the image transformation, develops a drawn image of the image by means of the image processing device 233, and outputs the drawn image to the projector 2. After this, the CPU 236 returns to step S322 of FIG. 39, and receives for the next data to be received.

As explained above, according to the second embodiment, since the computer 5 performs the image processes, there is no need of packaging hardware for image processing into the camera section 11 and the captured image projection apparatus can therefore be configured by using a commercially available standard digital camera. As a result, the captured image projection apparatus can be configured at a low cost.

The present invention is not limited to the above-described embodiments, but can be modified or applied in various manners. Modifications of the above-described embodiments that can be applied to the present invention will now be explained.

In the above-described embodiments, the shape of the script paper 4 is a quadrangle. However, the present invention is not limited to this, but the shape of the script paper 4 is arbitrary and may be a pentagon. In this case, the captured image projection apparatus may obtain a pentagon from the contour of the script paper 4 and extract projection parameters from the coordinates of the vertexes of the pentagon.

In the above-described embodiments, the image processes are applied to the captured image projection apparatus. However, the present invention is not limited to this, but may be applied to other image capture apparatuses such a digital camera, etc.

In the above-described embodiments, the programs executed by the CPU 236, etc. are previously stored in the ROM or the like. However, the present invention is not limited to this, but programs for controlling a computer to function as all or part of the apparatus or for controlling a computer to execute the above-described processes may be stored in a computer-readable recording medium such as a flexible disk, a CD-ROM Compact disk Read-Only Memory), a DVD (Digital Versatile Disk), an MO (Magneto Optical Disk), etc., so that the programs may be distributed by means of the recording medium and installed in a computer, which is therefore controlled to function as the above-described components or to execute the above-described processes.

The recording medium for storing the programs is not limited to those described above, but the present invention can be carried out by using a next-generation optical disk storage medium utilizing blue laser such as a Blue-Ray-Disc (R), an AOD (Advanced Optical Disc), etc., an HD-DVD9 utilizing red laser, a Blue-Laser-DVD utilizing blue-violet laser, and other various kinds of large capacity storage media to be described in the future.

The programs may be stored in a disk device or the like included in a server apparatus on the Internet and may be embedded in a carrier wave to be downloaded onto a computer.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2004-54930 filed on Feb. 27, 2004 and patent application No. 2005-47738 filed on Feb. 23, 2005 including specification, claims, drawings and summary. The disclosure of the above Japanese Patent Application is incorporated herein by reference in their entirety.

What is claimed is:

1. An image processing device comprising:
a camera which is operable at a low resolution, and at a high resolution;
an initializing unit which sets the camera to initially operate at the low resolution to capture a plurality of images of an object at the low resolution;
a change determination section which determines whether there is any change in the images captured by the camera at the low resolution;
a resolution setting section which maintains the camera operating at the low resolution when the change determination section determines that there is a change in the images captured by the camera at the low resolution, and which sets the camera to operate at the high resolution to capture an image of the object at the high resolution when the change determination section determines that there is no change in the images captured by the camera at the low resolution;
a correction parameter extraction section which extracts parameters for performing image correction of the image captured by the camera at the high resolution, from a last-captured image captured by the camera at the low resolution just before the resolution setting section sets the camera to operate at the high resolution;
a correction parameter conversion section which converts a low scale of the parameters extracted from the last-captured image captured by the camera at the low resolution into a high scale corresponding to the high resolution; and
an image correction section which corrects a luminance and color of the image captured by the camera at the high resolution by using the parameters with the high scale converted by the correction parameter conversion section;
wherein the correction parameter extraction section includes:
a luminance histogram generation section which generates a luminance histogram showing distribution of luminance in the last-captured image captured by the camera at the low resolution, by counting a number of pixels included in the last-captured image for each luminance value,
a color difference histogram generation section which generates a color difference histogram showing distribution of color differences in the last-captured image captured by the camera at the low resolution, by counting a number of pixels included in the last-captured image for each color difference, and
an image effect correction parameter obtaining section which obtains a maximum value, a minimum value, and a peak value of luminance from the luminance histogram generated by the luminance histogram generation section, and a peak value and an average value of color difference from the color difference histogram generated by the color difference histogram generation section, thereby obtaining image effect correction parameters including the maximum value, the minimum value, and the peak value of luminance, and the peak value and the average value of color difference, and
wherein the image correction section includes a luminance/color difference correction section which corrects luminance and color differences of the image captured by the camera at the high resolution, by adjusting luminance and color differences of each pixel included in the image by using the image effect correction parameters obtained by the image effect correction parameter obtaining section.

2. The image processing device according to claim 1, wherein the correction parameter extraction section further includes:
a polygon detection section which detects from the last-captured image captured by the camera at the low resolution, a polygon shaping a contour of the image, and
an affine parameter obtaining section which obtains affine parameters from coordinates of vertexes of the polygon detected by the polygon detection section, and
wherein the image correction section further includes an inclination correction section which corrects an inclination of the image captured by the camera at the high resolution by performing affine transformation of coordinates of each pixel included in the image by using the affine parameters obtained by the affine parameter obtaining section.

3. The image processing device according to claim 2, wherein the correction parameter conversion section changes a scale of the affine parameters obtained by the affine parameter obtaining section from a scale for the last-captured image captured at the low resolution to a scale for the image captured at the high resolution, by multiplying each element of the affine parameters by a predetermined multiple.

4. The image processing device according to claim 1, wherein the correction parameter extraction section performs extraction of the parameters in a different task from a task in which change determination by the change determination section, resolution setting by the resolution setting section, and image correction by the image correction section are performed.

5. The image processing device according to claim 1, wherein the change determination section includes an image change amount calculation section which calculates an amount of change in the images captured by the camera at the low resolution, and
wherein the change determination section determines that there is a change in the images when the amount of change calculated by the image change amount calculation section is greater than or equal to a predetermined threshold, and determines that there is no change in the images when the calculated amount of change calculated by the image change amount calculation section is smaller than the predetermined threshold.

6. The image processing device according to claim 5, wherein the image change amount calculation section calculates a total of absolute values of differences between pixel values of respective pixels included in a previously captured image and pixel values of respective pixels included in a currently captured image, as the amount of change in the images captured by the camera at the low resolution.

7. An image projection apparatus comprising:
an image sensor which is operable at a low resolution, and at a high resolution;
an initializing section which sets the image sensor to initially operate at the low resolution to capture a plurality of images of an object at the low resolution;
a change determination section which determines whether there is any change in the images captured by the image sensor at the low resolution;
a resolution setting section which maintains the image sensor operating at the low resolution when the change determination section determines that there is a change in the images captured by the image sensor at the low resolution, and which sets the image sensor to operate at the high resolution to capture an image of the object at the high resolution when the change determination section determines that there is no change in the images captured by the image sensor at the low resolution;

a correction parameter extraction section which extracts parameters for performing image correction of the image captured by the image sensor at the high resolution, from a last-captured image captured by the image sensor at the low resolution just before the resolution setting section sets the image sensor to operate at the high resolution;

a correction parameter conversion section which converts a low scale of the parameters extracted from the last-captured image captured by the image sensor at the low resolution into a high scale corresponding to the high resolution;

an image correction section which corrects a luminance and color of the image captured by the image sensor at the high resolution by using the parameters with the high scale converted by the correction parameter conversion section; and a projection section which projects the image corrected by the image correction section on a screen, wherein the correction parameter extraction section includes:

a luminance histogram generation section which generates a luminance histogram showing distribution of luminance in the last-captured image captured by the image sensor at the low resolution, by counting a number of pixels included in the last-captured image for each luminance value, a color difference histogram generation section which generates a color difference histogram showing distribution of color differences in the last-captured image captured by the image sensor at the low resolution, by counting a number of pixels included in the last-captured image for each color difference, and an image effect correction parameter obtaining section which obtains a maximum value, a minimum value, and a peak value of luminance from the luminance histogram generated by the luminance histogram generation section, and a peak value and an average value of color difference from the color difference histogram generated by the color difference histogram generation section, thereby obtaining image effect correction parameters including the maximum value, the minimum value, and the peak value of luminance, and the peak value and the average value of color difference, and wherein the image correction section includes a luminance/color difference correction section which corrects luminance and color differences of the image captured by the image sensor at the high resolution, by adjusting luminance and color differences of each pixel included in the image by using the image effect correction parameters obtained by the image effect correction parameter obtaining section.

8. An image processing method comprising:

initially operating a camera to capture a plurality of images of an object at a low resolution;

determining whether there is any change in the images captured by the camera at the low resolution;

maintaining the camera to operate at the low resolution when it is determined that there is a change in the images captured by the camera at the low resolution, and setting the camera to operate at a high resolution to capture an image of the object at the high resolution when it is determined that there is no change in the images captured by the camera at the low resolution;

extracting parameters for performing image correction of the image captured by the camera at the high resolution from a last-captured image captured by the camera at the low resolution just before the camera is set to operate at the high resolution;

converting a low scale of the parameters extracted from the last-captured image captured by the camera at the low resolution into a high scale corresponding to the high resolution; and correcting a luminance and color of the image captured by the camera at the high resolution by using the parameters with the converted high scale, wherein the extracting includes:

generating a luminance histogram showing distribution of luminance in the last-captured image captured by the camera at the low resolution, by counting a number of pixels included in the last-captured image for each luminance value, generating a color difference histogram showing distribution of color differences in the last-captured image captured by the camera at the low resolution, by counting a number of pixels included in the last-captured image for each color difference, and obtaining a maximum value, a minimum value, and a peak value of luminance from the generated luminance histogram, and a peak value and an average value of color difference from the generated color difference histogram, thereby obtaining image effect correction parameters including the maximum value, the minimum value, and the peak value of luminance, and the peak value and the average value of color difference, and wherein the correcting includes correcting luminance and color differences of the image captured by the camera at the high resolution, by adjusting luminance and color differences of each pixel included in the image by using the obtained image effect correction parameters.

9. A non-transitory computer readable recording medium having stored thereon a computer readable program for controlling a computer to perform functions comprising:

initially operating a camera to capture a plurality of images of an object at a low resolution;

determining whether there is any change in the images captured by the camera at the low resolution;

maintaining the camera to operate at the low resolution when it is determined that there is a change in the images captured by the camera at the low resolution, and setting the camera to operate at a high resolution to capture an image of the object at the high resolution when it is determined that there is no change in the images captured by the camera at the low resolution;

extracting parameters for performing image correction of the image captured by the camera at the high resolution from a last-captured image captured by the camera at the low resolution just before the camera is set to operate at the high resolution;

converting a low scale of the parameters extracted from the last-captured image captured by the camera at the low resolution into a high scale corresponding to the high resolution; and correcting a luminance and color of the image captured by the camera at the high resolution by using the parameters with the converted high scale, wherein the extracting includes:
    generating a luminance histogram showing distribution of luminance in the last-captured image captured by the camera at the low resolution, by counting a number of pixels included in the last-captured image for each luminance value,
    generating a color difference histogram showing distribution of color differences in the last-captured image captured by the camera at the low resolution, by counting a number of pixels included in the last-captured image for each color difference, and
    obtaining a maximum value, a minimum value, and a peak value of luminance from the generated luminance histogram, and a peak value and an average value of color difference from the generated color difference histogram, thereby obtaining image effect correction parameters including the maximum value, the minimum value, and the peak value of luminance, and the peak value and the average value of color difference, and
wherein the correcting includes correcting luminance and color differences of the image captured by the camera at the high resolution, by adjusting luminance and color differences of each pixel included in the image by using the obtained image effect correction parameters.

* * * * *